US009992661B2

(12) United States Patent
Abraham et al.

(10) Patent No.: US 9,992,661 B2
(45) Date of Patent: Jun. 5, 2018

(54) NEIGHBOR AWARE NETWORK LOGICAL CHANNELS

(71) Applicant: QUALCOMM Incorporated, San Diego, CA (US)

(72) Inventors: Santosh Paul Abraham, San Diego, CA (US); Abhishek Pramod Patil, San Diego, CA (US); George Cherian, San Diego, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 14/861,615

(22) Filed: Sep. 22, 2015

(65) Prior Publication Data

US 2016/0088610 A1 Mar. 24, 2016

Related U.S. Application Data

(60) Provisional application No. 62/054,586, filed on Sep. 24, 2014, provisional application No. 62/119,748, (Continued)

(51) Int. Cl.
*H04W 8/00* (2009.01)
*H04W 48/16* (2009.01)
(Continued)

(52) U.S. Cl.
CPC ............ *H04W 8/005* (2013.01); *H04W 48/16* (2013.01); *H04W 68/00* (2013.01); *H04W 4/008* (2013.01); *H04W 4/80* (2018.02); *H04W 84/18* (2013.01)

(58) Field of Classification Search
None
See application file for complete search history.

(56) References Cited

U.S. PATENT DOCUMENTS 9,258,193 B2 2/2016 Kasslin et al.
9,480,013 B2 10/2016 Fang et al.
(Continued)

FOREIGN PATENT DOCUMENTS

WO 2006033443 A1 3/2006

OTHER PUBLICATIONS

Wi-Fi Alliance Technical Task Group: Wi-Fi NAN Technical Specification Contribution, Version 1.0 (TG Baseline r00), 2013, 60 pages.

(Continued)

*Primary Examiner* — Chi H Pham
*Assistant Examiner* — Raul Rivas
(74) *Attorney, Agent, or Firm* — Toler Law Group, PC

(57) ABSTRACT

A method of communication includes selecting a logical channel of a plurality of logical channels at a first electronic device of a neighbor aware network (NAN). The logical channel indicates a particular communication channel of a plurality of communication channels and indicates a set of transmission windows of a plurality of transmission windows. The method also includes generating a message indicating that the first electronic device is available to communicate with other electronic devices of the NAN and identifying the logical channel. The method further includes transmitting the message to a second electronic device of the NAN.

28 Claims, 22 Drawing Sheets

Related U.S. Application Data filed on Feb. 23, 2015, provisional application No. 62/194,047, filed on Jul. 17, 2015.

(51) Int. Cl.
*H04W 68/00* (2009.01)
*H04W 4/00* (2018.01)
*H04W 84/18* (2009.01)

(56) References Cited

U.S. PATENT DOCUMENTS

| | | | |
|---|---|---|---|
| 9,544,754 | B1 | 1/2017 | Lambert |
| 2009/0061885 | A1* | 3/2009 | Eastlake, III ....... H04W 74/002 455/450 |
| 2012/0063372 | A1* | 3/2012 | Steer ................ H04B 1/0028 370/280 |
| 2013/0155900 | A1 | 6/2013 | Sampath et al. |
| 2013/0265906 | A1 | 10/2013 | Abraham et al. |
| 2014/0082185 | A1 | 3/2014 | Abraham et al. |
| 2014/0198724 | A1 | 7/2014 | Abraham et al. |
| 2015/0172902 | A1* | 6/2015 | Kasslin ................ H04L 45/745 370/328 |
| 2015/0200811 | A1* | 7/2015 | Kasslin ................ H04L 41/12 370/254 |
| 2015/0289082 | A1* | 10/2015 | Salokannel ............ G01S 1/042 455/41.2 |
| 2015/0296416 | A1 | 10/2015 | Lee et al. |
| 2015/0319596 | A1 | 11/2015 | Qi et al. |
| 2015/0351146 | A1* | 12/2015 | Lee ..................... H04W 76/023 370/329 |
| 2016/0088611 | A1 | 3/2016 | Abraham et al. |
| 2016/0249409 | A1 | 8/2016 | Kim et al. |

OTHER PUBLICATIONS

International Search Report and Written Opinion for International Application No. PCT/US2015/051736, ISA/EPO, dated Jan. 8, 2016, 13 pages.

Camps-Mur, D., et al., "Device to Device Communications with WiFi Direct: Overview and Experimentation," IEEE Wireless Communications, Jun. 2013, vol. 20, No. 3, IEEE, Piscataway, NJ, pp. 1-8.

Popovski, P., et al., "Strategies for Adaptive Frequency Hopping in the Unlicensed Bands," IEEE Wireless Communications, Dec. 2006, vol. 13, No. 6, IEEE, Piscataway, NJ, pp. 60-67.

* cited by examiner

500

NDL Channelization in 5GHz Band

UNII-1: 5150-5250 MHz band
UNII-2: 5250-5350 MHz and 570-5725 MHz band
UNII-3: 5725-5825 MHz band

502

Example Enumeration of Logical Channels

| NDL Index | Channel No. | Offset (x 16TUs) from DW |
|---|---|---|
| 0 | 6 | 1 |
| 1 | 6 | 1, 8, 16, 24 |
| 2 | 36 | 2 |
| 3 | 36 | 2, 18 |
| 4 | 36 | 2, 10, 18, 26 |
| 5 | 52 | 2, 18 |
| 6 | 52 | 2, 10, 18, 26 |
| 7 | 100 | 2, 18 |
| 8 | 100 | 2, 10, 18, 26 |
| 9 | 116 | 2, 18 |
| 10 | 116 | 2, 10, 18, 26 |
| 11 | 132 | 2, 18 |
| 12 | 149 | 9 |
| 13 | 149 | 9, 25 |
| 14 | 149 | 1, 9, 17, 25 |

Example Enumeration of Logical Channels

Low throughput, high latency

| NDL Index | Channel No. | Offset (x 16TUs) from DW | Block Width (TUs) |
|---|---|---|---|
| 0 | 6 | 1 (Basic Channel) | 32 |
| 1 | 36 | 2 | 32 |
| 2 | 36 | 2 | 64 |
| 3 | 36 | 2, 18 | 32 |
| 4 | 36 | 2, 18 | 64 |
| 5 | 52 | 2, 18 | 32 |
| --- | --- | --- | --- |

High throughput, low latency

| NDL Index | Channel No. | Offset (x 16TUs) from DW | Block Width (TUs) |
|---|---|---|---|
| N | 6 | 1, 8, 16, 24 | 64 |
| N+1 | 6 | 1, 4, 8, 12, 16, 18, 24 | 32 |
| N+2 | 36 | 2, 10, 18, 26 | 64 |
| N+3 | 36 | 2, 6, 10, 14, 18, 22, 26 | 32 |
| N+4 | 52 | 2, 10, 18, 26 | 32 |
| N+5 | 52 | 2, 10, 18, 26 | 64 |
| --- | --- | --- | --- |

FIG.6

NDP Data Time and Channel Indication

| Field | Size (octets) | Value | Description |
|---|---|---|---|
| Attribute ID | 1 | 0x06 | Identifies the type of NAN attribute |
| Length | 2 | Variable | Length of the following fields in the attribute |
| MAC Address | 6 | Variable | NDP interface MAC address |
| SC List | Variable | Variable | If present, carries list of Indices Supplemental Channels. If absent, then only basic channel is used. |

| Time Block (TB) Index | Time Blocks |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 25 |
| 26 | 26 |
| 27 | 27 |
| 28 | 28 |
| 29 | 29 |
| 30 | 30 |

| TB Index | Time Blocks |
|---|---|
| 31 | 31 |
| 32 | 0-1 |
| 33 | 2-3 |
| 34 | 4-5 |
| 35 | 6-7 |
| 36 | 8-9 |
| 37 | 10-11 |
| 38 | 12-13 |
| 39 | 14-15 |
| 40 | 16-17 |
| 41 | 18-19 |
| 42 | 20-21 |
| 43 | 22-23 |
| 44 | 24-25 |
| 45 | 26-27 |
| 46 | 28-29 |
| 47 | 30-31 |
| 48 | 0-3 |
| 49 | 4-7 |
| 50 | 9-11 |
| 51 | 12-15 |
| 52 | 16-19 |
| 53 | 20-23 |
| 54 | 24-27 |
| 55 | 28-31 |
| 56 | 0-7 |
| 57 | 8-15 |
| 58 | 16-23 |
| 59 | 24-31 |
| 60 | 0-15 |
| 61 | 16-31 |
| 62 | 0-31 |

1122
Generate, at a provider device of a neighbor aware network (NAN), a message that includes a first attribute descriptive of a service offered by the provider device via a NAN datalink of the NAN and a second attribute descriptive of the NAN datalink, where the first attribute includes an indicator that identifies the second attribute 1124
Transmit the message

*FIG. 11B*

NEIGHBOR AWARE NETWORK LOGICAL CHANNELS

I. CROSS REFERENCE TO RELATED APPLICATIONS

This application claims the benefit of U.S. Provisional Patent Application No. 62/054,586, filed Sep. 24, 2014 and entitled "NEIGHBOR AWARE NETWORK LOGICAL CHANNELS", U.S. Provisional Patent Application No. 62/119,748, filed Feb. 23, 2015 and entitled "NEIGHBOR AWARE NETWORK LOGICAL CHANNELS", and U.S. Provisional Patent Application No. 62/194,047, filed Jul. 17, 2015 and entitled "NEIGHBOR AWARE NETWORK LOGICAL CHANNELS"; the contents of each of the aforementioned applications are expressly incorporated herein by reference in their entirety.

II. FIELD

The present disclosure is generally related to logical data channels in a neighbor aware network (NAN).

III. DESCRIPTION OF RELATED ART

Advances in technology have resulted in smaller and more powerful computing devices. For example, there exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Electronic devices, such as wireless telephones, may use wireless connections to access networks in order to transmit and receive data or to exchange information. For example, mobile devices that are in close proximity to each other may form a wireless mesh network or another infrastructure-less, peer-to-peer wireless network to perform data exchanges via the wireless network. The mobile electronic devices may form the wireless network without involving wireless carriers, Wi-Fi access points, the Internet, or a combination thereof. To enable functionality of the wireless network, a particular wireless network or a particular wireless channel of the particular wireless network may be reserved for transferring data between electronic devices of the wireless network. For example, a first electronic device of the wireless network may share a service, such as a music service, with other electronic devices in the wireless network. For example, the first electronic device may transmit music data to a second electronic device in the wireless network. Because the second electronic device does not know when the first electronic device will transmit the data, such as the music data, the second electronic device may substantially continuously monitor the wireless network for transmissions from the first electronic device. Accordingly, the second electronic device consumes power to monitor the wireless network, even during time periods when the first electronic device is not transmitting data to the second electronic device. The first electronic device provides the data of the service using a single wireless channel. The single wireless channel may correspond to a single data session. The first electronic device may be unable to support multiple data sessions of the service using a single wireless channel.

IV. SUMMARY

In a particular aspect, a method of communication includes selecting a logical channel of a plurality of logical channels at a first electronic device of a neighbor aware network (NAN). The logical channel indicates a particular communication channel of a plurality of communication channels and indicates a set of transmission windows of a plurality of transmission windows. The method also includes generating a message indicating that the first electronic device is available to communicate with other electronic devices of the NAN and identifying the logical channel. The method further includes transmitting the message to a second electronic device of the NAN.

In another particular aspect, an apparatus for communication includes a processor and a transmitter. The processor is configured select a logical channel of a plurality of logical channels. The logical channel indicates a particular communication channel of a plurality of communication channels and indicates a set of transmission windows of a plurality of transmission windows. The processor is also configured to generate a message indicating availability of a first electronic device of a neighbor aware network (NAN) to communicate with other electronic devices of the NAN and identifying the logical channel. The transmitter is configured to wirelessly transmit the message to a second electronic device of the NAN.

In another particular aspect, a computer-readable storage device stores instructions that, when executed by a processor, cause the processor to perform operations including generating a message indicating availability of a first electronic device of a neighbor aware network (NAN) to communicate with other electronic devices of the NAN and identifying a logical channel of a plurality of logical channels. The logical channel indicates a particular communication channel of a plurality of communication channels and indicates a set of transmission windows of a plurality of transmission windows. The operations also include initiating wireless transmission of the message to a second electronic device of the NAN.

In another particular aspect, an apparatus includes means for generating a message indicating availability of a first electronic device of a neighbor aware network (NAN) to communicate with other electronic devices of the NAN and identifying a logical channel of a plurality of logical channels. The logical channel indicates a particular communication channel of a plurality of communication channels and indicates a set of transmission windows of a plurality of transmission windows. The apparatus also includes means for transmitting the message to a second electronic device of the NAN.

In another particular aspect, a method of communication includes transmitting a message from a first electronic device of a neighbor aware network (NAN) to a second electronic device of the NAN via a first communication channel of a plurality of communication channels during a discovery window. The message indicates that the first electronic device is available to communicate. The method also includes monitoring a second communication channel of the plurality of communication channels during a first paging window of a transmission window. The first paging window includes a beginning portion of the transmission window, and electronic devices of the NAN are in an active state during the first paging window.

In another particular aspect, an apparatus for communication includes a transmitter and a processor. The transmitter is configured to transmit a message to a second electronic device of the NAN via a first communication channel of a plurality of communication channels during a discovery window. The message indicates a first electronic device is available to communicate. The processor is configured to monitor a second communication channel of the plurality of communication channels during a first paging window of a first transmission window. The first paging window includes a beginning portion of the first transmission window, and electronic devices of the NAN are in an active state during the first paging window.

In another particular aspect, a method of communication includes transmitting a subscribe message to a first electronic device of a neighbor aware network (NAN) from a second electronic device of the NAN via a first communication channel of a plurality of communication channels during a first discovery window. The subscribe message indicates that the second electronic device is interested in communicating. The method also includes monitoring a second communication channel of the plurality of communication channels during a paging window of a transmission window. The paging window includes a beginning portion of the transmission window, and electronic devices of the NAN are in an active state during the first paging window.

In another particular aspect, an apparatus for communication includes a transmitter and a processor. The transmitter is configured to transmit a subscribe message to a first electronic device of a neighbor aware network (NAN) via a first communication channel of a plurality of communication channels during a first discovery window. The subscribe message indicates that a second electronic device of the NAN is interested in communicating. The processor is configured to monitor a second communication channel of the plurality of communication channels during a paging window of a transmission window. The paging window includes a beginning portion of the transmission window, and electronic devices of the NAN are in an active state during the first paging window.

Other aspects, advantages, and features of the present disclosure will become apparent after a review of the entire application, including the following sections: Brief Description of the Drawings, Detailed Description, and the Claims.

V. BRIEF DESCRIPTION OF THE DRAWINGS

FIG. 6 is a diagram illustrating another example of logical channels;

FIGS. 7A-7D are diagrams illustrating various aspects of a service advertisement;

FIG. 9 is a diagram illustrating an example of mapping data corresponding to the tree representation of FIG. 8;

FIGS. 11A and 11B are flow diagrams of a method of operation at an electronic device of the system of FIG. 1;

VI. DETAILED DESCRIPTION

Figure 1:
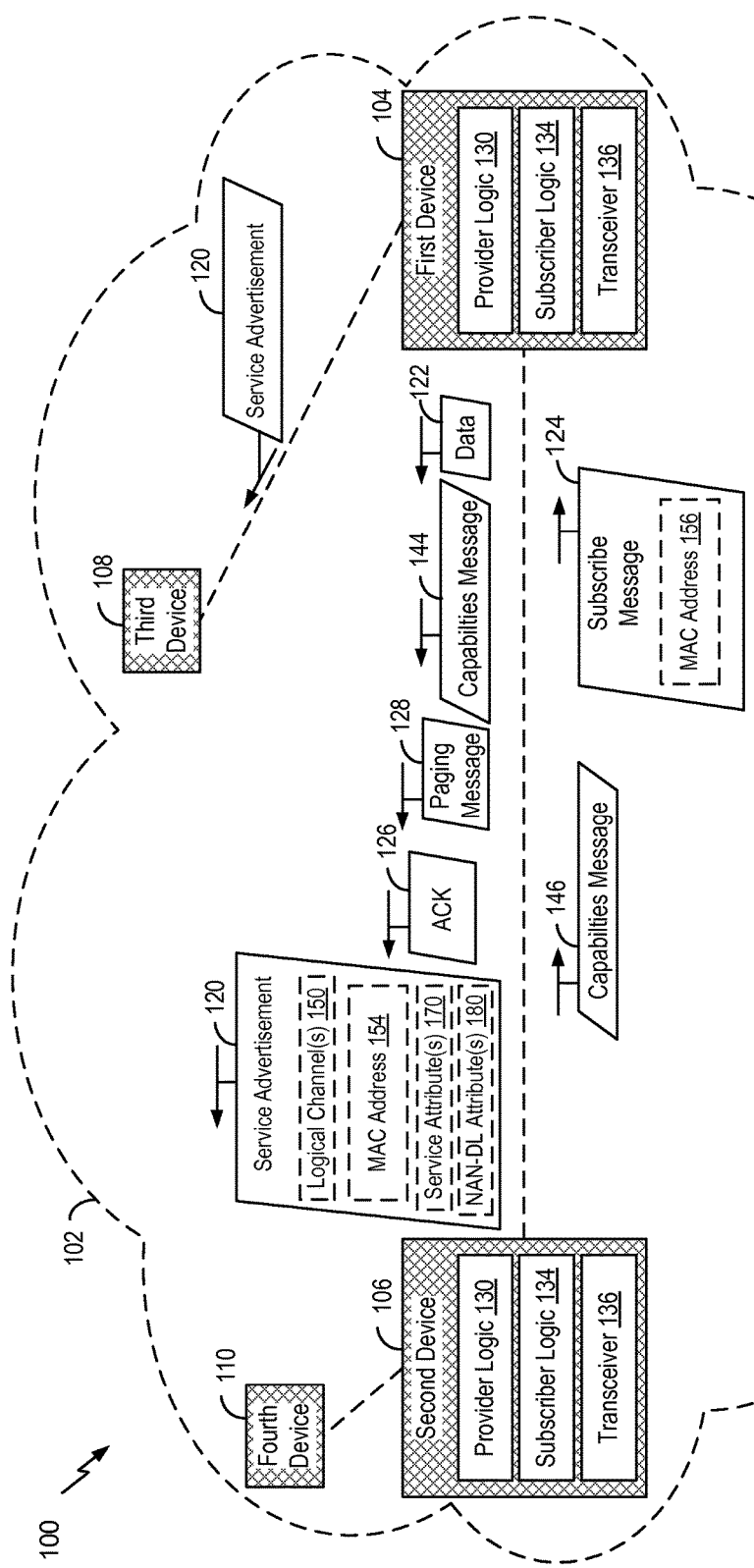
FIG. 1 is a diagram of a particular aspect of a system that includes a neighbor aware network (NAN) that includes one or more electronic devices included in data link groups corresponding to one or more logical channels.

Particular aspects of the present disclosure are described below with reference to the drawings. In the description, common features are designated by common reference numbers throughout the drawings.

The present disclosure is directed to systems and methods to enable electronic devices in a data link group of a neighbor aware network (NAN) to coordinate times to exchange traffic, such as data, of a particular service via multiple data link groups. The multiple data link groups may include or correspond to logical channels. As referred to herein, a data link group refers to one or more electronic devices that share a time period corresponding to an active operating mode of the electronic devices and that have common security credentials. As a non-limiting example, a data link group may include a wireless mesh network, such as a "social wireless fidelity (wi-fi) mesh." The one or more electronic devices of the data link group may be a subset of electronic devices in the NAN.

As referred to herein, a logical channel refers to a particular communication channel and one or more time periods during which the electronic devices of the data link group may communicate via the particular communication channel regarding the particular service. Each of the one or more time periods may include or correspond to a transmission window. In some implementations, the transmission window may include or correspond to a NAN data link time block (NAN DL TB). In a particular aspect, each transmission window may include a portion of time, referred to as a paging window, during which a first electronic device of the data link group may transmit a paging message via the particular communication channel to a second electronic device of the data link group indicating that the first electronic device has data to be transmitted. A remaining portion of the transmission window, referred to as a data transmission window, may be used to exchange the data. As used herein, a data transmission window may be referred to as a "data window." Alternatively, a transmission window may refer or correspond to the data transmission window (i.e., the transmission window does not include the paging window).

An electronic device of the data link group that does not receive a paging message and that does not transmit a paging message during the paging window may transition to (or enter) a low-power operating mode, such as a "sleep mode," until a subsequent paging window. The electronic device in the low-power operating mode may refrain from monitoring the particular communication channel during the data transmission window to conserve power.

In a particular aspect, an electronic device of the NAN may establish many-to-many NAN data links (NDLs). To illustrate operation of the NAN, users, such as students, of electronic devices may be in a particular location, such as on a school bus. A first device of a particular user ("Tom Smith"), may provide a first set of music tracks via a first logical channel to a second device of a second user ("Abe Henderson"). The first device may also receive a second set of music tracks via a second logical channel from another device of another user ("Kim Shaw").

To further illustrate, the first electronic device and the second electronic device may exchange data regarding the particular service using multiple logical channels. For example, a provider device of a particular user ("Tom Smith"), may provide a particular service, such as a gaming service, via a first logical channel and via a second logical channel. A subscriber device of a first user ("Jane Adams"), may subscribe to the particular service via the first logical channel to play a game with a second user ("Noah Johnson"), and may subscribe to the particular service via the second logical channel to play the game with another user ("Saira Patel"). The subscriber device and the provider device may thus establish multiple data sessions corresponding to the particular service.

In a particular aspect, a provider device may rapidly set up and tear down data transfer sessions with subscriber devices that enter and leave a coverage area of the provider device. For example, a provider device at a first location, such as a café, may provide advertisements to subscriber devices that enter a coverage area of the provider device.

In a particular aspect, electronic devices of the NAN may form autonomous data communication sessions that do not access a cellular network. For example, users, such as members of a Presidential campaign, may be at a first location without cellular network coverage. The electronic devices of the NAN may communicate messages with each other using logical channels. The messages may be encrypted. Avoiding use of the cellular network may increase security of the messages.

The data link group may be initiated by a provider device of the NAN transmitting a message to electronic devices of the NAN during a discovery window. The message may include or correspond to a service advertisement. The message may indicate that the provider device is available to communicate via a plurality of logical channels. For example, the service advertisement may indicate that the particular service is available via the plurality of logical channels. As referred to herein, a discovery window refers to a time period corresponding to an active operating mode of the electronic devices of the NAN. During the discovery window, the electronic devices of the NAN may monitor (or listen to) a NAN communication channel for service advertisements. The NAN communication channel may correspond to a particular wireless channel that devices of the NAN use to communicate. A subscriber device of the NAN may respond to a service advertisement by transmitting a subscribe message to the provider device.

A particular data link group may correspond to a particular logical channel. For example, the particular data link group may include the provider device and one or more subscriber devices that transmitted a subscribe message indicating the particular logical channel. A first data link group corresponding to a first logical channel may include the same, distinct, or overlapping electronic devices as a second data link group corresponding to a second logical channel. Electronic devices of a particular data link group may monitor a communication channel of a corresponding logical channel during at least a portion of one or more paging windows corresponding to the logical channel. An electronic device of the NAN that does not receive a service advertisement during a discovery window or that does not transmit a subscribe message in response to receiving the service advertisement may transition to the low-power operating mode until a subsequent discovery window.

Each electronic device in the NAN may synchronize an internal clock based on synchronization beacons received from at least one electronic device of the NAN. Because the internal clock of each electronic device in the data link group is synchronized, each electronic device may determine a first common time period, such as the discovery window, to transition to an active operating mode and to monitor the NAN communication channel for a service advertisement. Each electronic device of a data link group may determine a second common time period, such as a paging window, to transition to the active operating mode and to monitor a particular communication channel corresponding to a particular logical channel for a paging message. In a particular aspect, the data link group may be a "multi-hop" data link group, and the paging message may be transmitted from a first electronic device of the data link group to other electronic devices of the data link group during the paging window, and the other electronic devices may propagate the paging message to more electronic devices. In another particular aspect, the data link group may be a "single-hop" data link group, and the paging message may be transmitted via the particular logical channel by a provider device to one or more devices of the data link group.

Referring to FIG. 1, a particular aspect of a system 100 that includes a neighbor aware network (NAN) 102 is shown. The NAN 102 includes one or more electronic devices 104, 106, 108, 110 configured to perform data exchanges via wireless communications between the electronic devices 104, 106, 108, 110 without involving wireless carriers, Wi-Fi access points, the Internet, or a combination thereof. For example, the NAN 102 may include a first device 104, a second device 106, a third device 108, and a fourth device 110.

The system 100 is illustrated for convenience only and the particular illustrated details are not limiting. For example, in other aspects, the system 100 may include more electronic devices or fewer electronic devices than illustrated in FIG. 1, and the electronic devices may be located at different locations than illustrated in FIG. 1. The electronic devices 104, 106, 108, 110 may include provider logic 130, subscriber logic 134, a transceiver 136, or a combination thereof.

The electronic devices 104, 106, 108, 110 may be fixed location electronic devices or mobile electronic devices. For example, the electronic devices 104, 106, 108, 110 may include or correspond to mobile phones, laptop computers, tablet computers, personal computers, multimedia devices, peripheral devices, data storage devices, or a combination thereof. Additionally or alternatively, the electronic devices 104, 106, 108, 110 may include a processor, such as a central processing unit (CPU), a digital signal processor (DSP), a network processing unit (NPU), etc., a memory, such as a random access memory (RAM), a read-only memory (ROM), etc., and a wireless interface configured to transmit and to receive data via one or more wireless networks, such as one or more wireless communication channels, as further described with reference to FIG. 11. The wireless interface may communicate with the transceiver 136, the transceiver 136 including or corresponding to a wireless receiver and a wireless transmitter. Although certain operations described herein may be described with reference to a "transceiver," in other aspects a "receiver" may perform data receiving operations and a "transmitter" may perform data transmitting operations.

The electronic devices 104, 106, 108, 110 may exchange data, services, or a combination thereof, via one or more wireless networks. As used herein, a transmission "via" a wireless network may include, but is not limited to, a "point-to-point" transmission between two electronic devices of the wireless network. As another example, a transmission via the wireless network may include a communication that is "broadcast" (or transmitted) from a particular electronic device of the wireless network to multiple other electronic devices of the wireless network. The wireless network may be an infrastructure network or an infrastructure-less network, such as a peer-to-peer network (e.g., an ad-hoc network). As used herein, the electronic devices 104, 106, 108, 110 may be configured to operate in accordance with one or more wireless protocols or standards, such as an Institute of Electrical and Electronics Engineers (IEEE) 802.11 standard. For example, the electronic devices 104, 106, 108, 110 may operate in accordance with an IEEE 802.11a, b, g, n, s, aa, ac, ad, ae, af, ah, ai, aj, aq, ax, or mc standard. Additionally or alternatively, the electronic devices 104, 106, 108, 110 may operate in accordance with one or more NAN standards or protocols, such as a Wi-Fi Alliance standard as an illustrative, non-limiting example.

Additionally, one or more of the electronic devices 104, 106, 108, and 110 may be configured to communicate with a cellular network via one or more cellular communication protocols or standards, such as a code division multiple access (CDMA) protocol, an orthogonal frequency division multiplexing (OFDM) protocol, an orthogonal frequency division multiple access (OFDMA) protocol, a time division multiple access (TDMA) protocol, a space division multiple access (SDMA) protocol, etc. Additionally, one or more of the electronic devices 104, 106, 108, and 110 may be configured to operate in accordance with one or more near-field communications standards, such as a Bluetooth® standard (Bluetooth is a registered trademark of Bluetooth SIG, Inc.). Additionally, one or more of the electronic devices 104, 106, 108, and 110 may exchange data via infrared or other near-field communications.

Each of the electronic devices 104, 106, 108, 110 may enter and exit the NAN 102 at various times during operation. For example, an electronic device that is not within the NAN 102 may detect a discovery beacon and may associate with the NAN 102 during a discovery window identified by the discovery beacon, in accordance with a NAN standard or protocol. Additionally, the electronic devices 104, 106, 108, and 110 may disassociate from the NAN 102 at any time. While within the NAN 102, the electronic devices 104, 106, 108, 110 may be configured to transmit or to receive messages indicating an availability to communicate via one or more logical channels. For example, the electronic devices 104, 106, 108, 110 may be configured to transmit or to receive service advertisements. The service advertisements may include or correspond to service discovery frames (SDFs). The service advertisements may advertise a service provided via one or more logical channels by at least one electronic device of the NAN 102.

Additionally, while within the NAN 102, the electronic devices 104, 106, 108, and 110 may be configured to transmit synchronization beacons to, or to receive synchronization beacons from, one or more electronic devices of the NAN 102. A synchronization beacon may indicate synchronization information and may be formed in accordance with one or more NAN standards or protocols. Each of the electronic devices 104, 106, 108, and 110 may be configured to synchronize a respective internal clock based on the synchronization beacons. The synchronization beacons may be retransmitted (or rebroadcast) by some of the electronic devices 104, 106, 108, and 110 within the NAN 102, in accordance with a NAN standard or protocol, to enable the synchronization beacons to reach electronic devices that are beyond a wireless communication range of the electronic device that transmits the synchronization beacon. In a particular aspect, the synchronization beacons may be transmitted between electronic devices of the NAN 102 via a first wireless channel, such as a "NAN communication channel." As referred to herein, a "NAN communication channel" is a particular wireless channel that is reserved for electronic devices to perform NAN discovery operations and NAN synchronization operations. As used herein, the NAN communication channel corresponds to the NAN 102, and communications in the NAN 102 may be performed via (or over) the NAN communication channel.

In addition to being included in the NAN 102, one or more of the electronic devices 104, 106, 108, and 110 may be included in one or more "data link groups." A data link group may also be referred to as a data link, a NAN data link (NDL), a data link network, a group network, a NAN data link (NDL) network, a data path group, a data path group network, a NAN data path, or a NAN data path group network. In some implementations, the data link group may include a mesh network, such as a "social Wi-Fi mesh network," as an illustrative, non-limiting example. The data link group may include multiple devices that are able to form a network, such as a decentralized wireless network. A data link group may correspond to a service provided via a particular logical channel by one of the electronic devices 104, 106, 108, and 110. For example, in FIG. 1, the first device 104 may provide a particular service, such as a music service, a gaming service, a social media, an advertising service, a message sharing service, etc., via the particular logical channel to other electronic devices in a data link group, as described herein. The particular logical channel may represent a communication schedule of the data link group. For example, the particular logical channel may indicate times and via which wireless channel devices of the data link group are available to communicate. As another example, the first device 104 may be part of another network, such as an access point (AP) based network or an independent basic service set (IBSS) network, and the first device 104 may be configured to advertise the other network to enable other electronic devices of the NAN 102 to join the other network via the first device 104.

The data link groups may include "single-hop" data link groups or "multi-hop" data link groups. A single-hop data link group may include one or more electronic devices that are within a wireless communication range (e.g., distance) of a provider device, such as an electronic device that provides a service. A multi-hop data link group may include one or more electronic devices that are outside a wireless communication range of the provider. In the multi-hop data link group, at least one electronic device may receive a message (including data) from the provider and may rebroadcast the message to another electronic device that outside of the wireless communication range of the provider. In a particular aspect, the data link group may be a multi-hop data link group that includes the electronic devices 104, 106, 108, 110. In this aspect, wireless communications from the first device 104 to the fourth device 110 may be routed (or retransmitted) by the second device 106. In another particular aspect, the data link group may be a single-hop data link group that includes the electronic devices 104, 106, and 108. The fourth device 110 may not be included in the single-hop data link group because the fourth device 110 is not within a wireless communication range (e.g., a one-hop range) of the first device 104.

The first device 104 may be configured to provide a service, such as by operating as a provider device. For example, the first device 104 may be configured to operate as a data source. The first device 104 may transmit data to other electronic devices, such as subscriber devices, of the data link group. For example, to share a music service, the first device 104 may transmit music data to another electronic device in the data link group. As another example, to share a social media service, the first device 104 may transmit text data, image data, video data, or a combination thereof, to another electronic device in the data link group. As a further example, to share a gaming service, the first device 104 may transmit text data, score data, image data, video data, or a combination thereof, to another electronic device in the data link group. The other electronic devices (e.g., the subscriber devices) may be configured to operate as data sinks.

In a particular aspect, the data may be transmitted between electronic devices of the data link group via a second wireless channel, such as a "data link group" channel. As used herein, a "data link group channel" is a particular wireless channel that is reserved for electronic devices in a corresponding data link group to communicate messages (service messages, paging messages, etc.) regarding sharing a service and to communicate data related to the service. The data link group channel may also be referred to as an NDL channel. A logical channel may correspond to (or represent) a data link group channel and one or more transmission windows, such as a set of transmission windows. For example, when electronic devices communicate "via a logical channel," data may be transmitted between electronic devices of the data link group via the data link group channel during the one or more transmission windows. As used herein, a "data link group channel" is a particular wireless channel that is reserved for electronic devices in a corresponding data link group to communicate data corresponding to sharing a service. Additionally, the data link group channel may be used for sharing security information, for performing association operations, for performing routing operations (in multi-hop data link groups), or a combination thereof.

In some aspects, the data link group channel and the NAN communication channel may be different wireless channels that correspond to different wireless frequency bands. In a particular aspect, the NAN communication channel may correspond to a NAN channel, as described in a Wi-Fi Alliance NAN specification. In another particular aspect, the NAN communication channel may be a 2.4 gigahertz (GHz) channel, and the data link group channel may be a 5 GHz channel. In other aspects, the data link group channel and the NAN communication channel may be the same wireless channel. For example, one or more of the electronic devices 104, 106, 108, 110 may share data with the data link group via the NAN communication channel. In some aspects, the NAN 102 may include multiple data link groups, and each of the multiple data link groups may correspond to a distinct data link group channel. The multiple data link groups may correspond to different services provided by different electronic devices in the NAN 102. In other aspects, electronic devices of the multiple data link groups may share data via the NAN 102, such as via the NAN communication channel. In some aspects, electronic devices of the multiple data link groups may share data via the same data link group channel during distinct transmission windows.

During operation, one of the electronic devices of the NAN 102 may generate and transmit a synchronization (sync) beacon in accordance with a NAN standard or protocol. For example, the third device 108 may transmit the synchronization beacon via the NAN communication channel. Any electronic device within a one-hop range of the third device 108 may retransmit the synchronization beacon such that the synchronization beacon propagates throughout the NAN 102. Each of the electronic devices 104, 106, 108, 110 may receive the synchronization beacon and may perform synchronization operations based on the synchronization beacon. For example, the electronic devices 104, 106, 108, 110 may synchronize timing circuitry, such as an internal clock, based on receiving the synchronization beacon. The timing circuitry may be coupled to the transceiver 136 of the first device 104. Either the provider logic 130, the subscriber logic 134, or a combination thereof, may synchronize the internal circuitry.

In one aspect, the first device 104 may, after performing the synchronization operations, begin operating as a provider device of a particular service to other devices of the NAN 102, as described herein. The provider logic 130 of the first device 104 may determine a first plurality of logical channels that identify communication channels and time periods during which the first device 104 is available to communicate. For example, the provider logic 130 may determine the first plurality of logical channels based on default data, based on input of a user of the first device 104, or both. The first plurality of logical channels may correspond to a plurality of communication channels, such as wireless communication channels, and one or more associated transmission windows, as described with reference to FIGS. 5B and 6. In a particular implementation, the plurality of logical channels may be referenced by an index of logical channels, as described with reference to FIG. 5B. The provider logic 130 may determine a plurality of available logical channels. For example, the plurality of available logical channels may be a subset of the first plurality of logical channels that is not being used by the provider logic 130 of the first device 104 to participate in other data provider groups.

The provider logic 130 of the first device 104 may select one or more logical channels 150 from the plurality of available logical channels to provide a particular service, such as an audio streaming service, a gaming service, a music provider service, or a message service. For example, the provider logic 130 of the first device 104 may select at least one logical channel of the logical channels 150 based on a latency sensitivity of the particular service, as described herein.

In a particular example, a gaming service may have a first latency sensitivity, a message service may have a second latency sensitivity, and the first latency sensitivity may be higher than the second latency sensitivity. A first logical channel of the plurality of available logical channels may include a first number of transmission windows, a second logical channel of the plurality of available logical channels may include a second number of transmission windows, and the second number may be higher than the first number. In this example, the provider logic 130 of the first device 104 may select the second logical channel to include in the logical channels 150 in response to determining that the particular service has a latency sensitivity that satisfies a particular latency sensitivity threshold. To illustrate, the gaming service may have the first latency sensitivity that is greater than or equal to the particular latency sensitivity threshold. As another example, the provider logic 130 of the first device 104 may select the first logical channel to include the logical channels 150 in response to determining that the message service has the second latency sensitivity that fails to satisfy the particular latency sensitivity threshold.

The provider logic 130 of the first device 104 may generate a message, such as a service advertisement 120, indicating that the first device 104 is available to communicate via the logical channels 150. For example, the provider logic 130 may generate the service advertisement 120 to advertise availability of the particular service. The service advertisement 120 may include one or more service attributes 170. One of the service attributes 170 may be descriptive of the particular service, as described with reference to FIGS. 7A-7D. The service advertisement 120 may further include one or more NAN data link group attributes, such as NAN-DL attributes 180. An indicator of the particular service attribute may identify a particular NAN data link group attribute of the NAN-DL attributes 180.

The service advertisement 120 may further indicate or identify the one or more logical channels of the logical channels 150, as described with reference to FIG. 6. For example, the service advertisement 120 may include a list of indices, such as NAN data link (NDL) indices or NAN data link (NDL) indices, corresponding to the logical channels 150. The list of indices may be based on mapping data that maps a particular NDL index to each logical channel of the first plurality of logical channels, as described with reference to FIGS. 5B and 6. The mapping data may be accessible to one or more of the electronic devices 104, 106, 108, and 110. In a particular aspect, the particular NAN data link group attribute, such as a first data link attribute, of the NAN-DL attributes 180 includes an indicator that identifies a particular logical channel of the logical channels 150 used by the first device 104 to provide the particular service.

In a particular aspect, the service advertisement 120 may indicate the logical channels 150 without using the list of indices. For example, the service advertisement 120 may indicate a particular logical channel of the logical channels 150 by including a channel number corresponding to the particular logical channel and by including one or more offsets corresponding to one or more transmission windows (e.g., a set of transmission windows) of the particular logical channel.

In a particular aspect, the first device 104 may provide the particular service via a basic channel. The basic channel may correspond to a transmission window of the NAN channel that begins after an end of a NAN discovery window. In a particular aspect, the service advertisement 120 may not indicate the basic channel. For example, the particular service attribute may not indicate the particular logical channel. Further, the service advertisement 120 may not include the logical channels 150. The subscriber logic 134 of an electronic device, such as the second device 106, may assume that the first device 104 is available to provide the particular service via the basic channel in response to receiving the service advertisement 120 regardless of whether the service advertisement 120 indicates the basic channel. In some aspects, the logical channels 150 may correspond to supplemental channels.

The provider logic 130 of the first device 104 may transmit the service advertisement 120, via the transceiver 136 of the first device 104, to electronic devices, such as the second device 106 and the third device 108, of the NAN 102 during a NAN discovery window. The electronic devices 104, 106, 108, 110 may monitor the NAN channel during the NAN discovery window. One or more devices, such as the second device 106 and the third device 108, may receive the service advertisement 120 during the NAN discovery window.

In a particular aspect, the subscriber logic 134 of the second device 106 may refrain from generating a subscribe message 124 in response to receiving the service advertisement 120 and determining that the second device 106 is unavailable to communicate. For example, the second device 106 may have an ability to communicate using multiple communication channels at a time. The subscriber logic 134 of the second device 106 may determine that the second device 106 is unavailable to communicate in response to determining that none of the multiple communication channels are available during transmission windows corresponding to the logical channels 150.

As another example, the subscriber logic 134 of the second device 106 may determine that the second device 106 is unavailable to communicate in response to determining that the second device 106 is using the logical channels 150, the basic channel, or a combination thereof, to communicate with one or more other electronic devices. To illustrate, the subscriber logic 134 of the second device 106 may have previously transmitted one or more subscribe messages corresponding to the logical channels 150, the basic channel, or a combination thereof. As a further example, the subscriber logic 134 of the second device 106 may determine that the second device 106 is unavailable to communicate in response to determining that the second device 106 is not configured to communicate via communication channels corresponding to the logical channels 150, the basic channel, or a combination thereof.

In a particular aspect, the subscriber logic 134 of the second device 106 may refrain from monitoring communication channels corresponding to the logical channels 150, the NAN communication channel, or a combination thereof, during transmission windows corresponding to the logical channels 150, the basic channel, or a combination thereof, in response to determining that the second device 106 is unavailable to communicate via the logical channels 150, the basic channel, or a combination thereof. In a particular aspect, the provider logic 130 of the first device 104 may refrain from monitoring the communication channels, the NAN communication channel, or a combination thereof, during the transmission windows in response to determining that no subscribe messages have been received from the electronic devices 106, 108, and 110 during the NAN discovery window. In a particular aspect, the provider logic 130 of the first device 104 may refrain from monitoring the communication channels, the NAN communication channel, or a combination thereof, during the transmission windows until a subsequent NAN discovery window.

The first device 104 (or the second device 106) may transition to a low-power operating mode, such as a sleep mode, while refraining from monitoring the communication channels (or the NAN communication channel). In a particular aspect, the transceiver 136 of the second device 106 (or the first device 104) may receive a paging message via a communication channel during a paging window. The communication channel and the paging window may correspond to (or be represented by) a logical channel of the logical channels 150. In a particular aspect, the communication channel and the paging window may correspond to the basic channel. For example, the communication channel may include the NAN communication channel. The transceiver 136 of the second device 106 (or the first device 104) may refrain from providing the paging message to the subscriber logic 134 of the second device 106 (or to the provider logic 130 of the first device 104) in response to determining that the subscriber logic 134 of the second device 106 (or the provider logic 130 of the first device 104) is refraining from monitoring the communication channel during the paging window.

In a particular aspect, the transceiver 136 of the second device 106 (or the first device 104) may provide the paging message to a wireless interface and the wireless interface may refrain from providing the paging message to the subscriber logic 134 of the second device 106 (or to the provider logic 130 of the first device 104) in response to determining that the subscriber logic 134 of the second device 106 (or the provider logic 130 of the first device 104) is refraining from monitoring the communication channel during the paging window.

In a particular aspect, the wireless interface or the transceiver 136 may discard the paging message in response to determining that the subscriber logic 134 of the second device 106 (or the provider logic 130 of the first device 104) is refraining from monitoring the communication channel during the paging window. In a particular aspect, the wireless interface may provide the paging message to the subscriber logic 134 of the second device 106 (or the provider logic 130 of the first device 104) in response to determining that the subscriber logic 134 of the second device 106 (or the provider logic 130 of the first device 104) is monitoring the communication channel during the paging window.

In a particular aspect, the subscriber logic 134 of the second device 106, such as a subscriber device, may generate the subscribe message 124 in response to receiving the service advertisement 120. For example, the subscriber logic 134 of the second device 106 may generate the subscribe message 124 in response to receiving the service advertisement 120 and determining that the second device 106 is available to communicate via at least one of the logical channels 150, the NAN communication channel, or a combination thereof. In a particular example, the subscribe message 124 corresponds to the service described by the particular service attribute, and the subscriber logic 134 of the second device 106 may generate the subscribe message 124 in response to determining that the second device 106 is available to communicate via the particular logical channel indicated by the particular NAN-DL attribute indicated by the particular service attribute. The subscribe message 124 may implicitly or explicitly indicate that the second device 106 is available to communicate, interested in communicating, interested in a service of the service advertisement, or a combination thereof. The subscriber logic 134 of the second device 106 may transmit the subscribe message 124, via the transceiver 136 of the second device 106, to the first device 104.

The provider logic 130 of the first device 104 may receive the subscribe message 124. The provider logic 130 of the first device 104 may determine that the second device 106 is available to communicate, interested in communicating, interested in a service of the service advertisement, or a combination thereof, based on receiving the subscribe message 124. In a particular aspect, the subscribe message 124 may explicitly indicate that the second device 106 is available to communicate, interested in communicating, interested in a service of the service advertisement, or a combination thereof. For example, a value of a particular field of the subscribe message 124 may indicate whether the second device 106 is available to communicate. In this aspect, the provider logic 130 of the first device 104 may determine that the second device 106 is available to communicate, interested in communicating, interested in a service of the service advertisement, or a combination thereof, in response to determining that the particular field of the subscribe message 124 has a particular value, such as a value of 1. In an alternate aspect, the subscribe message 124 may implicitly indicate that the second device 106 is available to communicate, interested in communicating, interested in a service of the service advertisement, or a combination thereof. In this aspect, the provider logic 130 of the first device 104 may determine that the second device 106 is available to communicate in response to receiving the subscribe message 124.

In a particular aspect, the provider logic 130 of the first device 104 may transmit an acknowledgment (ACK) 126 to the second device 106 in response to receiving the subscribe message 124. In some implementations, the ACK 126 may include a follow-up service discovery frame. In an alternate aspect, the provider logic 130 may not transmit the ACK 126. For example, a handshake process between the first device 104 and the second device 106 may end with the provider logic 130 receiving the subscribe message 124.

A data link group corresponding to each of the logical channels 150 may include the first device 104 and the second device 106. In a particular aspect, the first device 104 may receive subscribe messages from multiple subscriber devices, such as the electronic devices 106, 108, or 110. Each of the NAN-DL attributes 180 may correspond to a data link group. A data link group corresponding to a particular logical channel may include the first device 104, such as a provider device, and each subscriber device that responded with a subscribe message. A data link group corresponding to a basic channel may include the first device 104 and each subscriber device that responded with a subscribe message to the service advertisement 120.

In a particular aspect, each data link group may correspond to a particular logical channel. For example, electronic devices of each data link group may perform communications via a corresponding communication channel and during one or more transmission windows (e.g., a set of transmission windows) corresponding to the particular logical channel. To illustrate, electronic devices of the data link group may communicate via the basic channel and during a transmission window that begins at an end of a NAN discovery window. One or more of the NAN-DL attributes 180 may identify a corresponding logical channel of the logical channels 150. One or more NAN data link group attributes of the NAN-DL attributes 180 may identify a reserved value instead of one of the logical channels 150. The reserved value may indicate that the data link group utilizes the basic channel to communicate or may indicate that a logical channel is to be negotiated (or is negotiable). For example, a NAN data link group attribute may include a reserved value, such as 0x0000, that indicates that a logical channel is to be negotiated during a basic channel following the discovery window during which the service advertisement 120 is transmitted. Subscriber devices interested in a service corresponding to the NAN data link group attribute may remain in an active operating mode (e.g., an "awake" mode) during a time period corresponding to the basic channel to negotiate a logical channel. A provider device, such as the first device 104, and a subscriber device, such as the second device 106, may exchange one or more negotiation messages during a time period corresponding to the basic channel. Based on the one or more negotiation messages, the provider logic 130 may select a logical channel for the data link group corresponding to the NAN data link group attribute. The one or more negotiation messages may indicate the logical channel to be selected by the provider logic.

In some aspects, the electronic devices of each data link group may negotiate the NDL communication schedule, such as one or more logical channels of the logical channels 150. In a particular aspect, the electronic devices of each data link group may or may not include NAN data link group attributes of the NAN-DL attributes 180 in service advertisements. For example, the first device 104 may or may not include the one or more NAN data link group attributes of the NAN-DL attributes 180 in the service advertisement 120 and may transmit the service advertisement 120 to the electronic devices of the NAN during the NAN discovery window. The one or more NAN data link group attributes of the NAN-DL attributes 180 may identify or indicate one or more logical channels of the logical channels 150. A provider device, such as the first device 104, and a subscriber device, such as the second device 106, may exchange one or more negotiation messages after the NAN discovery window. Based on the one or more negotiation messages, the provider logic 130 may select a logical channel for the data link group corresponding to the NAN data link group attribute. The one or more negotiation messages may indicate the logical channel to be selected by the provider logic.

In another particular aspect, the electronic devices of each data link group may include NAN data link group attributes of the NAN-DL attributes 180 in service advertisements. For example, the first device 104 may include the one or more NAN data link group attributes of the NAN-DL attributes 180 in the service advertisement 120 and may transmit the service advertisement 120 to the electronic devices of the NAN during the NAN discovery window. The one or more NAN data link group attributes of the NAN-DL attributes 180 may identify or indicate one or more logical channels of the logical channels 150. The second device 106 may receive the service advertisement 120 and may transmit a negotiation message or an association request in response to receiving the service advertisement 120. The negotiation message may indicate availability, interest, or both, in the logical channels indicated in the service advertisement 120. The association request may enable the first device 104 to associate with the second device 106. In one implementation, the second device 106 may transmit the negotiation message or the association request after the NAN discovery window.

In another particular aspect, the electronic devices of each data link group may not include NAN data link group attributes of the NAN-DL attributes 180 in service advertisements. For example, the first device 104 may not include the one or more NAN data link group attributes of the NAN-DL attributes 180 in the service advertisement 120 and may transmit the service advertisement 120 to the electronic devices of the NAN during the NAN discovery window. The second device 106 may receive the service advertisement 120 and may transmit a service discovery follow-up message in response to receiving the service advertisement 120. The service discovery follow-up message may request or indicate a request additional information regarding the service of the service advertisement 120. The additional information may include the NDL communication schedule, such as the one or more logical channels of the logical channels 150. In one implementation, the second device 106 may transmit the service discovery follow-up message during the NAN discovery window. In another implementation, the second device 106 may transmit the service discovery follow-up message after the NAN discovery window.

Electronic devices participating in a particular data link group may monitor the particular communication channel during a beginning portion (e.g., a paging window) of each of the one or more transmission windows. For example, the first device 104 and the second device 106 may monitor the NAN communication channel during a paging window that begins when a NAN discovery window ends. As another example, the first device 104 and the second device 106 may monitor a particular communication channel corresponding to each of the logical channels 150 during a paging window of each of one or more corresponding transmission windows. In some examples, particular transmission windows may not have paging windows. For example, one or more channels may be used to support high throughput of data. These high throughput channels, described herein with reference to FIG. 6, may not include paging windows or may not include a paging window in each transmission window. The high throughput channels may periodically include a paging window once every period of the high throughput channel. For example, a high throughput channel may include a paging window in every other transmission window or in every third transmission window. More data may be transferred in a transmission window that does not include a paging window since a portion of the transmission window is not reserved for paging.

In a particular aspect, electronic devices participating in a data link group may monitor a corresponding communication channel during at least a first number of paging windows of each of one or more corresponding transmission windows. For example, a first logical channel of the logical channels 150 may correspond to a first communication channel and one or more transmission windows. The subscriber logic 134 of the second device 106 may monitor the first communication channel during at least a first percentage (e.g., 50%) of paging windows of the one or more transmission windows. For example, the subscriber logic 134 of the second device 106 may monitor the first communication channel during a first paging window of the one or more transmission windows and may refrain from monitoring the first communication channel during a second paging window of the one or more transmission windows. The first paging window and the second paging window may occur during the same discovery period or during distinct discovery periods. As referred to herein, a "discovery period" may refer to a time period between an end of a first discovery window and a beginning of a next discovery window. Additionally or alternatively, the electronic devices participating in the data link group may monitor the corresponding communication channel during at least a minimum percentage of the paging windows. For example, the subscriber logic 134 of the second device 106 may monitor the first communication channel during at least a second percentage (e.g., 25%) of paging windows of the one or more transmission windows.

The provider logic 130 of the first device 104 may generate a paging message 128 in response to determining that the first device 104 has data to be transmitted to the second device 106. The paging message 128 may indicate that the first device 104 has data to transmit to the second device 106. For example, the paging message 128 may indicate one or more "recipients," such as the second device 106, that are scheduled to receive data from the first device 104.

The provider logic 130 of the first device 104 may transmit the paging message 128 via a first communication channel during a first paging window of a first transmission window. The provider logic 130 of the first device 104 may transmit the paging message 128 via the transceiver 136 of the first device 104. The first communication channel and the first transmission window may correspond to a first logical channel of the logical channels 150, such as the particular logical channel identified by the particular service attribute. In a particular aspect, the first communication channel, such as the NAN communication channel, and the first transmission window may correspond to the basic channel. In a particular aspect, the paging message 128 may include an ad-hoc traffic indication message (ATIM), a bloom filter, or a media access control (MAC) address list, or another message. For example, the paging message 128 may be transmitted during an ATIM window at the beginning of the first transmission window.

In other aspects, the first device 104 may transmit (or initiate transmission of) the paging message 128 via the first communication channel at a first time during the first paging window based on a value. The value may be randomly generated or pseudo-randomly generated. For example, the value may be randomly generated by a random number generator or a pseudo-random number generator. The value may indicate an offset from a beginning of the first paging window. To illustrate, the provider logic 130 of the first device 104 may randomly generate the value and transmit the paging message 128 via the first communication channel during the first paging window. An amount of time between the beginning of the first paging window and the first time (the time of transmission of the paging message 128) may be based on the value.

In some aspects, the first device may be unable to transmit the paging message 128 during the first paging window. For example, the first communication channel may be busy or in use at the first time during the first paging window and the first device may be unable to transmit the paging message 128. To illustrate, the first device 104 may not be able to successfully transmit the paging message 128 via the first communication channel during the first paging window because the third device 108 may be transmitting a second paging message via the first communication channel during the first paging window. In a particular aspect, the first device 104 may transmit the paging message 128 during a subsequent paging window if the first device 104 is unable to send the paging message 128 via the first commination channel during the first paging window. For example, the first device 104 may transmit the paging message 128 during a next or subsequent paging window of the first communication channel, such as a second paging window of a second transmission window. The second transmission window may be included in the set of transmission windows.

In some aspects, multiple electronic devices of the data link group may attempt (or contend) to transmit paging messages via the first communication channel during the paging window. For example, the first device 104 and the third device 108 may both attempt to transmit a paging message to the second device 106 during a first paging window. In a particular aspect, the first device 104 and the third device 108 may have already transmitted or received synchronizations beacons as explained above, and thus a first clock of the first device 104 and a second clock of the third device 108 may be synchronized. The first device 104 may generate a first value indicating a first offset from a beginning of the first paging window. The third device 108 may generate a second value indicating a second offset from the beginning of the first paging window. The first device 104 and the third device 108 may each include a random number generator or a pseudo-random number generator configured to generate values, such as the first value and the second value. The first value and the second value may be randomly generated by the random number generators or the pseudo-random number generators of the first device 104 and the third device 108, respectively. The first device 104 may attempt to transmit a first paging message to the second device 106 at a first time (determined based on the first value) during the first paging window and the third device 108 may attempt to transmit a second paging message at a second time (determined based on the second value) during the first paging window. Because the first time and the second time are different, the first communication channel may be available at the first time and the second time, and the first device 104 and the third device 108 may be able to transmit the corresponding paging messages. Thus, transmitting paging messages at randomly generated times during a particular paging window may allow for an orderly transmission of multiple paging messages and may limit the communication channel being busy or in use when a particular device transmits a particular paging message.

In a particular aspect, a device may detect that a particular communication channel is in use and the device may employ contention procedures. For example, the first device 104 may determine that the first communication channel is in use at the first time during the first paging window. The first device 104 may update the first value to a third value in response to determining that the first communication channel is in use at the first time. The third value may be less than the first value and may indicate a third offset from a beginning of a second paging window. The first device 104 may transmit the first paging message at a third time during the second paging window based on the third value. Updating the first value to the third value may allow the first device 104 to transmit a paging message during a subsequent paging window, such as the second paging window, if the first device 104 determines that the first communication channel is in use during the first paging window. In a particular aspect, the first device 104 may transmit the first paging message during the second paging window before the third device 108 transmits a third paging message during the second paging window.

The subscriber logic 134 of the second device 106 may receive the paging message 128 via the transceiver 136 of the second device 106. The second device 106 may remain in an active operating mode during a remaining portion (e.g., a data transmission window) of the first transmission window in response to receiving the paging message 128. For example, the subscriber logic 134 of the second device 106 may monitor the first communication channel during the data transmission window in response to receiving the paging message 128 and determining that the paging message 128 indicates the second device 106 is scheduled to receive data from the first device 104. In examples where the first communication channel corresponds to a high throughput channel, the subscriber logic 134 may monitor the first communication channel during multiple transmission windows that occur after the paging message 128 (e.g., an indication of an active traffic session) is received because some transmission windows may not include paging windows. In a particular aspect, the subscriber logic 134 of the second device 106 (or the provider logic 130 of the first device 104) may change a channel of the transceiver 136 of the second device 106 (or the first device 104) to the first communication channel to monitor the first communication channel during the data transmission window. In a particular aspect, the subscriber logic 134 of the second device 106 (or the provider logic 130 of the first device 104) may monitor the NAN communication channel during a paging window of the basic channel by continuing to monitor the NAN communication channel after an end of a NAN discovery window. The subscriber logic 134 of the second device 106 (or the provider logic 130 of the first device 104) may thus avoid a wakeup penalty that may be incurred by switching from refraining from monitoring a communication channel subsequent to the NAN discovery window to monitoring the communication channel during a paging window.

The provider logic 130 of the first device 104 may remain in the active operating mode during the data transmission window in response to determining that the paging message 128 has been transmitted during the first paging window. For example, the provider logic 130 of the first device 104 may monitor the first communication channel during the data transmission window in response to determining that the paging message 128 has been transmitted during the first paging window. The provider logic 130 of the first device 104 may transmit data 122 via the first communication channel during the data transmission window. For example, the provider logic 130 of the first device 104 may transmit the data 122 via the transceiver 136 of the first device 104.

In a particular aspect, the provider logic 130 of the first device 104 may begin transmitting the data 122 via the first communication channel at the beginning of the transmission window (i.e., without a paging window). For example, the provider logic 130 of the first device 104 may transmit the data 122 via the transceiver 136 of the first device 104. The provider logic 130 of the first device 104 may transmit the data 122 via the first communication channel in response to receiving the subscribe message 124 from the second device 106. In this aspect, the first device 104 may transmit the data 122 without transmitting the paging message 128. In other aspects, the first device 104 may wait until after the paging window to begin transmitting the data 122.

In a particular aspect, the provider logic 130 of the first device 104, the subscriber logic 134 of the second device 106, or both, may perform a "capabilities exchange" prior to the provider logic 130 transmitting the data 122 to the second device 106. For example, the provider logic 130 of the first device 104 may transmit first communication information of the first device 104 to the second device 106, the subscriber logic 134 of the second device 106 may transmit second communication information of the second device 106 to the first device 104, or both. The first communication information, the second communication information, or both, may include security information, such as group keys or common network keys. For example, the first communication information may include a group key or a common network key corresponding to the data link group or the NAN.

In a particular aspect, the subscriber logic 134 of the second device 106 may transmit a capabilities message 146 to the first device 104 via the first communication channel during the first paging window. Additionally, the provider logic 130 of the first device 104 may transmit a capabilities message 144 to the second device 106 via the first communication channel during the first paging window. The capabilities message 146 (or the capabilities message 144) may indicate communication information of the second device 106 (or the first device 104). For example, the capabilities message 144 (a first capabilities message) may indicate the first communication information of the first device 104. The capabilities message 146 (a second capabilities message) may indicate the second communication information of the second device 106. In another particular aspect, the capabilities message 144, the capabilities message 146, or both, may be sent via the NAN communication channel after the discovery window.

In another particular aspect, the provider logic 130 of the first device 104, the subscriber logic 134 of the second device 106, or both, may perform the capabilities exchange by exchanging at least one of a probe request and a probe response. For example, performance of the capabilities exchange may include the first device 104 transmitting a probe request to the second device 106 and receiving a probe response from the second device 106. At least one of the probe request and the probe request may indicate the first communication information, the second communication information, or both. In an alternate aspect, the provider logic 130 of the first device 104, the subscriber logic 134 of the second device 106, or both, may perform the capabilities exchange by exchanging at least one of an association request and an association response. For example, performance of the capabilities exchange may include the first device 104 transmitting an association request to the second device 106 and receiving an association response from the second device 106. At least one of the association request and the association request may indicate the first communication information, the second communication information, or both.

In a particular aspect, the capabilities exchange may be performed during the first paging window. For example, the provider logic 130 of the first device 104 (or the subscriber logic 134 of the second device 106) may receive the capabilities message 146 (or the capabilities message 144) via the first communication channel during the first paging window. The provider logic 130 of the first device 104 may store the first communication information of the first device 104, the second communication information of the second device 106, or both, in a memory of the first device 104, and the subscriber logic 134 of the second device 106 may store the first communication information of the first device 104, the second communication information of the second device 106, or both, in a memory of the second device 106.

The provider logic 130 of the first device 104 may transmit the data 122 based on the first communication information, the second communication information, or both. For example, the provider logic 130 of the first device 104 may encrypt the data 122 based on security information of the first device 104, security information of the second device 106, or both, prior to transmitting the data 122.

In a particular aspect, the service advertisement 120 may indicate a media access control (MAC) address 154 of the first device 104. The subscriber logic 134 of the second device 106 may transmit the capabilities message 146, the subscribe message 124, or both, based on the MAC address 154. For example, the subscriber logic 134 of the second device 106 may generate an internet protocol (IP) address, such as an IP version 6 address, based on the MAC address 154 and may transmit the capabilities message 146, the subscribe message 124, or both, based on the IP address. In a particular aspect, the subscriber logic 134 of the second device 106 may generate the IP address based on the MAC address 154 by concatenating a first set of binary numbers, such as "1111111010" and fifty four "0"s, with the MAC address 154, as described with reference to (linden, R. and S. Deering, "IP Version 6 Addressing Architecture," Request for Comments (RFC) 4291, February 2006.

In a particular aspect, the provider logic 130 of the first device 104 may determine an IP address and may transmit the ACK 126, the paging message 128, the capabilities message 144, the data 122, or a combination thereof, based on the IP address. In a particular aspect, the subscribe message 124 may indicate a MAC address 156 of the second device 106. The provider logic 130 of the first device 104 may transmit the ACK 126, the paging message 128, the capabilities message 144, the data 122, or a combination thereof, based on the MAC address 156. For example, the provider logic 130 of the first device 104 may generate the IP address based on the MAC address 156 and may transmit the ACK 126, the paging message 128, the capabilities message 144, the data 122, or a combination thereof, based on the IP address. In other aspects, the provider logic 130 of the first device 104 may generate the IP address using other IP address generation methods. For example, the provider logic 130 of the first device 104 may use a random number generator (or a pseudo-random number generator) to generate the IP address.

The subscriber logic 134 of the second device 106 may receive the data 122 via the first communication channel during the data transmission window. For example, the subscriber logic 134 of the second device 106 may receive the data 122 via the transceiver 136 of the second device 106. In a particular aspect, the transceiver 136 of the second device 106 may receive the data 122 and may provide the data 122 to the subscriber logic 134 of the second device 106 in response to determining that the subscriber logic 134 of the second device 106 is monitoring the first communication channel during the data transmission window.

In a particular aspect, the provider logic 130 of the first device 104 may not transmit a paging message during the first paging window. The first device 104 may transition to a low-power operating mode, such as a sleep mode, during the data transmission window in response to determining that no paging message has been transmitted by the provider logic 130 of the first device 104 during the first paging window. For example, the provider logic 130 of the first device 104 may refrain from monitoring the first communication channel during the data transmission window in response to determining that no paging message has been transmitted during the first paging window. In examples where the first communication channel is a high throughput channel, the provider logic 130 of the first device 104 may refrain from monitoring the first communication channel until a transmission window that includes a paging window occurs in response to determining that no paging message has been transmitted during the first paging window.

The second device 106 may transition to a low-power operating mode, such as a sleep mode, during the data transmission window in response to determining that no paging message has been received during the first paging window that indicated the second device 106 is scheduled to receive data. For example, the subscriber logic 134 of the second device 106 may refrain from monitoring the first communication channel during the data transmission window in response to determining that no paging message has been received during the first paging window that indicated the second device 106 is scheduled to receive data. In examples where the first communication channel corresponds to a high throughput channel, a device may refrain from monitoring a communication channel during transmission windows that occur after a paging window during which no paging message that indicates the device is scheduled to receive data has been received. For example, the subscriber logic 134 may determine which transmission windows of the first communication channel include paging windows. In response to determining that no paging message has been received during the first paging window, or that no received paging message indicated that the second device 106 is scheduled to receive data, the subscriber logic 134 may refrain from monitoring the first communication channel during transmission windows subsequent to the first paging window. The subscriber logic 134 may subsequently monitor the first communication channel during a transmission window that includes a second paging window.

In a particular aspect, the transceiver 136 of the second device 106 (or the first device 104) may receive data packets, such as the data 122, via the first communication channel during the data transmission window and may refrain from providing the data packets to the subscriber logic 134 of the second device 106 (or to the provider logic 130 of the first device 104) in response to determining that the subscriber logic 134 of the second device 106 (or the provider logic 130 of the first device 104) is refraining from monitoring the first communication channel during the data transmission window.

In a particular aspect, the transceiver 136 may provide the data packets to a wireless interface and the wireless interface may refrain from providing the data packets to the subscriber logic 134 of the second device 106 (or to the provider logic 130 of the first device 104) in response to determining that the subscriber logic 134 of the second device 106 (or the provider logic 130 of the first device 104) is refraining from monitoring the first communication channel during the data transmission window.

In a particular aspect, the wireless interface or the transceiver 136 may discard the data packets in response to determining that the subscriber logic 134 of the second device 106 (or the provider logic 130 of the first device 104) is refraining from monitoring the first communication channel during the data transmission window. In a particular aspect, the wireless interface may provide the data packets to the subscriber logic 134 of the second device 106 (or the provider logic 130 of the first device 104) in response to determining that the subscriber logic 134 of the second device 106 (or the provider logic 130 of the first device 104) is monitoring the first communication channel during the data transmission window.

In a particular aspect, the provider logic 130 of the first device 104 and the subscriber logic 134 may exchange data via multiple logical channels of the logical channels 150. For example, each logical channel may correspond to a distinct data session. In a particular aspect, a first transmission window of a first logical channel of the logical channels 150 at least partially overlaps a second transmission window of the second logical channel. In this aspect, the transceiver 136 of the first device 104 and the transceiver 136 of the second device 106 may be communicating via multiple communication channels, such as a first communication channel corresponding to the first logical channel and a second communication channel corresponding to the second logical channel.

In a particular aspect, the paging message 128 may include an address list indicating the electronic devices scheduled to receive data from the first device 104. These electronic devices may be referred to as recipients, targets, or intended recipients. The address list may be represented by a traffic indication map (TIM), a Bloom filter, a MAC address list, or in some other manner. In a particular aspect, a value of a particular field of the paging message 128 may indicate whether the address list is represented by a TIM, by a Bloom filter, or a MAC address list. The subscriber logic 134 of the second device may determine whether the address list is represented by the TIM, the Bloom filter, or the MAC address list based on the value (e.g., 0 or 1) of the particular field.

The TIM may be a bitmap that indicates whether particular electronic devices are scheduled to receive the data to be transmitted, such as the data 122. Each bit of the TIM may correspond to a different electronic device of the data link group, and a value of each bit may indicate whether or not the corresponding device is scheduled to receive the data 122. A correspondence between the bit of the TIM and each electronic device may be based on an association identifier (AID). For example, the second device 106 may associate with the first device 104 and the electronic devices 104, 106 may generate and exchange AIDs. To illustrate, the second device 106 may associate with the first device 104 and may receive a first AID (e.g., 2) from the first device 104. The electronic devices 108 and 110 may receive distinct AIDs (e.g., 3 and 4, respectively) during association with the first device 104. The AIDs may be used by the electronic devices 106, 108, 110 to identify corresponding bits in the TIM received from the first device 104. For example, a second bit of the TIM may correspond to the second device 106 due to the AID of 2. In this example, a third bit and a fourth bit of the TIM may correspond to the electronic devices 108 and 110, respectively (a first bit of the TIM may be reserved).

Each of the electronic devices 106, 108, and 110 may determine whether it is scheduled to receive the data 122 based on the corresponding bit in the TIM received from the first device 104. For example, a determination that the second device 106 is scheduled to receive the data 122 may be based on the second bit of the TIM having a logical value of one, and a determination that the electronic devices 108 and 110 are not scheduled to receive the data 122 may be based on the third bit and the fourth bit having logical zero values.

In a particular aspect, the paging message 128 may include a Bloom filter that represents the address list. The Bloom filter is a data structure, such as a string of bits, that indicates membership in a set, such as a set of devices scheduled to receive the data 122, without explicitly identifying members of the set. The Bloom filter may be smaller and may use less storage space than a TIM and thus may reduce overhead in the networks and may reduce power consumption incurred by transmitting the Bloom filter as compared to transmitting the TIM. An electronic device may be indicated as scheduled to receive the data 122 in the Bloom filter using a set of hash functions corresponding to the Bloom filter. For example, the Bloom filter may be a bit array of m bits that are initialized to a logical zero value, and the Bloom filter may correspond to a set of k hash functions. To indicate that a particular electronic device is scheduled to receive the data 122, a string of bits corresponding to the particular electronic device may be passed through the k hash functions to generate a set of bit positions, and each bit in the Bloom filter corresponding to the set of bit positions is set to a logical one value. In a particular aspect, the string of bits is a media access control (MAC) address of the particular electronic device. Other electronic devices may be indicated as scheduled to receive the data 122 by determining corresponding sets of bit positions based on corresponding strings of bits, such as MAC addresses, and by setting each bit in the Bloom filter corresponding to the sets of bit positions to a logical one value.

In a particular aspect, a hash function H(j,X,M) representing a jth index hash of a bit string X, such as a MAC address, for a Bloom filter having length M is computed in three steps. A first intermediate result A(j,X) may be determined based on Equation 1.

$$A(j,X)=[j\|X] \tag{Eq. 1}$$

In Equation 1, ∥ represents a concatenation operation and j is represented in one byte. Thus, A(j,X) may represent a concatenation of a one byte index (a jth index) with a MAC address (the bit string X). A second intermediate result B(j,X) may be determined based on Equation 2.

$$B(j,X)=\text{CRC32}(A(j,X))\&0x0000FFFF \tag{Eq. 2}$$

In Equation 2, CRC32( ) is a 32-bit cyclic redundancy check operation defined in a NAN standard. Thus, B(j,X) may represent the last two bytes of a result of a 32-bit CRC operation performed on the first intermediate result A(j,X). The hash function H(j,X,M) may be determined based on Equation 3.

$$H(j,X,M)=B(j,X)\bmod M \tag{Eq. 3}$$

In Equation 3, mod represents a modulo or modulus operation. In this manner, multiple hash functions can be determined for multiple different j indices using Equations 1-3. In other aspects, different hash functions may be used and communicated to the electronic devices of the data link group.

In a particular aspect, a set of four hash functions corresponds to the Bloom filter. A bloom filter index may be included in the paging message 128 to identify (or to indicate) the set of four hash functions that corresponds to the Bloom filter. In a particular aspect, the bloom filter index is a two-bit number that indicates one of four sets of four hash functions determined based on different index values using Equations 1-3. In this aspect, set of hash functions identified (or indicated) by the bloom filter index are shown in Table 1.

TABLE 1

| Bloom Filter | | Hash Functions | | | |
|---|---|---|---|---|---|
| Set | Index (Binary) | 1 | 2 | 3 | 4 |
| 1 | 00 | H(0x00, X, M) | H(0x01, X, M) | H(0x02, X, M) | H(0x03, X, M) |
| 2 | 01 | H(0x04, X, M) | H(0x05, X, M) | H(0x06, X, M) | H(0x07, X, M) |
| 3 | 10 | H(0x08, X, M) | H(0x09, X, M) | H(0x0A, X, M) | H(0x0B, X, M) |
| 4 | 11 | H(0x0C, X, M) | H(0x0D, X, M) | H(0x0E, X, M) | H(0x0F, X, M) |

In the aspect where the paging message 128 includes the Bloom filter, the provider logic 130 of the first device 104 may select a particular set of hash functions to correspond to the Bloom filter and may generate the Bloom filter based on the particular set of hash functions and based on MAC addresses of the electronic devices that are to receive the data 122. For example, the provider logic 130 of the first device 104 may determine that the second device 106 is scheduled to receive the data 122, and the provider logic 130 of the first device 104 may generate the Bloom filter based on the particular set of hash functions and based on the MAC address 156 of the second device 106. The provider logic 130 of the first device 104 may have previously stored the MAC addresses of other electronic devices in memory. For example, the provider logic 130 of the first device 104 may store the MAC address 156 in response to receiving the subscribe message 124.

The Bloom filter, the Bloom filter index, and a size of the Bloom filter may be included in the paging message 128 generated by the provider logic 130 of the first device 104. The Bloom filter index may indicate the particular set of hash functions that corresponds to the Bloom filter (as shown in Table 1). The size of the Bloom filter may indicate a number of bits in the data structure. The size may be determined based on a target false positive percentage corresponding to the Bloom filter. For example, the Bloom filter may generate false positive matches (e.g., may erroneously indicate that a particular device is scheduled to receive the data 122) and a percentage of false positive matches generated by the Bloom filter may be related to the size of the Bloom filter. The provider logic 130 of the first device 104 may determine the size such that the false positive percentage approaches a target false positive percentage. To illustrate, increasing the size of the Bloom filter may decrease the false positive percentage, while decreasing the size of the Bloom filter may reduce the overhead in the networks and reduce the power consumption incurred by transmitting the Bloom filter at a cost of increasing the false positive percentage.

Each electronic device, such as the electronic devices 106, 108, and 110, that receive the paging message 128 may determine whether the electronic device is scheduled to receive the data 122 based on a Bloom filter included in the paging message 128, a set of hash functions indicated by a Bloom filter index included in the paging message 128, and a corresponding MAC address. For example, the subscriber logic 134 of the second device 106 may determine a set of bit positions by passing the MAC address 156 through the set of hash functions. The subscriber logic 134 of the second device 106 may compare bit(s) in the Bloom filter corresponding to each of the set of bit positions to a particular value, such as a logical one value. If the bit(s) corresponding to the set of bit positions each have the particular value (the logical one value), the subscriber logic 134 of the second device 106 may determine that the second device 106 is identified (or indicated) as scheduled to receive the data 122. If one or more of the bit(s) corresponding to the set of bit positions do not have the particular value (e.g., one or more of the bit(s) has a logical zero value), the subscriber logic 134 of the second device 106 may determine that the second device 106 is not identified (or indicated) as scheduled to receive the data 122.

In a particular aspect, the paging message 128 may include a MAC address list including a plurality of MAC addresses that represents the address list. Each MAC address of the plurality of MAC addresses may correspond to a different electronic device of the data link group. Each MAC address or a value associated with each MAC address may indicate whether or not the corresponding device is scheduled to receive the data 122. Each of the electronic devices 106, 108, and 110 may determine whether it is scheduled to receive the data 122 based on the MAC addresses in the MAC address list received from the first device 104. For example, a determination that the second device 106 is scheduled to receive the data 122 may be based on a first MAC address of the MAC address list matching a MAC address of the second device 106. Additionally or alternatively, the determination that the second device 106 is scheduled to receive the data 122 may be based on a value corresponding to the first MAC address. In one implementation, a logical zero value may indicate the device is not scheduled to receive the data 122 and a logical one value may indicate the device is scheduled to receive the data 122.

In some aspects, the paging message 128 may include a quality of service (QoS) indicator. The QoS indicator may indicate a type, a priority, or both, of the data 122. For example, the QoS indicator may indicate that the type of the data 122 is video data, voice data, audio data, background data, or a combination thereof. As another example, the QoS indicator may indicate that the data 122 has high, medium, or low priority. To illustrate, the first device 104 may transmit the paging message 128 with a QoS indicator that indicates that the data type is video data, that the data has a high priority, or both.

In a particular aspect, the subscriber logic 134 of the second device 106 may transmit a trigger frame during the data transmission window based on receiving the paging message 128 during the first paging window. The trigger frame may indicate that the subscriber logic 134 of the second device 106 is ready to receive the data 122. In a particular aspect, the capabilities message 146 may operate as the trigger frame. For example, the provider logic 130 of the first device 104 may transmit the data 122 in response to receiving the capabilities message 146.

In a particular aspect, a power-save poll (PS-POLL) message may operate as the trigger frame. For example, the subscriber logic 134 of the second device 106 may, in response to receiving the paging message 128 during the first paging window, generate the PS-POLL message in a similar manner to generation of a PS-POLL message in a traditional access point (AP) based wireless network. However, the subscriber logic 134 of the second device 106 may generate the PS-POLL message as a broadcast message, as compared to a unicast PS-POLL message in the traditional AP based wireless network. In a particular aspect, the PS-POLL message may operate as a trigger frame for multiple electronic devices. For example, multiple electronic devices may receive the PS-POLL message and may transmit data to the second device 106 in response to receiving the PS-POLL message. In a particular aspect, the subscriber logic 134 of the second device 106 may set a portion, such as a third octet and a fourth octet, of the PS-POLL message to a particular value, such as "0"s. The subscriber logic 134 of the second device 106 may transmit the PS-POLL message via the first communication channel during the data transmission window. In a particular aspect, the subscriber logic 134 of the second device 106 may transmit the PS-POLL message via the first communication channel during a beginning portion, such as an acknowledgment window, of the data transmission window.

The provider logic 130 of the first device 104 may receive the PS-POLL message during the data transmission window. In response to receiving the PS-POLL message, the provider logic 130 of the first device 104 may transmit the data 122 to the second device 106 via the first communication channel during the data transmission window.

In some aspects, a quality of service null (QoS_NULL) frame may operate as the trigger frame. For example, the subscriber logic 134 of the second device 106 may, in response to receiving the paging message 128 during the first paging window, generate the QoS_NULL frame. In a particular aspect, the QoS_NULL frame may indicate a reverse direction grant (RDG) from the first device 104. For example, value(s) of one or more bits in the QoS_NULL frame may indicate the RDG. The RDG may be similar to a RDG in a physical protocol data unit (PPDU), in accordance with one or more wireless standards or protocols, but may be included in the QoS_NULL frame instead of the PPDU. The RDG may authorize a recipient of the QoS_NULL frame to use a transmit opportunity (tx_op) of a transmitter of the QoS_NULL frame to transmit data during a tx_op of the transmitter. For example, the subscriber logic 134 of the second device 106 may generate a QoS_NULL frame that indicates a RDG and may transmit the QoS_NULL frame to the first device 104 via the first communication channel during the data transmission window. The QoS_NULL frame with the RDG may authorize the first device 104 to transmit a frame of the data 122 to the second device 106 during a tx_op of the second device 106.

The provider logic 130 of the first device 104 may, in response to receiving the QoS_NULL frame, transmit a frame of the data 122 to the second device 106 via the first communication channel during the tx_op of the second device 106. In this manner, the first device 104 may not have to contend for the first communication channel to transmit the frame of the data 122. If the data 122 is a single frame, an entirety of the data 122 may be transmitted from the first device 104 to the second device 106 in response to the QoS_NULL frame. If the data 122 includes more than one frame, the provider logic 130 of the first device 104 may indicate, via one or more bits in the frame of the data 122, that additional frames of the data 122) are to be transmitted. For example, the provider logic 130 of the first device 104 may indicate that additional frames of the data 122 are to be transmitted via a more bit or an end-of-service-period (EOSP) bit.

In response to receiving the frame of the data 122 with an indication that additional frames of the data 122 are to be transmitted, the subscriber logic 134 of the second device 106 may contend for the first communication channel and, upon successful contention, the subscriber logic 134 of the second device 106 may transmit another QoS_NULL frame with a RDG to the first device 104 to cause the first device 104 to transmit another frame of the data 122. This process may be repeated until the provider logic 130 of the first device 104 has transmitted an entirety of the data 122 or until a termination of the data transmission window. In some aspects, the second device 106 may be indicated as scheduled to receive data from multiple other electronic devices. In these aspects, the subscriber logic 134 of the second device 106 may transmit a QoS_NULL frame with a RDG to the multiple electronic devices and may receive data responsive to the QoS_NULL frames from each of the multiple electronic devices. If the subscriber logic 134 of the second device 106 has received a data frame in response to each QoS_NULL frame, and if the data frame does not indicate that more data is to be transmitted, the second device 106 may transition to the low-power operating mode for a remainder of the data transmission window. If at least one data frame indicates that more data is to be transmitted to the second device 106, the second device 106 may remain in the active operating mode and may continue to transmit QoS_NULL frames with RDGs.

In some aspects, a device may prioritize paging messages (e.g., prioritizing one paging message over another paging message) based on QoS indicators. For example, in response to receiving multiple paging messages, the subscriber logic 134 of the second device 106 may prioritize a first paging message over a second paging message based on a QoS indicator of each of the paging messages. To illustrate, the second device 106 may receive the paging message 128 from the first device 104 and may receive the second paging message from the third device 108. The paging message 128 may include a first QoS indicator that indicates the first device 104 has medium priority data for the second device. The second paging message may include a second QoS indicator that indicates the third device 108 has low priority data for the second device 106. The second device 106 may prioritize the paging message 128 over the second paging message based on the first QoS indicator indicating higher priority data than the second QoS indicator. For example, the subscriber logic 134 of the second device 106 may compare the first QoS indicator to the second QoS indicator and determine that the first QoS indicator indicates higher priority data than the second QoS indicator. In a particular aspect the second device may determine a priority of the data based on the QoS indicator. For example, the second device 106 may determine the data has high priority based on the QoS indicator indicating that the type of the data is video data.

The second device 106 may transmit the trigger frame in response to prioritizing the multiple paging messages. For example, the second device 106 may transmit a first trigger frame to the first device 104 in response prioritizing the paging message 128 over the second paging message. The second device 106 may transmit a second trigger frame to the third device 108 after transmitting the first trigger frame or after receiving first data, such as the data 122, from the first device 104.

In some aspects, the subscriber logic 134 of the second device 106 may multicast the trigger frame. For example, the subscriber logic 134 of the second device 106 may transmit a particular trigger frame to multiple device in response to receiving multiple paging messages. In response to multicasting the particular trigger frame to multiple electronic devices, the second device 106 may receive data from the multiple electronic devices. To illustrate, the second device 106 may receive the paging message 128 from the first device 104 and may receive a second paging message from the third device 108. The second device 106 may transmit a particular trigger frame to the first device 104 and to the third device 108 in response to receiving the paging message 128 and the second paging message. The second device 106 may receive the data 122 from the first device 104 and may receive second data from the third device 108 responsive to transmitting the particular trigger frame.

In a particular aspect, the provider logic 130 of the first device 104 may not receive the trigger frame during a beginning portion, such as an acknowledgment window, of the data transmission window after transmitting the paging message 128 during the first paging window. The provider logic 130 of the first device 104 may generate a NULL frame in response to determining that the trigger frame has not been received during the acknowledgment window. The NULL frame may include a preamble, such as a header, without a payload or data portion. In a particular aspect, the NULL frame may be a QoS_NULL frame, which may have a higher priority than other NULL frames. The provider logic 130 of the first device 104 may transmit the NULL frame to the second device 106 via the first communication channel during the data transmission window to provoke the second device 106 to transmit the trigger frame. In a particular aspect, the provider logic 130 of the first device 104 may transmit the NULL frame during an ending portion of the acknowledgment window in response to determining that the trigger frame has not been received during a beginning portion of the acknowledgment window.

The subscriber logic 134 of the second device 106 may, in response to receiving the NULL frame from the first device 104, contend for the first communication channel and, upon successful contention, may transmit the trigger frame to the first device 104 via the first communication channel. In a particular aspect, an action frame may be used as a trigger frame. In one implementation, the action frame may be a public action frame. In response to receiving the trigger frame, the provider logic 130 of the first device 104 may contend for the first communication channel and, upon successful contention, transmit the data 122 to the second device 106 via the first communication channel during the data transmission window.

In a particular aspect, the subscriber logic 134 of the second device 106 may, in response to determining that a time period after a trigger frame is transmitted exceeds a threshold time period and that no data has been received from the first device 104 during the time period, the second device 106 may transition into the low-power operating mode during a remainder of the data transmission window to reduce power consumption.

In a particular aspect, the second device 106 may operate as a provider (or forwarder) of the particular service. For example, the provider logic 130 of the second device 106 may forward the service advertisement 120 to electronic devices of the NAN 102 that are within a single hop count of the second device 106. To illustrate, the provider logic 130 of the second device 106 may transmit the service advertisement 120 to the fourth device 110. A subscriber logic 134 of the fourth device 110 may transmit a subscribe message to the second device 106 in response to the service advertisement 120. The fourth device 110 may thus subscribe to the particular service provided by the first device 104 even though the first device 104 is not within a single hop range of the fourth device 110.

One advantage of the system 100 is a reduction in power consumption at one or more electronic devices of a data link group. Because the internal clocks of the electronic devices of the data link group are synchronized, each electronic device of the data link group may determine a particular time period corresponding to a paging window to transition to the active operating mode. The electronic devices of the data link group are synchronized based on synchronization from the NAN. In the active operating mode, the electronic devices of the data link group may monitor a particular communication channel for an indication of traffic, such as a paging message. If a particular electronic device does not receive a paging message or is not identified in the paging message as scheduled to receive data, the particular electronic device may reduce power consumption by transitioning to the low-power operating mode during a subsequent data transmission window or may perform operations corresponding to other data link groups or other networks during the data transmission window. For example, the second device 106 may transition to the low-power operating mode during a data transmission window based on a determination that no paging message indicating the second device 106 is scheduled to receive data have been received during the paging window. Thus, the second device 106 may conserve power during data transmission windows during which there is no data for the second device 106, as compared to remaining in the active operating mode and substantially continuously monitoring the communication channel for data transmissions.

Additionally, the system 100 may enable the electronic devices 104, 106, 108, and 110 of the NAN 102 to support various levels of throughput, latency or both, for distinct services. For example, the first device 104 may use a first logical channel having a higher number of transmission windows for a first service that has higher latency sensitivity and may use a second logical channel having a lower number of transmission windows for a second service that has lower latency sensitivity. Furthermore, electronic devices may establish multiple data sessions corresponding to a particular service. For example, a particular electronic device may participate in multiple data link groups corresponding to distinct logical channels.

Figure 2:
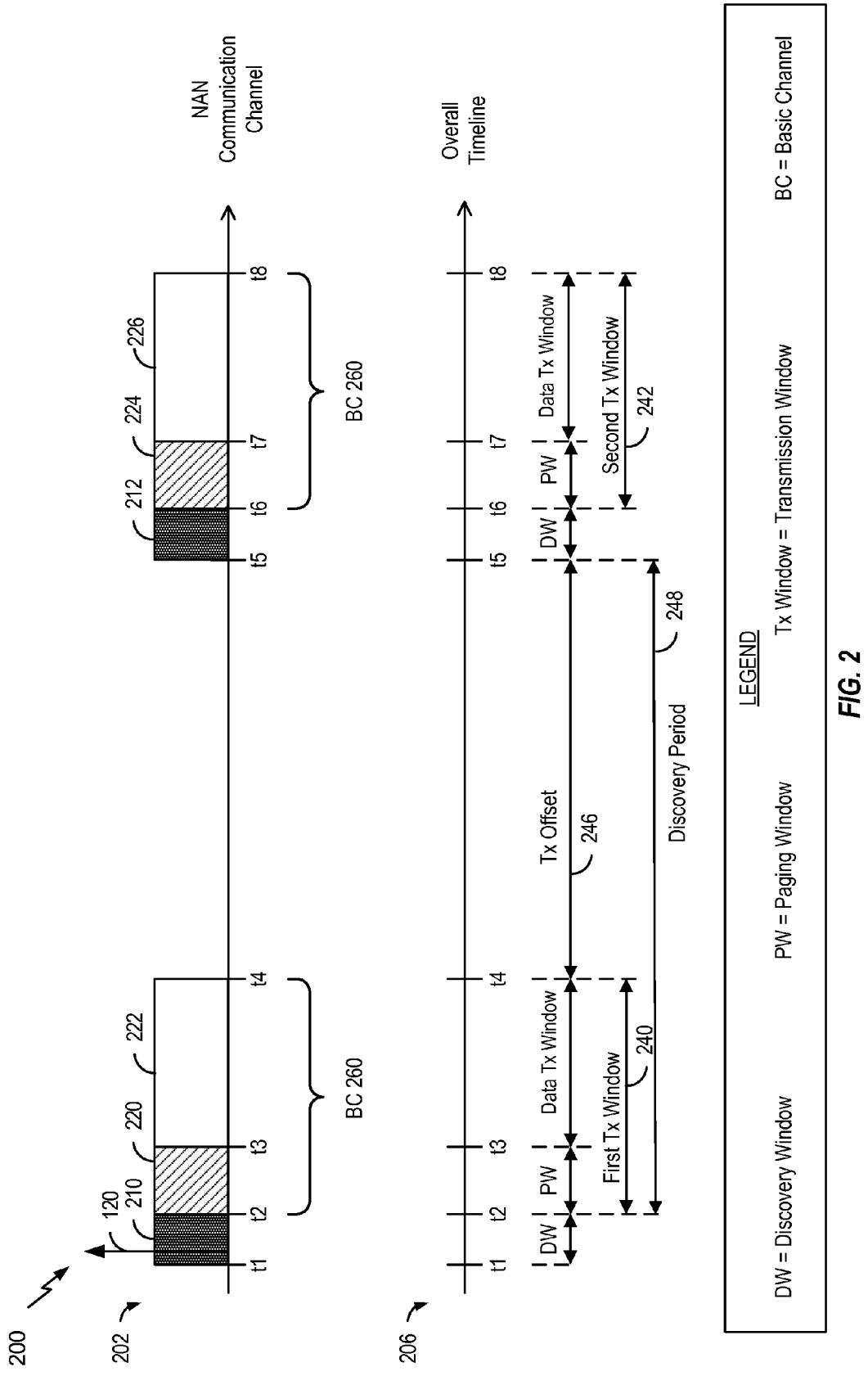
FIG. 2 is a timing diagram corresponding to operation of a particular aspect of the system of FIG. 1.

Referring to FIG. 2, a timing diagram is shown and generally designated 200. In a particular aspect, the timing diagram 200 may correspond to operation of a particular aspect of the system 100 of FIG. 1. The timing and operations shown in FIG. 2 are for illustration and are not limiting. In other aspects, additional or fewer operations may be performed and the timing may be different, for example transmission windows may not contain paging windows.

The timing diagram 200 includes an overall timeline 206 corresponding to a NAN communication channel 202. As illustrated in the timing diagram 200, a first discovery window 210 and a second discovery window 212 may correspond to the NAN communication channel 202. As described with reference to FIG. 1, the discovery windows 210, 212 may be time periods reserved for the electronic devices 104, 106, 108, and 110 to perform discovery operations and synchronization operations corresponding to the NAN 102.

The first discovery window 210 may begin at time t1 and may end at time t2, and the second discovery window 212 may begin at time t5 and end at time t6. The discovery windows 210, 212 may have a same discovery window duration (e.g., a period of time between time t1 and time t2 may be the same as a period of time between time t5 and time t6). The discovery window duration may be determined in accordance with a NAN standard or protocol. A time period between consecutive discovery windows, such as the first discovery window 210 and the second discovery window 212, may be referred to as a discovery period 248. For example, the discovery period 248 may include the time period between an end of the first discovery window 210 and a beginning of the second discovery window 212. In a particular aspect, a duration of the discovery period 248 may be 500 time units (TU), in accordance with a NAN standard or protocol. For example, each TU may correspond to 1024 microseconds (µs), as described in an IEEE 802.11 specification. Accordingly, the duration of the discovery period 248 may be approximately 512 ms. In another particular aspect, the duration of the discovery period 248 may be 512 TU. In one implementation, the logical channels may repeat (e.g., occur more than once) during a particular discovery period. For example, a particular logical channel may occur eight times during the particular discovery period.

During the first discovery window 210, the service advertisement 120 may be transmitted via the NAN communication channel 202. For example, the provider logic 130 of the first device 104 may transmit the service advertisement 120 via the NAN communication channel 202 to advertise a service being provided by, or available from, the first device 104. The service advertisement 120 may identify the logical channels 150 and the MAC address 154, as described with reference to FIG. 1. The subscriber logic 134 of the second device 106 may transmit the subscribe message 124 via the NAN communication channel 202 in response to receiving the service advertisement 120, as described with reference to FIG. 1.

A basic channel 260 may correspond to transmission windows of the NAN communication channel 202 that begin after an end of the discovery windows 210, 212 of the NAN communication channel 202. For example, the basic channel 260 may correspond to a first transmission window 240 and a second transmission window 242. The first transmission window 240 may begin at t2 and may end at t4. The second transmission window 242 may begin at t6 and may end at t8.

In some aspects, each transmission window may include a paging window and a data transmission window. For example, the first transmission window 240 may include a first paging window 220 and a first data transmission window 222 (such as a first data window). As another example, the second transmission window 242 may include a second paging window 224 and a second data transmission window 226 (such as a second data window). The first paging window 220 may begin at t2 and may end at t3. The first data transmission window 222 may begin at t3 and may end at t4. The second paging window 224 may begin at t6 and may end at t7. The second data transmission window 226 may begin at t7 and may end at t8. A duration of a paging window, a duration of a data transmission window, a duration of a transmission window, or a combination thereof, may be determined in accordance with a NAN standard or protocol. In an illustrative implementation, the duration of the paging window, the duration of the data transmission window, the duration of the transmission window, may be approximately 128 TUs, 256 TUs and 512 TUs, respectively. In other aspects, paging windows may not be used. Each transmission window may include a data transmission window. For example, the first transmission window 240 may include the first data transmission window 222 and the first data transmission window 222 may begin at t2 and may end at t4 when the first paging window 220 is absent. The second data transmission window 226 may begin at t6 and may end at t8 when the second paging window 224 is absent.

During a paging window of the basic channel 260, such as the first paging window 220 or the second paging window 224, the provider logic 130 of the first device 104 may transmit the paging message 128 via the NAN communication channel 202, as described with reference to FIG. 1.

The provider logic 130 of the first device 104 may monitor the NAN communication channel 202 during a data transmission window in response to determining that the paging message 128 has been transmitted during a corresponding paging window. For example, the provider logic 130 of the first device 104 may monitor the NAN communication channel 202 during the first data transmission window 222 in response to determining that the paging message 128 has been transmitted during the first paging window 220, as described with reference to FIG. 1.

The subscriber logic 134 of the second device 106 may monitor the NAN communication channel 202 during a data transmission window in response to determining that the paging message 128 has been received during a corresponding paging window. For example, the subscriber logic 134 of the second device 106 may monitor the NAN communication channel 202 during the first data transmission window 222 in response to determining that the paging message 128 has been received during the first paging window 220, as described with reference to FIG. 1.

The provider logic 130 of the first device 104 may transmit the data 122 via the NAN communication channel 202 during the data transmission window, such as the first data transmission window 222 or the second data transmission window 226, as described with reference to FIG. 1. The subscriber logic 134 of the second device 106 may receive the data 122 via the NAN communication channel 202 during the data transmission window, such as the first data transmission window 222 or the second data transmission window 226, as described with reference to FIG. 1.

In a particular aspect, the provider logic 130 of the first device 104 may refrain from monitoring the NAN communication channel 202 during a data transmission window in response to determining that no paging message have been transmitted during a corresponding paging window. For example, the provider logic 130 of the first device 104 may refrain from monitoring the NAN communication channel 202 during the first data transmission window 222 in response to determining that no paging message have been transmitted during the first paging window 220, as described with reference to FIG. 1. In a particular aspect, the first device 104 may transition to a low-power operating mode while refraining from monitoring the NAN communication channel 202.

In a particular aspect, the subscriber logic 134 of the second device 106 may refrain from monitoring the NAN communication channel 202 during a data transmission window in response to determining that no paging message have been received during the corresponding paging window that indicated the second device 106 is scheduled to receive data. For example, the subscriber logic 134 of the second device 106 may refrain from monitoring the NAN communication channel 202 during the first data transmission window 222 in response to determining that no paging message indicating the second device 106 is scheduled to receive data have been received during the first paging window 220, as described with reference to FIG. 1. In a particular aspect, the second device 106 may transition to a low-power operating mode while refraining from monitoring the NAN communication channel 202.

The first device 104, the second device 106, or both devices may reduce power consumption by performing operations based on the timing windows illustrated in the timing diagram 200. For example, the first device 104, the second device 106, or both devices may transition to a low-power operating mode during a data transmission window in response to determining that no paging message has been transmitted or that no paging message has been received during a corresponding paging window.

Figure 3:
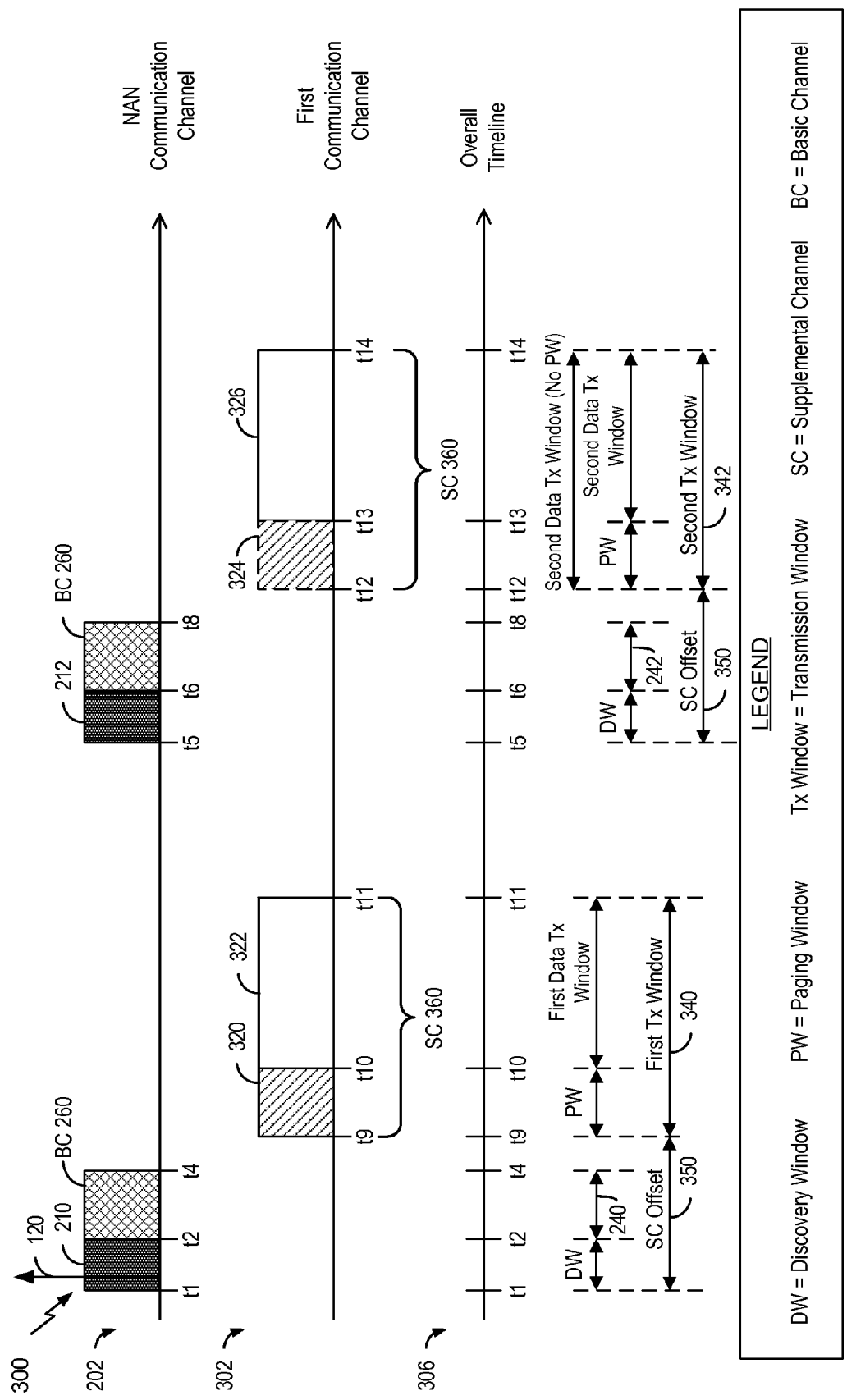
FIG. 3 is a timing diagram corresponding to operation of a particular aspect of the system of FIG. 1.

Referring to FIG. 3, a timing diagram is shown and generally designated 300. In a particular aspect, the timing diagram 300 may correspond to operation of a particular aspect of the system 100 of FIG. 1. The timing and operations shown in FIG. 3 are for illustration and are not limiting. In other aspects, additional or fewer operations may be performed and the timing may be different.

The timing diagram 300 includes an overall timeline 306 corresponding to the NAN communication channel 202 and a first communication channel 302. During the first discovery window 210, the service advertisement 120 may be transmitted via the NAN communication channel 202. The service advertisement 120 may indicate a supplemental channel 360. The supplemental channel 360 may indicate, include, or correspond to the first communication channel 302 and a supplemental channel offset 350. The provider logic 130 of the first device 104 may transmit the service advertisement 120 via the NAN communication channel 202 to advertise a service being provided by the first device 104. The service advertisement 120 may indicate the logical channels 150 and the MAC address 154, as described with reference to FIG. 1. The logical channels 150 may include the supplemental channel 360. For example, the service advertisement 120 may indicate a NAN data link index corresponding to the first communication channel 302 and the supplemental channel offset 350, as described with reference to FIG. 7. The subscriber logic 134 of the second device 106 may transmit the subscribe message 124 via the NAN communication channel 202 in response to receiving the service advertisement 120, as described with reference to FIG. 1.

The supplemental channel (SC) 360 may indicate, identify, represent, or correspond to a first transmission window 340 and a second transmission window 342 of the first communication channel 302. The supplemental channel offset 350 may indicate transmission windows that begin a period of time corresponding to the supplemental channel offset 350 after a beginning of a NAN discovery window. In a particular aspect, the supplemental channel 360 may correspond to a single offset, such as the supplemental channel offset 350, indicating a single transmission window during each discovery period. In an alternate aspect, the supplemental channel (SC) 360 may correspond to multiple offsets indicating multiple transmission windows during each discovery period.

The first transmission window 340 may begin subsequent to an end of the first discovery window 210. For example, the first transmission window 340 may begin at time t9 and may end at time t11. The time t9 may occur a period of time after time t1, the period of time corresponding to the supplemental channel offset 350. The second transmission window 342 may begin subsequent to an end of the second discovery window 212. For example, the second transmission window 342 may begin at time t12 and may end at time t14. The time t12 may occur a period of time after time t5, the period of time corresponding to the supplemental channel offset 350.

In some aspects, each transmission window of the supplemental channel 360 may include a paging window and a data transmission window. For example, the first transmission window 340 may include a first paging window 320 and a first data transmission window 322. As another example, the second transmission window 342 may include a second paging window 324 and a second data transmission window 326. The first paging window 320 may begin at t9 and may end at t10. The first data transmission window 322 may begin at t10 and may end at t11. The second paging window 324 may begin at t12 and may end at t13. The second data transmission window 326 may begin at t13 and may end at t14. A duration of a paging window, a duration of a data transmission window, or both, may be determined in accordance with a NAN standard or protocol. In examples where the first communication channel 302 is a high throughput channel, the second transmission window 342 may not include the second paging window 324. The second data transmission window 326 may begin at t12 and end at t14 when the second paging window 324 is absent. Thus, the second data transmission window 326 may be relatively longer when the second paging window 324 is absent. Therefore, the first communication channel 302 may have a relatively higher data throughput when the second paging window 324 is absent. In one particular aspect, each transmission window of the supplemental channel 360 may not include a paging window.

During a paging window of the basic channel 260, the first paging window 320, the second paging window 324 of the supplemental channel 360, or a combination thereof, the provider logic 130 of the first device 104 may transmit the paging message 128 via the NAN communication channel 202, the first communication channel 302, or both, as described with reference to FIG. 1.

The provider logic 130 of the first device 104 (or the subscriber logic 134 of the second device 106) may monitor the NAN communication channel 202, the first communication channel 302 during a corresponding data transmission window in response to determining that the paging message 128 has been transmitted (or received) during a corresponding paging window of the NAN communication channel 202, the first communication channel 302, or both. For example, the provider logic 130 of the first device 104 (or the subscriber logic 134 of the second device 106) may monitor the first communication channel 302 during the first data transmission window 322 in response to determining that the paging message 128 has been transmitted (or received) during the first paging window 320, as described with reference to FIG. 1. The provider logic 130 of the first device 104 (or the subscriber logic 134 of the second device 106) may transmit (or receive) the data 122 via the NAN communication channel 202, the first communication channel 302, or both, during the corresponding data transmission window, such as the first data transmission window 322 or the second data transmission window 326, as described with reference to FIG. 1.

In a particular aspect, the provider logic 130 of the first device 104 may refrain from monitoring the NAN communication channel 202, the first communication channel 302, or both, during a corresponding data transmission window in response to determining that no paging message has been transmitted during a corresponding paging window of the NAN communication channel 202, the first communication channel 302, or both. For example, the provider logic 130 of the first device 104 may refrain from monitoring the first communication channel 302 during the first data transmission window 322 in response to determining that no paging message has been transmitted during the first paging window 320, as described with reference to FIG. 1. Further, when the second transmission window 342 does not include the second paging window 324, the provider logic 130 of the first device 104 may refrain from monitoring the first communication channel 302 during the second data transmission window 326 in response to determining that no paging message has been transmitted during the first paging window 320.

In a particular aspect, the subscriber logic 134 of the second device 106 may refrain from monitoring the NAN communication channel 202, the first communication channel 302, or both, during a corresponding data transmission window in response to determining that no paging message indicating the second device 106 is scheduled to receive data has been received during the corresponding paging window of the NAN communication channel 202, the first communication channel 302, or both. For example, the subscriber logic 134 of the second device 106 may refrain from monitoring the first communication channel 302 during the first data transmission window 322 in response to determining that no paging message indicating the second device 106 is scheduled to receive data has been received during the first paging window 320, as described with reference to FIG. 1.

Further, the subscriber logic 134 of the second device 106 may refrain from monitoring the first communication channel 302 during the second data transmission window 326 in response to determining that the second transmission window 342 does not include the second paging window 324 and that no paging message indicating the second device 106 is scheduled to receive data has been received during the first paging window 320. In a particular aspect, the first device 104 (or the second device 106) may transition to a low-power operating mode while refraining from monitoring the NAN communication channel 202, the first communication channel 302, or both.

The first device 104, the second device 106, or both devices may reduce power consumption by performing operations based on the timing windows illustrated in the timing diagram 300. For example, the first device 104, the second device 106 or both devices may transition to a low-power operating mode during a data transmission window in response to determining that no paging message has been transmitted or that no paging message has been received during a corresponding paging window. Additionally, the first device 104 and the second device 106 may exchange data via multiple logical channels, such as the basic channel 260 and the supplemental channel 360. Each logical channel may correspond to a distinct data session. Using multiple logical channels to exchange data may also increase throughput and reduce latency.

Figure 4:
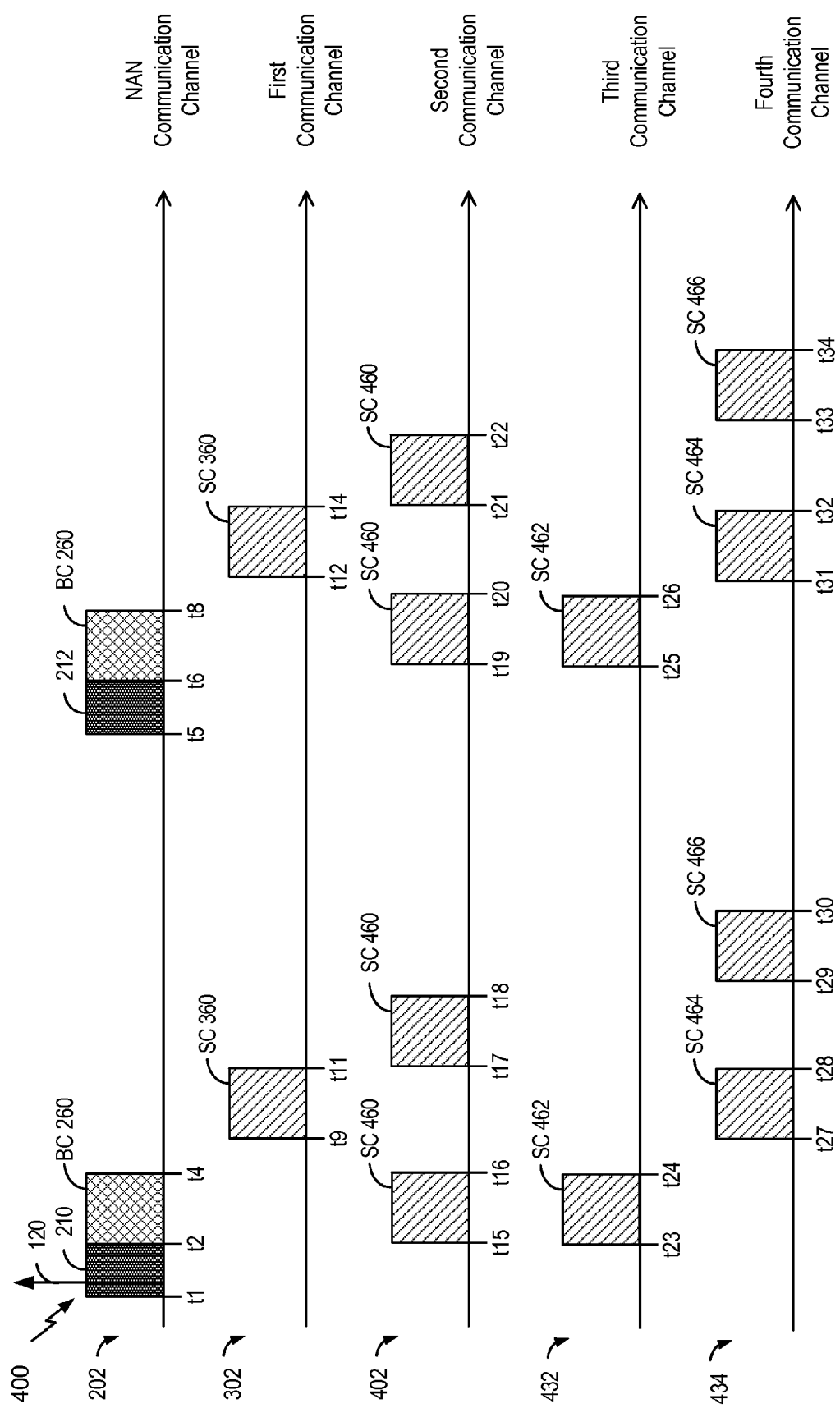
FIG. 4 is a timing diagram corresponding to operation of a particular aspect of the system of FIG. 1.

Referring to FIG. 4, a timing diagram is shown and generally designated 400. In a particular aspect, the timing diagram 400 may correspond to operation of a particular aspect of the system 100 of FIG. 1. The timing and operations shown in FIG. 4 are for illustration and are not limiting. In other aspects, additional or fewer operations may be performed and the timing may be different.

The timing diagram 400 illustrates relative timing of paging windows and transmission windows of the NAN communication channel 202, the first communication channel 302, a second communication channel 402, a third communication channel 432, and a fourth communication channel 434.

The provider logic 130 of the first device 104 may determine that the first device 104 is available to provide a particular service via the logical channels 150, as described with reference to FIG. 1. The logical channels 150 may include one or more of the supplemental channel 360, a supplemental channel 460, a supplemental channel 462, a supplemental channel 464, and a supplemental channel 466. In a particular aspect, the logical channels 150 may include more than five supplemental channels.

The supplemental channel 460 may correspond to a second logical channel. The supplemental channel 460 may correspond to a first supplemental channel offset (e.g., time t1 to time t15, time t5 to time t19), a second supplemental channel offset (e.g., time t1 to time t17, time t5 to time t21), and the second communication channel 402. The supplemental channel 460 may include or correspond to a transmission window corresponding to each supplemental channel offset during a particular discovery period. For example, the supplemental channel 460 may, during a first discovery period that begins at t2, include or correspond to a first transition window beginning at the time t15 and ending at the time t16 and to a second transition window beginning at the time t17 and ending at the time t18. As another example, the supplemental channel 460 may, during a second discovery period that begins at t6, include or correspond to a first transition window beginning at the time t19 and ending at the time t20 and to a second transition window beginning at the time t21 and ending at the time t12.

The supplemental channel 462 may include or correspond to a supplemental channel offset (e.g., time t1 to time t23, time t5 to time t25), and the third communication channel 432. The supplemental channel 462 may include or correspond to a transmission window corresponding to the supplemental channel offset during a particular discovery period. For example, the supplemental channel 462 may, during a first discovery period that begins at t2, include or correspond to a transition window beginning at the time t23 and ending at the time t24. As another example, the supplemental channel 462 may, during a second discovery period that begins at t6, include or correspond to a transition window beginning at the time t25 and ending at the time t26.

The supplemental channel 464 may include or correspond to a supplemental channel offset (e.g., time t1 to time t27, time t5 to time t31), and the fourth communication channel 434. The supplemental channel 464 may include or correspond to a transmission window corresponding to the supplemental channel offset during a particular discovery period. For example, the supplemental channel 464 may, during a first discovery period that begins at t2, include or correspond to a transition window beginning at the time t27 and ending at the time t28. As another example, the supplemental channel 464 may, during a second discovery period that begins at t6, include or correspond to a transition window beginning at the time t31 and ending at the time t32.

The supplemental channel 466 may include or correspond to a supplemental channel offset (e.g., time t1 to time t29, time t5 to time t33), and the fourth communication channel 434. The supplemental channel 466 may include or correspond to a transmission window corresponding to the supplemental channel offset during a particular discovery period. For example, the supplemental channel 466 may, during a first discovery period that begins at t2, include or correspond to a transition window beginning at the time t29 and ending at the time t30. As another example, the supplemental channel 466 may, during a second discovery period that begins at t6, include or correspond to a transition window beginning at the time t33 and ending at the time t34.

In a particular aspect, the provider logic 130 of the first device 104 may select at least one supplemental channel, such as the supplemental channel 360, 460, 462, 464, or 466, to include the logical channels 150 based on the particular service, as described with reference to FIG. 1. For example, the provider logic 130 of the first device 104 may select the supplemental channel 460 in response to determining that a latency sensitivity of the particular service satisfies a latency sensitivity threshold, as described with reference to FIG. 1. As another example, the provider logic 130 of the first device 104 may select at least one of the supplemental channels 360, 462, 464, and 466 in response to determining that the latency sensitivity of the particular service fails to satisfy the latency sensitivity threshold, as described with reference to FIG. 1. The supplemental channel 460 may include a higher number of transmission windows than each of the supplemental channels 360, 462, 464, and 466. The supplemental channel 460 may have a higher throughput, a lower latency, or a combination thereof, than each of the supplemental channels 360, 462, 464, and 466.

During the first discovery window 210, the service advertisement 120 may be transmitted via the NAN communication channel 202. For example, the provider logic 130 of the first device 104 may transmit the service advertisement 120 via the NAN communication channel 202 to advertise availability of the particular service. The service advertisement 120 may indicate the logical channels 150 and the MAC address 154, as described with reference to FIG. 1.

Each transmission window of the supplemental channels 360, 460, 462, 464, and 466 may include a paging window and a data transmission window. A duration of a paging window, a duration of a data transmission window, or both, may be determined in accordance with a NAN standard or protocol.

During a paging window of the basic channel 260, a paging window of one or more of the logical channels 150, or a combination thereof, the provider logic 130 of the first device 104 may transmit the paging message 128 via one or more corresponding communication channels, as described with reference to FIG. 1.

The provider logic 130 of the first device 104 (or the subscriber logic 134 of the second device 106) may monitor the corresponding communication channels during corresponding data transmission windows in response to determining that the paging message 128 has been transmitted (or received) corresponding paging windows of the corresponding communication channels. For example, the provider logic 130 of the first device 104 (or the subscriber logic 134 of the second device 106) may monitor the first communication channel 302 during a first data transmission window of the supplemental channel 360 in response to determining that the paging message 128 has been transmitted (or received) during a first paging window of the supplemental channel 360, as described with reference to FIG. 1. As another example, the provider logic 130 of the first device 104 (or the subscriber logic 134 of the second device 106) may monitor the fourth communication channel 434 during a first data transmission window of the supplemental channel 464 in response to determining that the paging message 128 has been transmitted (or received) during a first paging window of the supplemental channel 464, as described with reference to FIG. 1.

The provider logic 130 of the first device 104 (or the subscriber logic 134 of the second device 106) may transmit (or receive) the data 122 via the corresponding communication channels during corresponding data transmission windows, as described with reference to FIG. 1. For example, the provider logic 130 of the first device 104 (or the subscriber logic 134 of the second device 106) may transmit (or receive) the data 122 via the first communication channel 302 during a first data transmission window of the supplemental channel 360 in response to determining that the paging message 128 has been transmitted (or received) during a first paging window of the supplemental channel 360, as described with reference to FIG. 1. As another example, the provider logic 130 of the first device 104 (or the subscriber logic 134 of the second device 106) may transmit (or receive) the data 122 via the fourth communication channel 434 during a first data transmission window of the supplemental channel 464 in response to determining that the paging message 128 has been transmitted (or received) during a first paging window of the supplemental channel 464, as described with reference to FIG. 1.

In a particular aspect, the provider logic 130 of the first device 104 may refrain from monitoring one or more communication channels during corresponding data transmission windows in response to determining that no paging message has been transmitted during a corresponding paging window. For example, the provider logic 130 of the first device 104 may refrain from monitoring the first communication channel 302 during a data transmission window of the supplemental channel 360 in response to determining that no paging message has been transmitted to devices, such as the second device 106, of the data link group corresponding to the supplemental channel 360 during a paging window of the supplemental channel 360.

In a particular aspect, the subscriber logic 134 of the second device 106 may refrain from monitoring one or more communication channels during corresponding data transmission windows in response to determining that no paging message indicating the second device 106 is scheduled to receive data has been received during the corresponding paging window. For example, the subscriber logic 134 of the second device 106 may refrain from monitoring the first communication channel 302 during a data transmission window of the supplemental channel 360 in response to determining that no paging message indicating the second device 106 is scheduled to receive data has been received during the paging window of the supplemental channel 360. In a particular aspect, the first device 104 (or the second device 106) may transition to a low-power operating mode while refraining from monitoring the first communication channel 302.

The first device 104, the second device 106, or both devices may reduce power consumption by performing operations based on the timing windows illustrated in the timing diagram 400. For example, the first device 104, the second device 106 or both devices may transition to a low-power operating mode during a data transmission window in response to determining that no paging message has been transmitted or that no paging message has been received during a corresponding paging window. Additionally, the first device 104 and the second device 106 may exchange data via multiple logical channels, such as the basic channel 260, the supplemental channels 360, 460, 462, 464, 466, or a combination thereof. Each logical channel may correspond to a distinct data session. Using multiple logical channels to exchange data may also increase throughput and reduce latency.

Figures 5A, 5B:
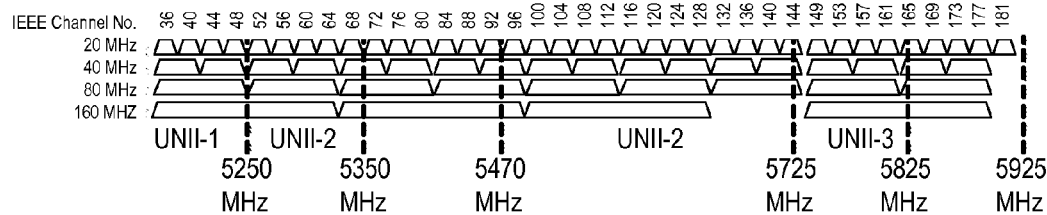
FIG. 5A is a diagram illustrating an example of wireless communication channelization.
FIG. 5B is a table illustrating an example of logical channels.

Referring to FIG. 5A, a diagram illustrating an example of wireless communication channelization is shown and generally designated 500. The diagram 500 indicates that a particular frequency band, such as a 5150-5925 megahertz (MHz) band, may correspond to a plurality of communication channels, each communication channel corresponding to a particular portion of the particular frequency band. In a particular aspect, the plurality of communication channels may include one or more of IEEE communication channels 36, 40, 44, 48, 52, 56, 60, 64, 68, 72, 76, 80, 84, 88, 92, 96, 100, 104, 108, 112, 116, 120, 124, 128, 132, 136, 140, 144, 149, 153, 157, 161, 165, 169, 173, 177, and 181. A particular communication channel of the plurality of communication channels may be a 20 MHz channel, a 40 MHz channel, an 80 MHz channel, or a 160 MHz channel. For example, as illustrated in FIG. 5A, the channel 52 may be a 20 MHz channel beginning at 5250 MHz, a 40 MHz channel beginning at 5250 MHz, or an 80 MHz channel beginning at 5250 MHz.

In a particular aspect, a NAN communication channel, such as the NAN communication channel 202 of FIG. 2, may correspond to a particular communication channel, such as an IEEE communication channel 6 of a 2.4 GHz band, the IEEE communication channel 44, or the IEEE communication channel 104, of the plurality of communication channels. In a particular aspect, the communication channel corresponding to the NAN communication channel may be determined in accordance with a NAN standard or protocol. In a particular aspect, the logical channels 150 of FIG. 1 may correspond to at least one of the IEEE communication channels 36, 52, 104, 116, 132, and 149. In this aspect, each of the IEEE communication channels 36, 52, 104, 116, 132, and 149 may be an 80 MHz channel. In an alternate aspect, the logical channels 150 of FIG. 1 may correspond to at least one of the IEEE communication channels 44, 52, 100, 116, 132, and 149. In this aspect, each of the IEEE communication channels 36, 52, 104, 116, 132, and 149 may be an 80 MHz channel.

Referring to FIG. 5B, a table illustrating an example of logical channels is shown and generally designated 502. The table 502 includes a NAN data link (NDL) index column 504, a channel number column 506, and a supplemental channel offset column 508. In a particular aspect, the table 502 may be determined in accordance with a NAN standard or protocol.

Each row of the table 502 may correspond to a particular logical channel. For example, a row 510 may correspond to a first logical channel, such as the basic channel 260 of FIG. 2. The row 510 may indicate a first NDL index, such as NDL index 0, a first communication channel, such as the communication channel 6, and a first supplemental channel offset, such as 1. In a particular aspect, the service advertisement 120 may include the first NDL index to indicate the first logical channel of the logical channels 150. In an alternate aspect, the service advertisement 120 may not include the first NDL index if the first NDL index corresponds to the basic channel 260, as described with reference to FIG. 1.

In a particular aspect, the provider logic 130 of the first device 104, the subscriber logic 134 of the second device 106, or both, may multiply the first supplemental channel offset (e.g., 1) by a particular number (e.g., 16) to determine a supplemental channel offset (e.g., 16 TUs). The provider logic 130 of the first device 104, the subscriber logic 134 of the second device 106, or both, may determine when a transmission window of the first logical channel begins subsequent to a beginning of a discovery window based on the supplemental channel offset, as described with reference to FIG. 1.

In another particular aspect, a row 512 may correspond to a first supplemental channel, such as the supplemental channel 360 of FIG. 2. The row 512 may indicate a first NDL index, such as NDL index 2, a first communication channel, such as the communication channel 36, and a first supplemental channel offset, such as 2. A row 514 may correspond to a second supplemental channel, such as the supplemental channel 360 of FIG. 2. The row 514 may indicate a second NDL index, such as NDL index 5, a second communication channel, such as the communication channel 52, a second supplemental channel offset, such as 2, and a third supplemental channel offset, such as 18.

Each supplemental channel offset may indicate a transmission window of a corresponding supplemental channel. The second supplemental channel may have a higher number of transmission windows than the first supplemental channel. In a particular aspect, the provider logic 130 of the first device 104 may select the first supplemental channel to include in the logical channels 150, as described with reference to FIG. 1. In this aspect, the service advertisement 120 may include the first NDL index. In an alternate aspect, the provider logic 130 of the first device 104 may select the second supplemental channel to include in the logical channels 150, as described with reference to FIG. 1. In this aspect, the service advertisement 120 may include the second NDL index.

The provider logic 130 of the first device 104 may determine an NDL index corresponding to a particular logical channel based on the table 502. The provider logic 130 of the first device 104 may include the NDL index in the service advertisement 120 to indicate the particular logical channel. The service advertisement 120 may indicate the NDL index using a particular number of bits. The particular number of bits to indicate the NDL index may be independent of a number of supplemental channel offsets corresponding to the particular logical channel. Using the NDL index to indicate the particular logical channel may also reduce a size of the service advertisement 120.

Referring to FIG. 6, a diagram illustrating an example of logical channels is shown and generally designated 600. The diagram 600 includes a table 602 and a table 612. The table 602 includes a NAN data link (NDL) index column 604, a channel number column 606, a channel offset column 608, and a block width column 610. In a particular aspect, the table 602 may be determined in accordance with a NAN standard or protocol. The table 612 includes a NAN data link (NDL) index column 614, a channel number column 616, a channel offset column 618, and a block width column 620. In a particular aspect, the table 612 may be determined in accordance with a NAN standard or protocol.

Each row of the tables 602 and 612 may correspond to a particular logical channel. For example, a row 622 of the table 602 may correspond to a first logical channel, such as the basic channel 260 of FIG. 2. The row 622 may indicate a first NDL index, such as NDL index 0, a first communication channel such as, the communication channel 6, a first supplemental channel offset, such as 1, and a first block width, such as 32 TUs. In a particular aspect, the service advertisement 120 may include the first NDL index (the NDL index 0) to indicate the first logical channel. In a particular aspect, the service advertisement 120 may include the first NDL index if the first NDL index corresponds to one of the logical channels 150 and may not include the first NDL index if the first NDL index corresponds to the basic channel 260, as described with reference to FIG. 1.

In a particular aspect, the provider logic 130 of the first device 104, the subscriber logic 134 of the second device 106, or both, may multiply the first supplemental channel offset (e.g., 1) by a particular number (e.g., 16) to determine a supplemental channel offset (e.g., 16 TUs). The provider logic 130 of the first device 104, the subscriber logic 134 of the second device 106, or both, may determine when a transmission window of the first logical channel begins subsequent to a beginning of a discovery window based on the supplemental channel offset, as described with reference to FIG. 1. Duration of the transmission window may be indicated by the first block width (e.g., 32 TUs).

Rows of the table 602 may correspond to logical channels that have lower throughput, higher latency, or a combination thereof, than logical channels corresponding to rows of the table 612. For example, a row 624 of the table 602 may correspond to a first supplemental channel (e.g., the supplemental channel 360 of FIG. 2). The row 624 may indicate a first NDL index (e.g., 1), a first communication channel, such as the communication channel 36, a first supplemental channel offset (e.g., 2), and a first block width (e.g., 32 TUs). A row 626 of the table 612 may correspond to a second supplemental channel. The row 626 may indicate a second NDL index (e.g., N+2), a second communication channel, such as the communication channel 36, second supplemental channel offsets (e.g., 2, 10, 18, and 26), and a second block width (e.g., 64 TUs). Provider logic, such as the provider logic 130, may determine which transmission windows of a channel include paging windows based on whether a channel is designated as a higher throughput channel or as a lower throughput channel. For example, provider logic may determine that channels listed in the rows of the table 602 include paging windows in every transmission window while channels listed in the rows of the table 612 include paging windows in less than every transmission window (e.g., every other transmission window, every third paging window, etc.). While only two classifications are shown, there may be more than two classifications of paging window configuration. For example, there may be an intermediate throughput classification of channels that includes paging windows less frequently than channels listed in the rows of the table 602 but more frequently than channels listed in the rows of the table 612. As another example, there may be a very high throughput classification of channels that does not include any paging windows. In this example, data is transmitted at the beginning of the data transmission window.

Each supplemental channel offset may indicate a transmission window of a corresponding supplemental channel. The second supplemental channel may correspond to higher throughput, lower latency, or a combination thereof, than the first supplemental channel because the second supplemental channel has a higher number of transmission windows, has transmission windows with a longer duration, or both.

In a particular aspect, the provider logic 130 of the first device 104 may select a supplemental channel from the table 602 in response to determining that a latency sensitivity of a particular service fails to satisfy a particular latency threshold and may select another supplemental channel from the table 612 in response to determining that the latency sensitivity of the particular service satisfies the particular latency threshold, as described with reference to FIG. 1. For example, the provider logic 130 of the first device 104 may select the first supplemental channel to include in the logical channels 150 in response to determining that the latency sensitivity of the particular service fails to satisfy a particular latency threshold. As another example, the provider logic 130 of the first device 104 may select the second supplemental channel to include in the logical channels 150 in response to determining that the latency sensitivity of the particular service satisfies the particular latency threshold.

The provider logic 130 of the first device 104 may determine an NDL index corresponding to a particular logical channel based on the table 602, the table 612, or a combination thereof. The provider logic 130 of the first device 104 may include the NDL index in the service advertisement 120 to indicate the particular logical channel. The service advertisement 120 may indicate the NDL index using a particular number of bits. The particular number of bits to indicate the NDL index may be independent of a number of supplemental channel offsets corresponding to the particular logical channel. Using the NDL index to indicate the particular logical channel may also reduce a size of the service advertisement 120.

Figure 7A:
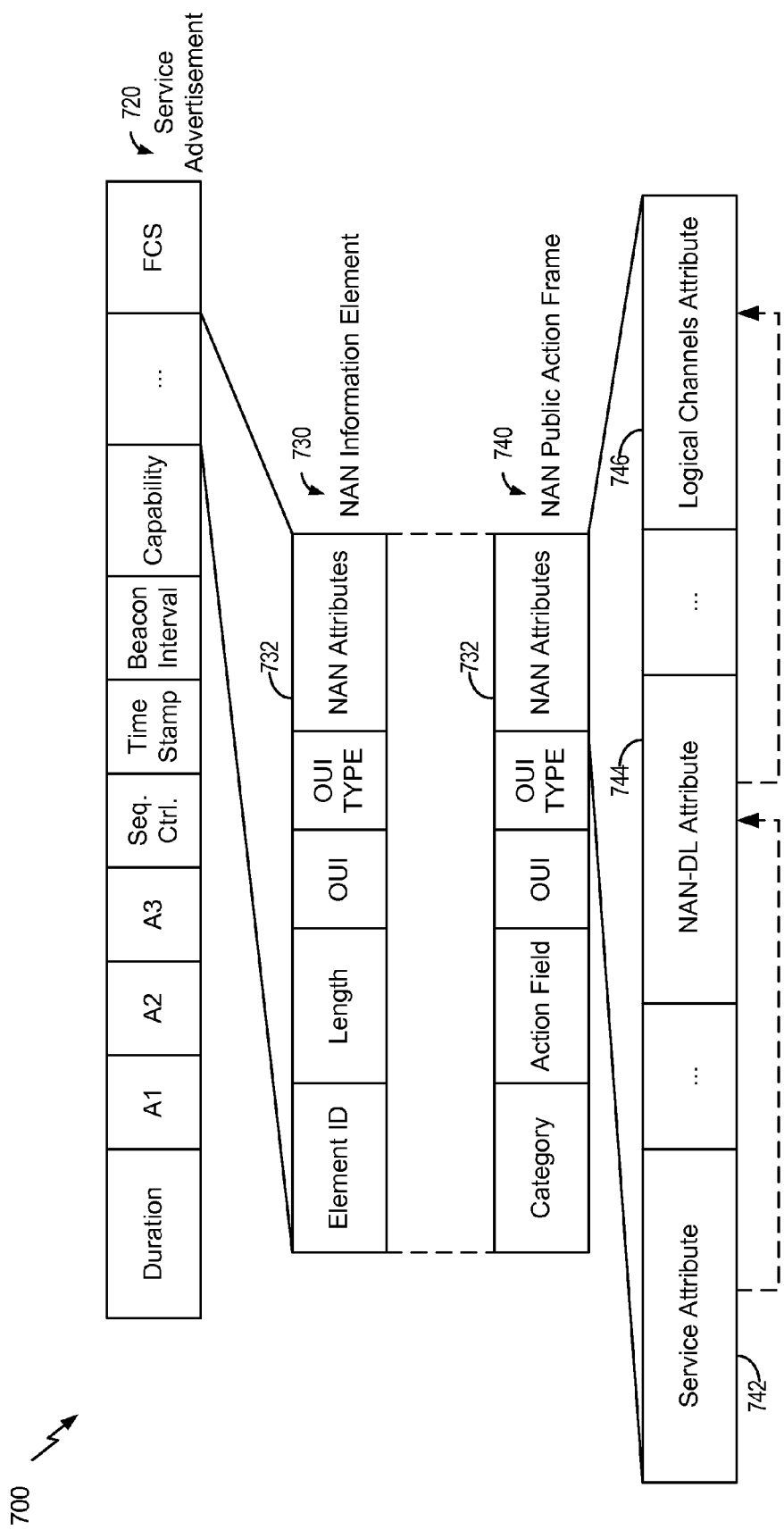

Referring to FIG. 7A, a diagram of a particular aspect of a service advertisement 720 is shown and generally designated 700. In a particular aspect, the service advertisement 720 may correspond to the service advertisement 120 of FIG. 1. The service advertisement 720 may include header fields, such as a duration field, an A1 field, an A2 field, an A3 field, a sequence control (seq. ctl.) field, a time stamp field, a beacon interval field, a capability field, or a combination thereof. The service advertisement 720 may also include a frame check sequence (FCS).

The service advertisement 720 may further include a NAN information element 730 or a NAN public action frame 740. For example, the NAN information element 730 may correspond to a beacon message, and the NAN public action frame 740 may correspond to a NAN service discovery frame. The NAN information element 730 may include an element ID field, a length field, an organizationally unique identifier (OUI) field, an OUI type field, or a combination thereof. The NAN public action frame 740 may include a category field, an action field, an OUI field, an OUI type field, or a combination thereof. Both the NAN information element 730 and the NAN public action frame 740 may include one or more NAN attributes 732.

In the illustrated example, the one or more NAN attributes 732 include a service attribute 742, a NAN-DL attribute 744, and a logical channels attribute 746. The NAN attributes 732 may include more service attributes, more NAN-DL attributes, more logical channel attributes, or a combination thereof. In some examples, the NAN attributes 732 do not include a logical channels attribute. The service attribute may include data descriptive of a service, such as a gaming service, offered by a provider device, such as the first device 104. The service attribute 742 may include an indicator that identifies the NAN-DL attribute 744, as described below with reference to FIG. 7C. The NAN-DL attribute 744 may be descriptive of a NAN-DL used to provide the service described by or corresponding to the service attribute 742. The NAN-DL attribute 744 may include an indicator, such as an index, that identifies a particular logical channel included in the logical channels attribute 746. Alternatively, the NAN-DL attribute 744 may include an indication that selection of the particular logical channel is to be negotiated (or is negotiable), such as via a basic channel, between a provider device and a subscriber device. The provider device may be the first device 104, and the subscriber device may be the second device 106. To illustrate, based on the NAN-DL attribute 744 indicating (e.g., via a reserved value or by not pointing to a logical channel) that a logical channel is to be negotiated (or is negotiable), a provider device and a subscriber device may exchange one or more negotiation messages during a basic channel that occurs after a discovery window during which the service advertisement 720 is transmitted. Based on the negotiation messages, the provider device may select a logical channel for the NAN_DL attribute 744. Thus, the service advertisement 720 may identify one or more services, and one or more NAN data link groups, and the service advertisement 720 may map the one or more services to the one or more NAN-DLs.

In an alternate example, the service advertisement 720 may not map service attributes to NAN-DL attributes. For example, instead of a mapping to a NAN-DL attribute, the service attribute 742 may include an indication, as described in more detail below, that a logical channel used to provide the service described by the service attribute 742 is to be negotiated via a basic channel by a provider device, such as the first device 104, and a subscriber device, such as the second device 106. For example, based on the service attribute 742 indicating (e.g., via a reserved value or by not pointing to a NAN-DL attribute) that a logical channel is to be negotiated, the first device 104 and the second device 106 may exchange one or more negotiation messages during a basic channel that occurs after a discovery window during which the service advertisement 720 is transmitted. Based on the negotiation messages, the first device 104 may select a logical channel for the service attribute 742. In some examples, the NAN attributes 732 may not include the NAN-DL attribute 744.

Referring to FIG. 7B, a diagram of a particular example of a logical channels attribute is shown and generally designated 800. In a particular example, the diagram 800 may correspond to the logical channels 150 of FIG. 1 or to the logical channels attribute 746 of FIG. 7A.

As illustrated in the diagram 800, the logical channels attribute may include at least one of an attribute identifier (ID) field 710, a length field 712, a MAC address field 714, and a supplemental channel (SC) list field 716. The attribute ID field 710 may have a particular size, such as 1 octet. A particular value of the attribute ID field 710 may indicate that logical channels attribute is a logical channels attribute. To illustrate, a message, such as the service advertisement 120 or the service advertisement 720, may include attributes selected from a plurality of attribute types. A particular value, such as hexadecimal value 0x06, included in the attribute ID field 710 may identify the logical channels attribute as a logical channels attribute.

The length field 712 may have a particular size, such as 2 octets. The MAC address field 714 may have a particular size, such as 6 octets. The MAC address field 714 may indicate the MAC address 154, as described with reference to FIG. 1.

The SC list field 716 may have a variable length. The SC list field 716 may indicate the logical channels 150 of FIG. 1. For example, the SC list field 716 may include an NDL index corresponding to each of the logical channels 150, as described with reference to FIG. 5B. The length of the SC list field 716 may be based on a count of the logical channels 150. An absence of the SC list field 716 in the service advertisement 120 may indicate that a particular service is available via a basic channel, such as the basic channel 260 of FIG. 2, and is unavailable via supplemental channels.

The length field 712 may indicate the length of the attribute ID field 710, the length field 712, the MAC address field 714, the SC list field 716, or a combination thereof. For example, the length field 712 may indicate the length of the service advertisement 120. As another example, the length field 712 may indicate the length of the SC list field 716. A particular value of the length field 712 may indicate that the SC list field 716 is absent. For example, a value of 0, 6, or 9 may indicate that the SC list field 716 is absent, as non-limiting examples.

Figure 7C:
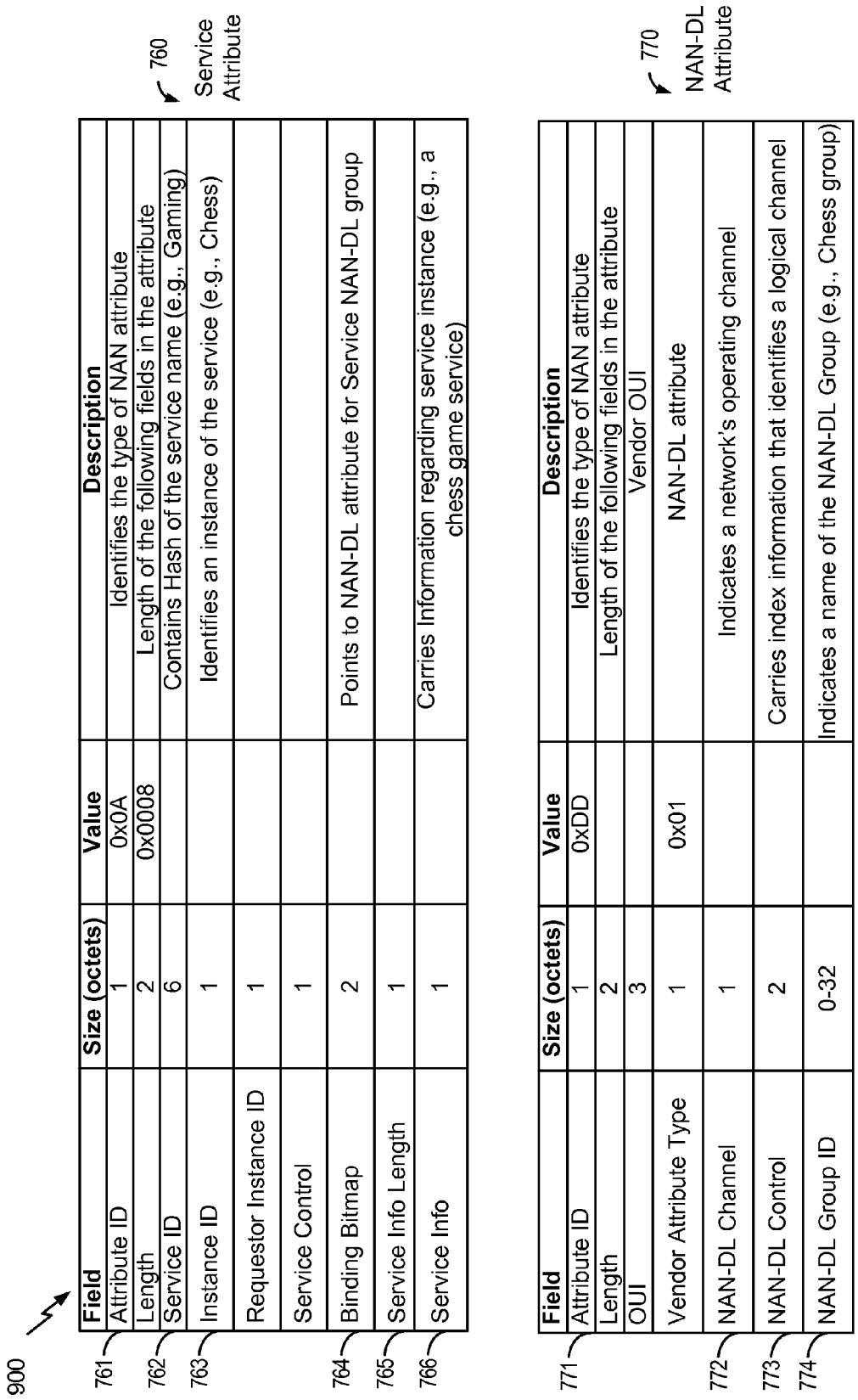

Referring to FIG. 7C, a diagram illustrating particular examples of a service attribute 760 and a NAN-DL attribute 770 is shown and generally designated 900. The service attribute 760 may correspond to one of the service attributes 170 or to the service attribute 742, and the NAN-DL attribute 770 may correspond to one of the NAN-DL attributes 180 or to the NAN-DL attribute 744.

The service attribute 760 may include an attribute ID field 761 that includes a value that identifies the service attribute 760 as a service attribute. To illustrate, a message, such as the service advertisement 120 or the service advertisement 720, may include attributes selected from a plurality of attribute types. A particular value, such as hexadecimal value 0x0A, included in the attribute ID field 761 may identify the service attribute 760 as a service attribute.

The service attribute 760 may further include a length field that includes a value identifying a length of the service attribute 760. The service attribute 760 may further include a service identifier (ID) field 762, such as a service identifier, that includes a value identifying a service described by the service attribute 760. For example, the service ID field 762 may include a value that corresponds to a gaming service or a messaging service. In a particular example, the service ID includes a value corresponding to a hash of a service name, such as "Gaming."

The service attribute 760 may further include an instance identifier (ID) field 763 that identifies an instance of the service described by the service attribute 760. To illustrate, a provider device, such as the first device 104, may support two or more instances of a gaming service. The instance ID field 763 may identify which instance of the gaming service the service attribute 760 describes. For example, the instance ID field 763 may include a first value that corresponds to a chess instance of the gaming service, such as a first instance identifier.

The service attribute 760 may further include a binding bitmap field 764, such as an indicator. The binding bitmap field 764 may include a bitmap that indicates a NAN-DL attribute included in a message with the service attribute 760. That is, the binding bitmap indicates which NAN-DL is used to provide the service (or service instance) described by the service attribute 760. For example, a message (such as the service advertisement 120 or the service advertisement 720) may include one or more NAN-DL attributes. A binding bitmap value of 0x0001 may identify a first NAN-DL attribute included in the message. While the service attribute 760 is shown including the binding bitmap field 764, other types of indicators may be used to indicate a NAN-DL attribute descriptive of a NAN-DL used to provide the service (or service instance).

Alternatively, the binding bitmap field 764 may include a value, such as 0x0000, indicating that a logical channel used to provide the service (or service instance) described by the service attribute 760 is to be negotiated, for example via a basic channel, between a provider device, such as the first device 104, and a subscriber device, such as the second device 106.

The service attribute 760 may further include a requester instance ID field, a service information length field 765 and a service information field 766. The service information length field 765 may include a value indicating a length of the service information field 766. The service information field 766 may include information regarding the service (or service instance) described by the service attribute 760. For example, the service information field 766 may include information describing a chess game service instance. In other examples, service attributes may include more or fewer fields.

The NAN-DL attribute 770 may include an attribute ID field 771 that includes a value that identifies the NAN-DL attribute 770 as a NAN-DL attribute. The NAN-DL attribute 770 further includes a NAN-DL channel field 772 that includes a value indicating which channel the NAN-DL operates on. The NAN-DL attribute 770 may further include a NAN-DL control field 773. The NAN-DL control field 773 may include a value, such as an index, indicating a logical channel in a logical channels list, such as the logical channels 150 or the SC list field 716, used by the NAN-DL. In some examples, a particular value of the NAN-DL control field 773, such as 000 or 111, indicates a basic channel rather than a logical channel in the logical channels list. In some examples, a particular value of the NAN-DL control field 773, such as 000 or 111, indicates that a logical channel is to be negotiated between a provider device, such as the first device 104, and a subscriber device, such as the second device 106. The NAN-DL attribute 770 may include a NAN-DL group ID field 774 that includes a value naming the NAN-DL. For example, the NAN-DL Group ID field 774 may identify the NAN-DL group (e.g., a first data link group) as a "Chess group." The NAN-DL attribute 770 may further include a length field and an OUI field. In other examples, service attributes may include more or fewer fields.

Therefore, the diagram 900 illustrates a service attribute that may indicate a NAN-DL attribute used to provide a service (or service instance) described by the service attribute. Examples of messages that include service attributes that indicate NAN-DL attributes are described below with reference to FIG. 7D.

Figure 7D:
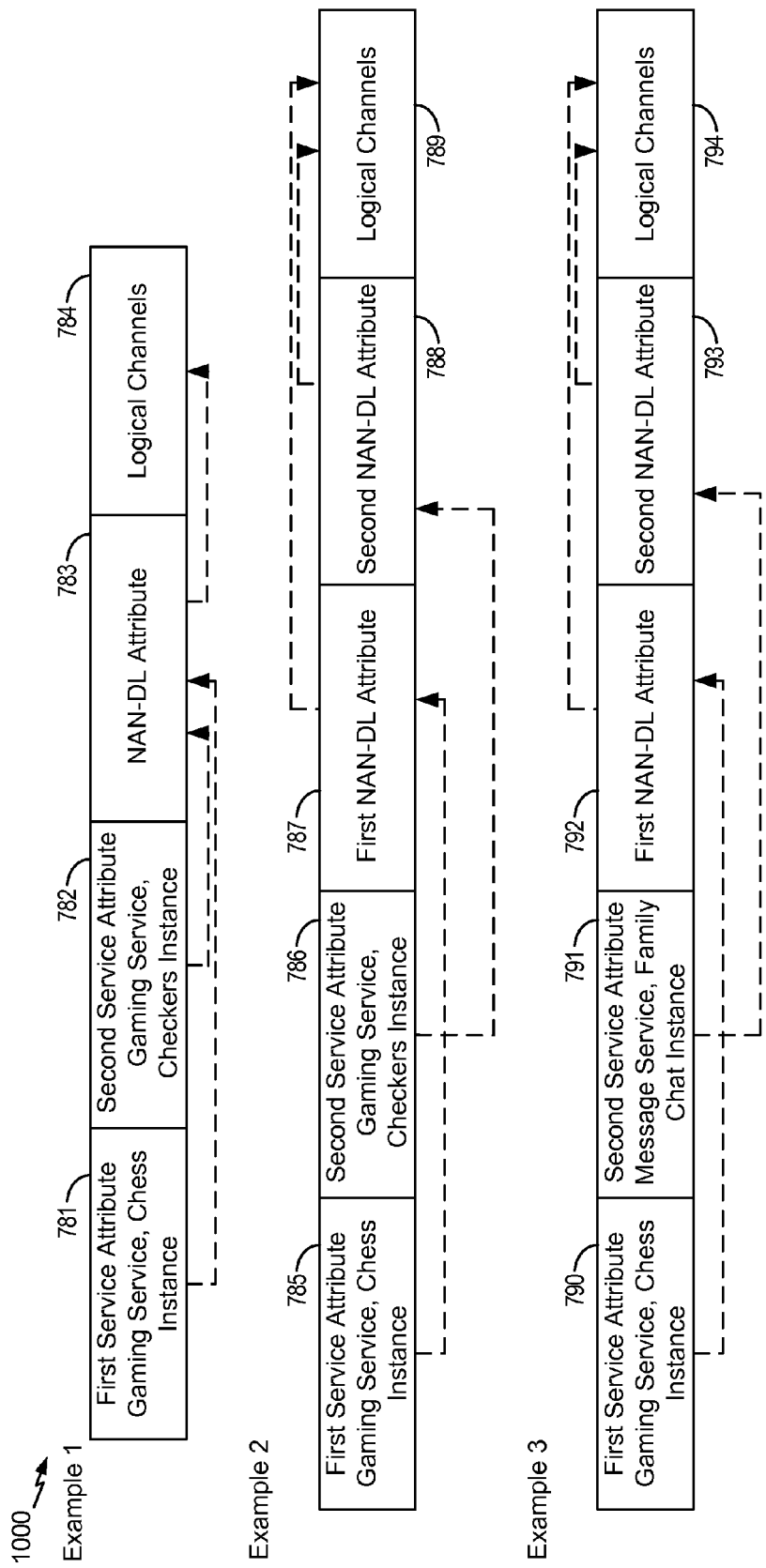

Referring to FIG. 7D, a diagram illustrating examples of service instances mapped to NAN-DL attributes and logical channels is shown and generally designated 1000.

In a first example, a message, such as the service advertisement 120 or the service advertisement 720, that includes two service attributes describing different instances of a common service that identify a common NAN-DL is shown. The message includes a first service attribute 781, a second service attribute 782, a NAN-DL attribute 783, and a logical channels attribute 784. The first service attribute 781 and the second service attribute 782 may include fields that each identify the service attribute 760.

The first service attribute 781 may correspond to a first instance (chess) of a service (such as a gaming service) offered by a provider device, such as the first device 104, and the second service attribute 782 may correspond to a second instance (checkers) of the service offered by the provider device. To illustrate, the first service attribute 781 may include a field corresponding to the service ID field 762. The service ID field may include a value that indicates that the first service attribute 781 describes a gaming service. The first service attribute 781 may further include a field corresponding to the instance ID field 763, such as a first instance identifier, that indicates that the first service attribute 781 describes a chess instance of the gaming service. The first service attribute 781 may further include a field corresponding to the binding bitmap field 764, such as a first indicator, that identifies the NAN-DL attribute 783. The binding bitmap field may identify the NAN-DL attribute 783 based on a value of the binding bitmap field, such as a position of a particular value in the binding bitmap field. For example, the binding bitmap field may include a value 0x0001 identifying a first NAN-DL attribute included in the message, such as the NAN-DL attribute 783. The first service attribute 781 may further include a field corresponding to the service information field 766 that includes information describing the chess gaming service instance.

The second service attribute 782 may include a field corresponding to the service ID field 762. The service ID field 762 may include a value that indicates that the second service attribute 782 describes the gaming service. The second service attribute 782 may further include a field corresponding to the instance ID field 763, such as a second instance identifier, that indicates that the second service attribute 782 describes a checkers instance of the gaming service. The second service attribute 782 may further include a field corresponding to the binding bitmap field 764, such as a second indicator, that includes a value identifying the NAN-DL attribute 783. For example, the binding bitmap field may include a value 0x0001 identifying a first NAN-DL attribute included in the message, such as the NAN-DL attribute 783. The second service attribute 782 may further include a field corresponding to the service information field 766 that includes information describing the checkers gaming service instance.

The NAN-DL attribute 783 may include fields as illustrated with respect to the NAN-DL attribute 770. For example, the NAN-DL attribute 783 may include a field corresponding to the attribute ID field 771. The attribute ID field 771 may include a value that indicates the NAN-DL attribute 783 is a NAN-DL attribute. The NAN-DL attribute 783 may further include a field corresponding to the NAN-DL channel field 772 that indicates a channel, such as channel 48, used by the NAN-DL described by the NAN-DL attribute 783 to communicate. The NAN-DL attribute 783 may further include a field corresponding to the NAN-DL control field 773 that includes a value, such as an index, indicating a particular logical channel described in the logical channels attribute 784. The NAN-DL attribute 783 may further include a field corresponding to the NAN-DL group ID field 774 that includes a field identifying a group name, such as "Gaming Group," of the NAN-DL described by the NAN-DL attribute 783. The logical channels attribute 784 may include fields as illustrated in the diagram 800. Thus, in the first example, a message may advertise two different instances of a service and indicate that both instances are provided by a provider device via a common NAN-DL.

In a second example, a message, such as the service advertisement 120 or the service advertisement 720, that includes two service attributes describing different instances of a common service that identify different NAN-DLs is shown. The message includes a first service attribute 785, a second service attribute 786, a first NAN-DL attribute 787, a second NAN-DL attribute 788, and a logical channels attribute 789.

The first service attribute 785 may correspond to a first instance (chess) of a service (a gaming service) offered by a provider device, such as the first device 104, and the second service attribute 786 may correspond to a second instance (checkers) of the gaming service offered by the provider device. To illustrate, the first service attribute 785 may include a field corresponding to the service ID field 762. The service ID field 762 may include a value that indicates that the first service attribute 785 describes a gaming service. The first service attribute 785 may further include a field corresponding to the instance ID field 763 that indicates that the first service attribute 785 describes a chess instance of the gaming service. The first service attribute 785 may further include a field corresponding to the binding bitmap field 764 that includes a value identifying the first NAN-DL attribute 787. For example, the binding bitmap field 764 may include a value 0x0001 identifying a first NAN-DL attribute included in the message, such as the first NAN-DL attribute 787. The first service attribute 785 may further include a field corresponding to the service information field 766 that includes information describing the chess gaming service instance. (the first instance)

The second service attribute 786 may include a field corresponding to the service ID field 762. The service ID field 762 may include a value that indicates that the second service attribute 786 also describes the gaming service. The second service attribute 786 may further include a field corresponding to the instance ID field 763 that indicates that the second service attribute 786 describes a checkers instance of the gaming service. The second service attribute 786 may further include a field corresponding to the binding bitmap field 764 that includes a value identifying the second NAN-DL attribute 788. For example, the binding bitmap field 764 may include a value 0x0002 identifying a second NAN-DL attribute included in the message, such as the second NAN-DL attribute 788. The second service attribute 786 may further include a field corresponding to the service information field 766 that includes information describing the checkers gaming service instance (the second instance).

The first NAN-DL attribute 787 may include fields as illustrated with respect to the NAN-DL attribute 770. For example, the first NAN-DL attribute 787 may include a field corresponding to the attribute ID field 771. The attribute ID field 771 may include a value that indicates the first NAN-DL attribute 787 is a NAN-DL attribute. The first NAN-DL attribute 787 may further include a field corresponding to the NAN-DL channel field 772 that indicates a channel, such as channel 48, used by the NAN-DL described by the first NAN-DL attribute 787 to communicate. The first NAN-DL attribute 787 may further include a field corresponding to the NAN-DL control field 773 that includes a value, such as an index, indicating a first logical channel described in the logical channels attribute 784, such as a first logical channel listed in a field corresponding to the SC list field 716. The first NAN-DL attribute 787 may further include a field corresponding to the NAN-DL group ID field 774 that includes a field identifying a group name, such as "Chess Gaming Group," of the NAN-DL described by the first NAN-DL attribute 787.

The second NAN-DL attribute 788 may include fields as illustrated with respect to the NAN-DL attribute 770. For example, the second NAN-DL attribute 788 may include a field corresponding to the attribute ID field 771. The attribute ID field 771 may include a value that indicates the second NAN-DL attribute 788 is a NAN-DL attribute. The second NAN-DL attribute 788 may further include a field corresponding to the NAN-DL channel field 772 that indicates a channel, such as channel 30, used by the NAN-DL described by the second NAN-DL attribute 788 to communicate. The second NAN-DL attribute 788 may further include a field corresponding to the NAN-DL control field 773 that includes a value, such as an index, indicating a second logical channel described in the logical channels attribute 784, such as a second logical channel listed in a field corresponding to the SC list field 716. The second NAN-DL attribute 788 may further include a field corresponding to the NAN-DL group ID field 774 that includes a field identifying a group name, such as "Checkers Gaming Group," of the NAN-DL described by the second NAN-DL attribute 788.

Thus, in the second example, a message may advertise two different instances of a service and indicate that the instances are provided by a provider device via different NAN-DLs.

In a third example, a message, such as the service advertisement 120 or the service advertisement 720, that includes two service attributes describing different services that identify different NAN-DLs is shown. The message includes a first service attribute 790, a second service attribute 791, a first NAN-DL attribute 792, a second NAN-DL attribute 793, and a logical channels attribute 794.

The first service attribute 790 may correspond to an instance (chess) of a first service (a gaming service) offered by a provider device, such as the first device 104, and the second service attribute 791 may correspond to an instance (family messaging) of a second service (a messaging service) offered by the provider device. To illustrate, the first service attribute 790 may include a field corresponding to the service ID field 762. The service ID field 762 may include a value that indicates that the first service attribute 790 describes a gaming service. The first service attribute 790 may further include a field corresponding to the instance ID field 763 that indicates that the first service attribute 790 describes a chess instance of the gaming service. The first service attribute 790 may further include a field corresponding to the binding bitmap field 764 that includes a value identifying the first NAN-DL attribute 792. For example, the binding bitmap field 764 may include a value 0x0001 identifying a first NAN-DL attribute included in the message, such as the first NAN-DL attribute 792. The first service attribute 790 may further include a field corresponding to the service information field 766 that includes information describing the chess gaming service instance.

The second service attribute 791 may include a field corresponding to the service ID field 762. The service ID field 762 may include a value that indicates that the second service attribute 791 describes a messaging service, such as a third service attribute. The second service attribute 791 may further include a field corresponding to the instance ID field 763, such as a third instance identifier, that indicates that the second service attribute 791 describes a family messaging instance of the messaging service. The second service attribute 791 may further include a field corresponding to the binding bitmap field 764, such as a third indicator, that includes a value identifying the second NAN-DL attribute 793. For example, the binding bitmap field 764 may include a value 0x0002 identifying a second NAN-DL attribute included in the message, such as the second NAN-DL attribute 793. The second service attribute 791 may further include a field corresponding to the service information field 766 that includes information describing the family messaging service instance.

The first NAN-DL attribute 792 may include fields as illustrated with respect to the NAN-DL attribute 770. For example, the first NAN-DL attribute 792 may include a field corresponding to the attribute ID field 771. The attribute ID field 771 may include a value that indicates the first NAN-DL attribute 792 is a NAN-DL attribute. The first NAN-DL attribute 792 may further include a field corresponding to the NAN-DL channel field 772 that indicates a channel, such as channel 48, used by the NAN-DL described by the first NAN-DL attribute 792 to communicate. The first NAN-DL attribute 792 may further include a field corresponding to the NAN-DL control field 773 that includes a value, such as an index, indicating a first logical channel described in the logical channels attribute 794, such as a first logical channel listed in a field corresponding to the SC list field 716. The first NAN-DL attribute 792 may further include a field corresponding to the NAN-DL group ID field 774 that includes a field identifying a group name, such as "Gaming Group," of the NAN-DL (e.g., the first data link group) described by the first NAN-DL attribute 792, such as a first data link attribute.

The second NAN-DL attribute 793 may include fields as illustrated with respect to the NAN-DL attribute 770. For example, the second NAN-DL attribute 793 may include a field corresponding to the attribute ID field 771. The attribute ID field 771 may include a value that indicates the second NAN-DL attribute 793 is a NAN-DL attribute. The second NAN-DL attribute 793 may further include a field corresponding to the NAN-DL channel field 772 that indicates a channel, such as channel 30, used by the NAN-DL described by the second NAN-DL attribute 793 to communicate. The second NAN-DL attribute 793 may further include a field corresponding to the NAN-DL control field 773 that includes a value, such as an index, indicating a second logical channel described in the logical channels attribute 794, such as a second logical channel listed in a field corresponding to the SC list field 716. The second NAN-DL attribute 793 may further include a field corresponding to the NAN-DL group ID field 774 that includes a field identifying a group name, such as "Messaging Group," of the NAN-DL (e.g., a second data link group) described by the second NAN-DL attribute 793, such as a second data link attribute.

Thus, in the third example, a message may advertise two different services and indicate that the two different services are provided by a provider device via different NAN-DLs, such as the first data link group and the second data link group.

Figure 8:
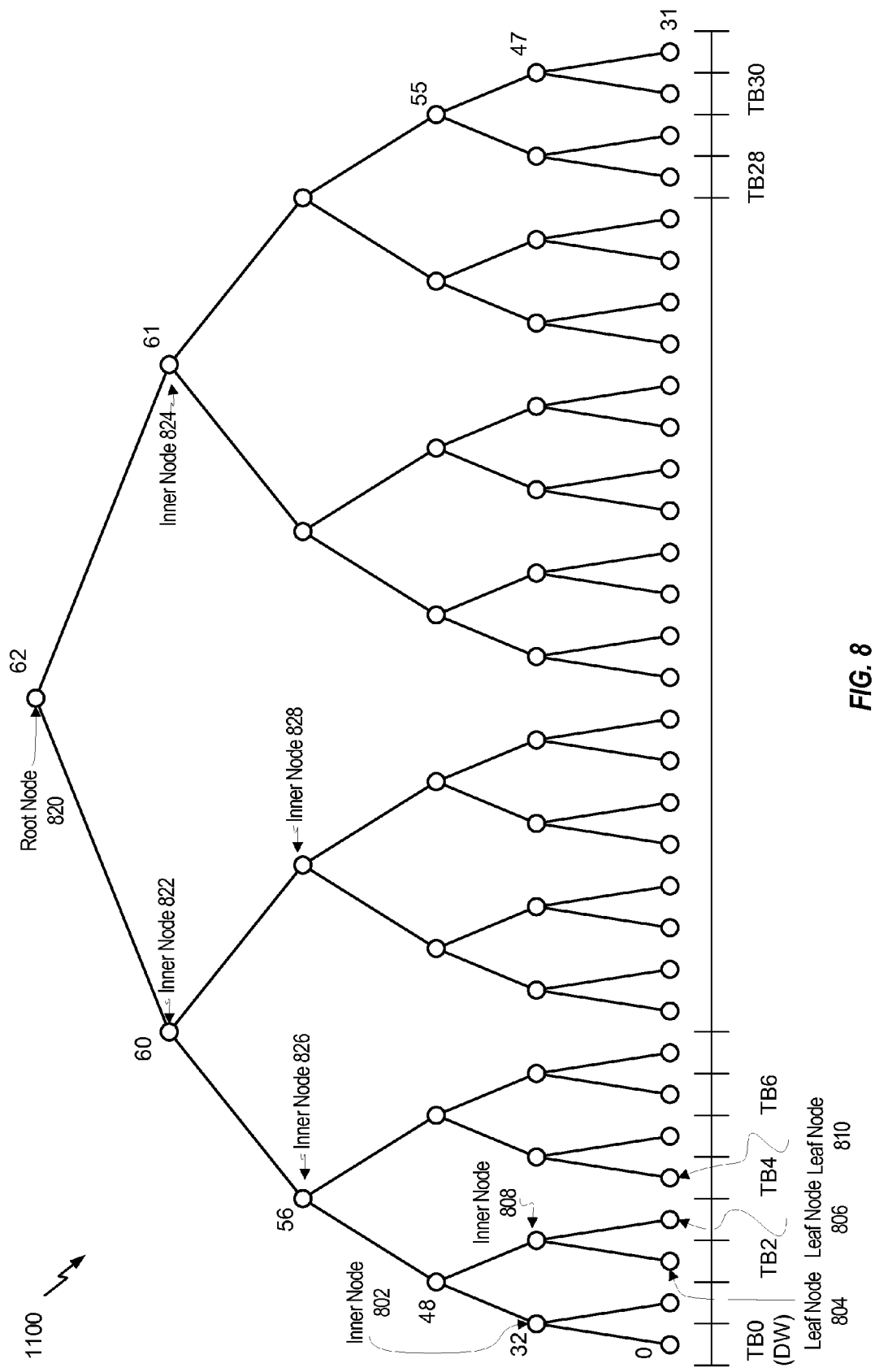
FIG. 8 is a diagram illustrating a tree representation of time blocks.

Referring to FIG. 8, a particular aspect of a tree representation of time blocks is shown and generally designated 1100. In a particular aspect, the provider logic 130, the subscriber logic 134, or both, of at least one of the electronic devices 104, 106, 108, 110, and 112 of the system 100 of FIG. 1 may store data corresponding to the tree 1100 in a memory. The tree 1100 may correspond to a binary tree or another tree data structure.

A discovery period, such as the discovery period 248 of FIG. 2, may be divided into a plurality of time blocks. Each of the plurality of time blocks may have the same duration. In a particular implementation, each of the plurality of time blocks may include or correspond to a transmission window. In another particular implementation, each of the plurality of time blocks may include or correspond to a NAN-DL TB. The tree 1100 may include a first number, 32, of leaf nodes, such as a leaf node 804 and a leaf node 806. Each of the leaf nodes may correspond to a particular time block of the plurality of time blocks. For example, the leaf node 804 may correspond to a first time block, such as time block (TB) 2. The second transmission window 242 of FIG. 2 may include or correspond to TB2. The leaf node 806 may correspond to a second time block, such as TB3.

The tree 1100 may include a second number, 31, of inner nodes. For example, the tree 1100 may include a root node 820 and may include one or more additional inner nodes between the root node 820 and the leaf nodes. Each inner node may have a particular number, such as 2, of child nodes. A child node of a particular inner node may include another inner node or a leaf node. For example, the root node 820 has child nodes that are inner nodes, such as an inner node 822 and an inner node 824. As another example, an inner node 808 has child nodes that are leaf nodes, such as the leaf node 804 and the leaf node 806).

Each node of the tree 1100 may correspond to a particular index. For example, the leaf node 804 may correspond to a first index, such as TB index 2, and the leaf node 806 may correspond to a second index, such as TB index 3. As another example, an inner node 802 may correspond to a first particular index, such as TB index 32, and the inner node 808 may correspond to a second particular index, such as TB index 33.

A particular index may indicate one or more time blocks. For example, an index corresponding to a leaf node may indicate a single time block. To illustrate, the first index, TB index 2, may indicate the first time block, TB2. As another example, an index corresponding to an inner node may indicate multiple time blocks. To illustrate, the second particular index, such as TB index 33 may correspond to TB2 and TB3.

One or more indices corresponding to the tree 1100 may be used to indicate one or more portions of the discovery period 248, as further described with reference to FIG. 10. In a particular aspect, using a single index to indicate multiple time blocks may reduce a number of bits used to represent the time blocks as compared to using an index corresponding to each time block.

Referring to FIG. 9, a particular aspect of mapping data is shown and generally designated 1200. The mapping data 1200 may correspond to the tree 1100 of FIG. 8. In a particular aspect, at least one of the electronic devices 104, 106, 108, 110, and 112 of the system 100 of FIG. 1 may store the mapping data 1200 in a memory.

The mapping data 1200 may indicate at least one time block corresponding to each node of the tree 1100. For example, the mapping data 1200 may indicate one or more time blocks corresponding to a particular index of a particular node of the tree 1100. To illustrate, the mapping data 1200 may indicate that each index of a first set of indices, such as TB indices 0-31, corresponds to a single time block, such as TB0-TB31. The first set of indices may correspond to leaf nodes of the tree 1100.

The mapping data 1200 may indicate that each index of a second set of indices, such as TB indices 32-47, corresponds to a pair of time blocks. For example, TB index 32 may correspond to TB0 and TB1. The second set of indices may correspond to a first level of inner nodes of the tree 1100. The leaf nodes may be child nodes of the first level of inner nodes.

The mapping data 1200 may indicate that each index of a third set of indices, such as TB indices 48-55, corresponds to four time blocks. For example, TB index 48 may correspond to TB0-TB3. The third set of indices may correspond to a second level of inner nodes of the tree 1100. The first level of inner nodes may be child nodes of the second level of inner nodes.

The mapping data 1200 may indicate that each index of a fourth set of indices, such as TB indices 56-59, corresponds to 8 time blocks. For example, TB index 56 may correspond to TB0-TB7. The fourth set of indices may correspond to a third level of inner nodes of the tree 1100. The second level of inner nodes may be child nodes of the third level of inner nodes.

The mapping data 1200 may indicate that each index of a fifth set of indices, such as TB indices 60-61, corresponds to 16 time blocks. For example, TB index 60 may correspond to TB0-TB15. The fifth set of indices may correspond to a fourth level of inner nodes of the tree 1100. The third level of inner nodes may be child nodes of the fourth level of inner nodes.

The mapping data 1200 may indicate that a particular index, such as TB index 62, corresponds to 32 time blocks. For example, the particular index may correspond to TB0-TB31. The particular index may correspond to the root node 820 of FIG. 8.

The mapping data 1200 may thus indicate a mapping between an index and one or more time blocks. For example, the mapping data 1200 may indicate that a first index, such TB index 30, corresponds to a first time block (TB30). As another example, the mapping data 1200 may indicate that a second index, such as TB index 47, corresponds to the first time block (TB30) and a second time block (TB31).

Figure 10:
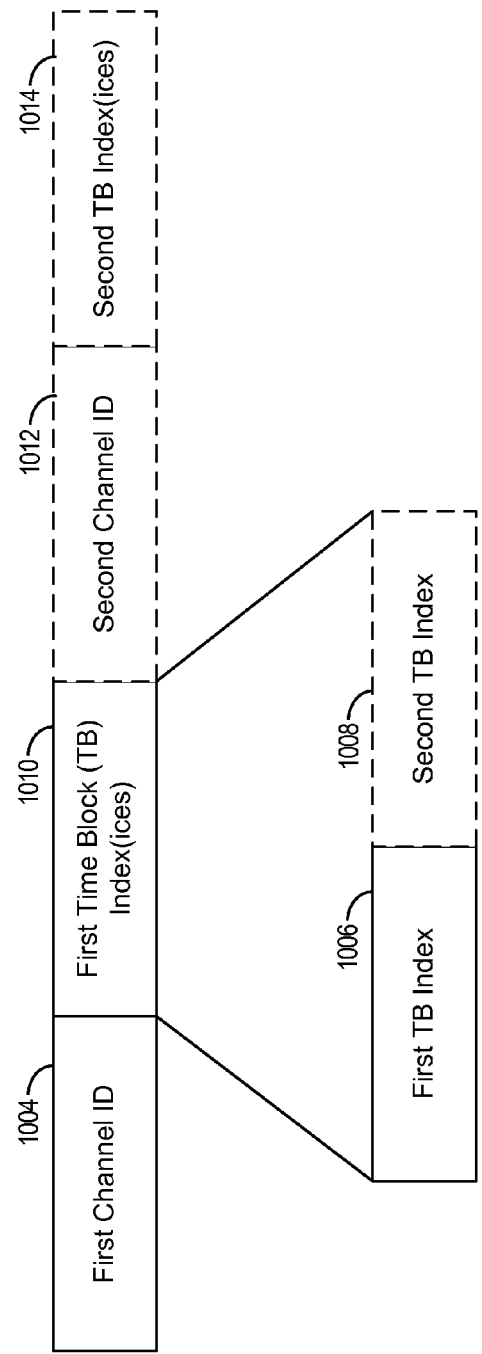
FIG. 10 is a diagram illustrating an example of a logical channels attribute corresponding to the tree representation of FIG. 8.

Referring to FIG. 10, a particular aspect of a logical channels attribute is shown and generally designated 1300. The logical channels attribute may correspond to the logical channels attribute 746 of FIG. 7A, the logical channels attribute 784, the logical channels attribute 789, the logical channels attribute 794 of FIG. 7D, or a combination thereof.

The logical channels attribute 1300 may include one or more channel identifiers. For example, the logical channels attribute 1300 may include a first channel identifier 1004, a second channel identifier 1012, or both. A particular channel identifier may indicate a particular communication channel. For example, the first channel identifier 1004 may indicate a first communication channel, the second channel identifier 1012 may indicate a second communication channel, or both.

The logical channels attribute 1300 may include one or more time block indices of the tree 1100 of FIG. 8. The one or more time block indices may have a corresponding channel identifier, such as the one or more channel identifiers. For example, the logical channels attribute 1300 may include one or more first time block indices 1010. To illustrate, the first time block indices 1010 may include a first TB index 1006, a second TB index 1008, or both. The first time block indices 1010 may have a corresponding channel identifier, the first channel identifier 1004. The logical channels attribute 1300 may include one or more second time block indices 1014. The second time block indices 1014 may have a corresponding channel identifier, the second channel identifier 1012. The logical channels attribute 1300 may have a particular size, such as 2 octets or 4 octets.

During operation, the provider logic 130 of the first device 104 of FIG. 1 may select the logical channels 150, as described with reference to FIG. 1. For example, the provider logic 130 may select the logical channels 150 from a plurality of available logical channels to provide a particular service. A discovery period, such as the discovery period 248 of FIG. 2, may be divided into a plurality of time blocks. Each of the plurality of time blocks may have the same duration.

The provider logic 130 may generate a message, such as the service advertisement 120 of FIG. 1, the service advertisement 720 of FIG. 7A, or both, indicating that the first device 104 is available to communicate via the logical channels 150. The service advertisement 120 may include a channel identifier and one or more time block indices corresponding to each of the logical channels 150. For example, a particular logical channel of the logical channels 150 may correspond to a communication channel and at least one time block of the plurality of time blocks. The provider logic 130 may determine a channel identifier, such as the first channel identifier 1004, of the communication channel and at least one time block index indicating the at least one time block.

In a particular aspect, the at least one time block may include a single time block of the plurality of time blocks. In this aspect, a leaf node, such as the leaf node 804 or the leaf node 806, of the tree 1100 of FIG. 8 may represent the at least one time block. In another aspect, the at least one time block may include multiple time blocks of the plurality of time blocks. In this aspect, one or more leaf nodes, one or more inner nodes of the tree 1100, or a combination thereof, may represent the at least one time block.

In a particular implementation, the provider logic 130 may traverse the tree 1100 to determine a fewest number of nodes that represent the at least one time block. If the at least one time block includes a single time block of the plurality of time blocks, a leaf node, such as the leaf node 804, of the tree 1100 may represent the at least one time block. The first TB index 1006 may correspond to a TB index (TB index 2) of the leaf node 804.

If the at least one time block includes multiple time blocks of the plurality of time blocks, one or more leaf nodes, one or more inner nodes of the tree 1100, or a combination thereof, may represent the at least one time block. The provider logic 130 may identify a set of leaf nodes of the tree 1100 corresponding to the multiple time blocks. The provider logic 130 may determine a fewest number of nodes that represent the set of leaf nodes. For example, the provider logic 130 may replace a pair of nodes in the set having the same parent node, such as an inner node of the tree 1100, with the parent node. The provider logic 130 may repeat the replacement process until the remaining nodes in the set have distinct parent nodes. To illustrate, the at least one time block may include TB2-TB4. The provider logic 130 may identify a set of leaf nodes corresponding to TB2-TB4. For example, the set of leaf nodes may include the leaf node 804 corresponding to TB2, the leaf node 806 corresponding to TB3, and a leaf node 810 corresponding to TB4. The provider logic 130 may, in response to determining that the leaf node 804 and the leaf node 806 have the same parent node (the inner node 808), replace the leaf node 804 and the leaf node 806 with the inner node 808 in the set. The provider logic 130 may determine that the fewest number of nodes that represent the at least one time block have been identified in response determining that the inner node 808 and the leaf node 810 have distinct parent nodes. The provider logic 130 may determine the at least one index based on the remaining nodes in the set. For example, the at least one index may include a first index (TB index 33) corresponding to the inner node 808 and a second index (TB index 4) corresponding to the leaf node 810.

In an alternate implementation, the provider logic 130 may determine a fewest number of nodes that represent the at least one time block based on the mapping data 1200. For example, the provider logic 130 may process the mapping data 1200 in order, such as in a descending order or an ascending order. In one example, the provider logic 130 may process the mapping data 1200 in a descending order from a first time block index, TB index 61, corresponding to the root node 820. To illustrate, the provider logic 130 may identify a set of leaf nodes corresponding to the at least one time block. The provider logic 130 may determine that the mapping data 1200 indicates that a next TB index corresponds to one or more time blocks. The provider logic 130 may, in response to determining that leaf nodes corresponding to each of the one or more time blocks are included in the set, remove the leaf nodes from the set and add the next TB index to the at least one time block index. The provider logic 130 may repeat the process until a single leaf node remains in the set or a particular index, such as TB index 32, has been processed. The particular index may correspond to a last inner node to be processed. The provider logic 130 may add a time block index corresponding to each remaining leaf node of the set to the at least one time block index.

The service advertisement 120 may indicate the first channel identifier 1004 and the first time block indices 1010. For example, the service advertisement 120 may include the logical channels attribute 1300. The logical channels attribute 1300 may include the first channel identifier 1004 indicating the communication channel and the first time block indices 1010 corresponding to the at least one time block index.

In a particular aspect, the logical channels 150 may correspond to multiple communication channels. The logical channels attribute 1300 may include a channel identifier of each communication channel and one or more time block indices corresponding to each communication channel. For example, the logical channels attribute 1300 may include the first channel identifier 1004 corresponding to a first communication channel and the first time block indices 1010 corresponding to the first communication channel. The logical channels attribute 1300 may include the second channel identifier 1012 of a second communication channel and the second time block indices 1014 corresponding to the second communication channel.

The transceiver 136 of the first device 104 may transmit the service advertisement 120. The transceiver 136 of the second device 106 may receive the service advertisement 120 and may provide the service advertisement 120 to the subscriber logic 134 of the second device 106. The subscriber logic 134 may determine one or more communication channels and at least one time block corresponding to each of the communication channels based on the logical channels attribute 1300 of the service advertisement 120. For example, the subscriber logic 134 may determine a first communication channel based on the first channel identifier 1004, a second communication channel based on the second channel identifier 1012, or both. The subscriber logic 134 may determine one or more first time blocks based on the first time block indices 1010, one or more second time blocks based on the second time block indices 1014, or both.

In a particular implementation, the subscriber logic 134 may determine at least one time block corresponding to at least one time block index based on traversing the tree 1100 of FIG. 8. For example, the subscriber logic 134 may traverse the tree 1100 to identify at least one leaf node corresponding to each index of the first time block indices 1010. The first time blocks may include one or more time blocks corresponding to the at least one leaf node.

In an alternate implementation, the subscriber logic 134 may determine at least one time block corresponding to at least one time block index based on the mapping data 1200 of FIG. 9. For example, the subscriber logic 134 may, in response to determining that the mapping data 1200 indicates that a particular time block index of the first time block indices corresponds to one or more particular time blocks, include the one or more particular time blocks in the first time blocks. The subscriber logic 134 may monitor the first communication channel during the first time blocks, the second communication channel during the second time blocks, or a combination thereof.

In a particular aspect, the provider logic 130 may add a time block in response to a device joining the data link group. For example, the provider logic 130 may add an additional time block in response to the fourth device joining the data link group. To illustrate, the provider logic 130 may add TB2 to the logical channels attribute 746 corresponding to data link group. The provider logic 130 may update the first time block indices 1010 to include TB3 by adding the second TB index 1008, with a value of TB index 3 (indicating TB3), to the first TB index 1006 with a value of TB index 2 (indicating TB2). Alternatively, the provider logic 130 may update the first time block indices 1010 to include TB3 by updating the value of the first TB index 1006 from TB index 2 (indicating TB2) to TB index 33 (indicating TB2 and TB3).

The logical channels attribute 1300 may thus provide a concise representation of the logical channels 150. For example, a single index may be used to represent multiple time blocks of a logical channel.

Figure 11A:
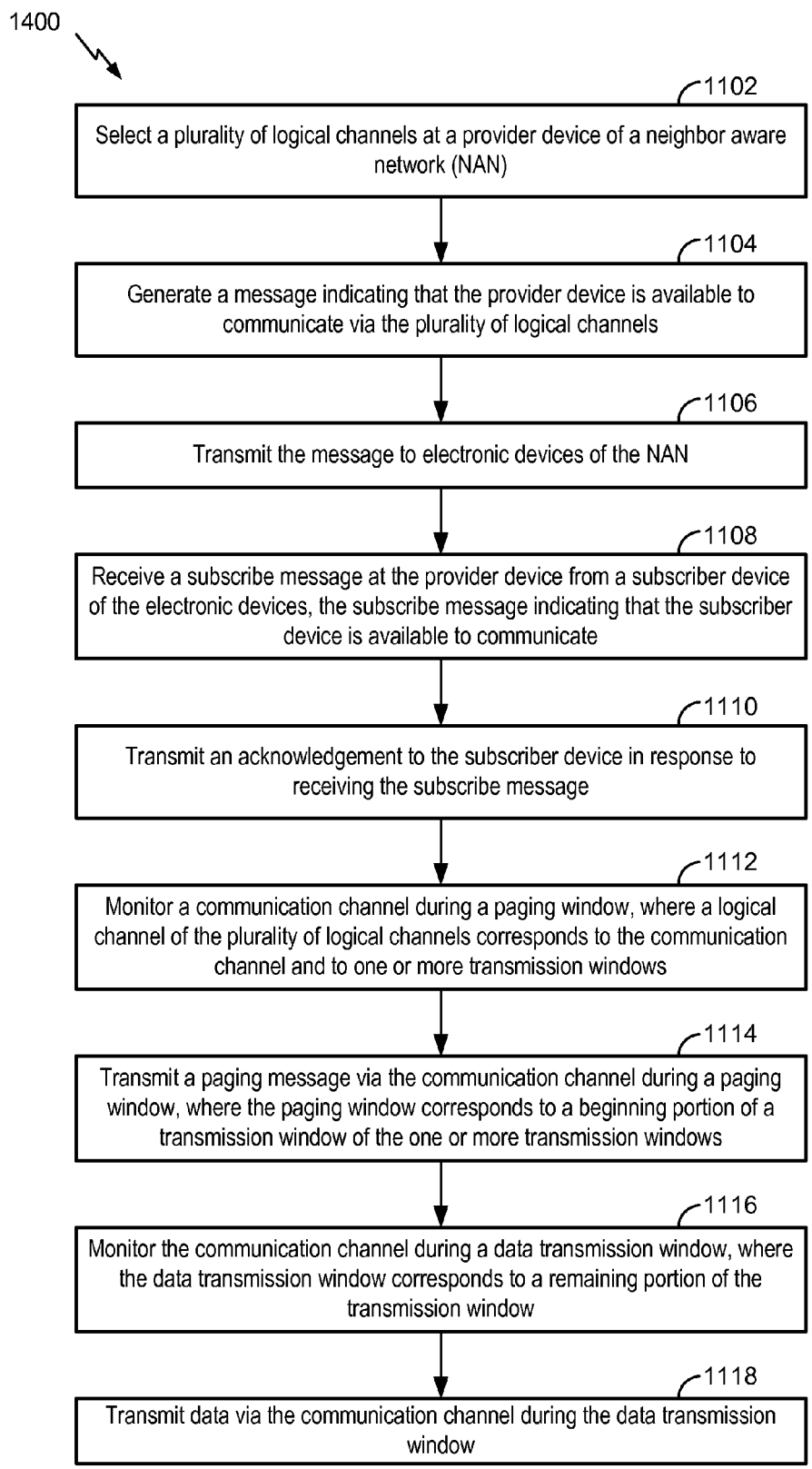

Referring to FIG. 11A, a particular aspect of a method of operation is shown and generally designated 1400. In a particular aspect, the method 1400 may be performed by the provider logic 130 of at least one of the electronic devices 104, 106, 108, 110, and 112 of the system 100 of FIG. 1.

The method 1400 includes selecting a plurality of logical channels at a provider device of a neighbor aware network (NAN), at 1102. For example, the provider logic 130 of the first device 104 of FIG. 1 may select the logical channels 150, as described with reference to FIG. 1. The first device 104 may be included in the NAN 102 of FIG. 1.

The method 1400 also includes generating a message indicating that the provider device is available to communicate via the plurality of logical channels, at 1104. For example, the provider logic 130 of the first device 104 of FIG. 1 may generate the service advertisement 120 indicating that a particular service is available via the logical channels 150, as described with reference to FIG. 1.

The method 1400 further includes transmitting the message to electronic devices of the NAN, at 1106. For example, the provider logic 130 of the first device 104 of FIG. 1 may transmit the service advertisement 120 to at least one of the electronic devices 106, 108, 110, and 112 of the NAN 102, as described with reference to FIG. 1. In a particular aspect, the provider logic 130 of the first device 104 may transmit the service advertisement 120 to the electronic devices of the NAN 102 that are within a coverage area (e.g., a single hop) of the first device 104.

The method 1400 also includes receiving a subscribe message at the provider device from a subscriber device of the electronic devices, at 1108. For example, the provider logic 130 of the first device 104 of FIG. 1 may receive a subscribe message from at least one of the electronic devices 106, 108, 110, and 112 of the NAN 102, as described with reference to FIG. 1. To illustrate the provider logic 130 of the first device 104 may receive the subscribe message 124 from the second device 106. The subscribe message 124 may indicate that the second device 106 is available to communicate, as described with reference to FIG. 1. For example, the subscriber logic 134 of the second device 106 may generate the subscribe message 124 in response to determining that the second device 106 is available to communicate via at least one of the logical channels 150, as described with reference to FIG. 1. The provider logic 130 of the first device 104 may determine that the second device 106 is available to communicate via at least one of the logical channels 150 in response to receiving the subscribe message 124.

The method 1400 further includes transmitting an acknowledgement to the subscriber device in response to receiving the subscribe message, at 1110. For example, the provider logic 130 of the first device 104 of FIG. 1 may transmit the ACK 126 to the second device 106, as described with reference to FIG. 1.

The method 1400 also includes monitoring a communication channel during a paging window, at 1112. For example, the provider logic 130 of the first device 104 may monitor the first communication channel 302 during the first paging window 320, as described with reference to FIGS. 1 and 3. A logical channel, such as the supplemental channel 360, of the plurality of logical channels may correspond to the communication channel, such as the first communication channel 302, and to one or more transmission windows, such as the first transmission window 340, as described with reference to FIG. 3.

The method 1400 further includes transmitting a paging message via the communication channel during a paging window, at 1114. For example, the provider logic 130 of the first device 104 may transmit the paging message 128 via the first communication channel 302 during the first paging window 320, as described with reference to FIG. 3. The first paging window 320 may correspond to a beginning portion of the first transmission window 340, as described with reference to FIG. 3.

The method 1400 also includes monitoring the communication channel during a data transmission window, at 1116. For example, the provider logic 130 of the first device 104 may monitor the first communication channel 302 during the first data transmission window 322, as described with reference to FIG. 3. The first data transmission window 322 may correspond to a remaining portion of the first transmission window 340, as described with reference to FIG. 3.

The method 1400 further includes transmitting data via the communication channel during the data transmission window, at 1118. For example, the provider logic 130 of the first device 104 may transmit the data 122 via the first communication channel 302 during the first data transmission window 322, as described with reference to FIG. 3.

The method 1400 may thus enable a provider device to transmit data of a particular service via a logical channel. For example, the provider device may transmit the service advertisement 120 indicating the logical channels 150. The subscriber device may monitor the first communication channel 302 corresponding to the supplemental channel 360. The provider device may transmit the data 122 via the first communication channel 302 during the first data transmission window 322.

Referring to FIG. 11B, a particular aspect of a method of operation is shown and generally designated 1500. In a particular aspect, the method 1500 may be performed by the provider logic 130 of at least one of the electronic devices 104, 106, 108, 110, and 112 of the system 100 of FIG. 1.

The method 1500 includes generating, at a provider device of a neighbor aware network (NAN), a message that includes a first attribute descriptive of a service offered by the provider device via a NAN data link of the NAN and a second attribute descriptive of the NAN data link, at 1122. The first attribute includes an indicator that identifies the second attribute. For example, the provider logic 130 of the first device 104 of FIG. 1 may generate the service advertisement 120. The service advertisement 120 may include the one or more service attributes 170 and the one or more NAN-DL attributes 180. A service attribute of the one or more service attributes 170 may identify a service offered by the first device 104 via a NAN-DL described by one of the NAN-DL attributes 180. The service attribute may include an indicator that identifies the NAN-DL attribute descriptive of the NAN-DL used to provide the service.

The method 1500 also includes transmitting the message, at 1124. For example, the provider logic 130 of the first device 104 of FIG. 1 may transmit the service advertisement 120 to the second device 106, as described with reference to FIG. 1. Thus, a provider device may generate advertisements that identify services offered via a NAN-DL and describe how the services may be accessed by subscriber devices via the NAN-DL.

Figure 12:
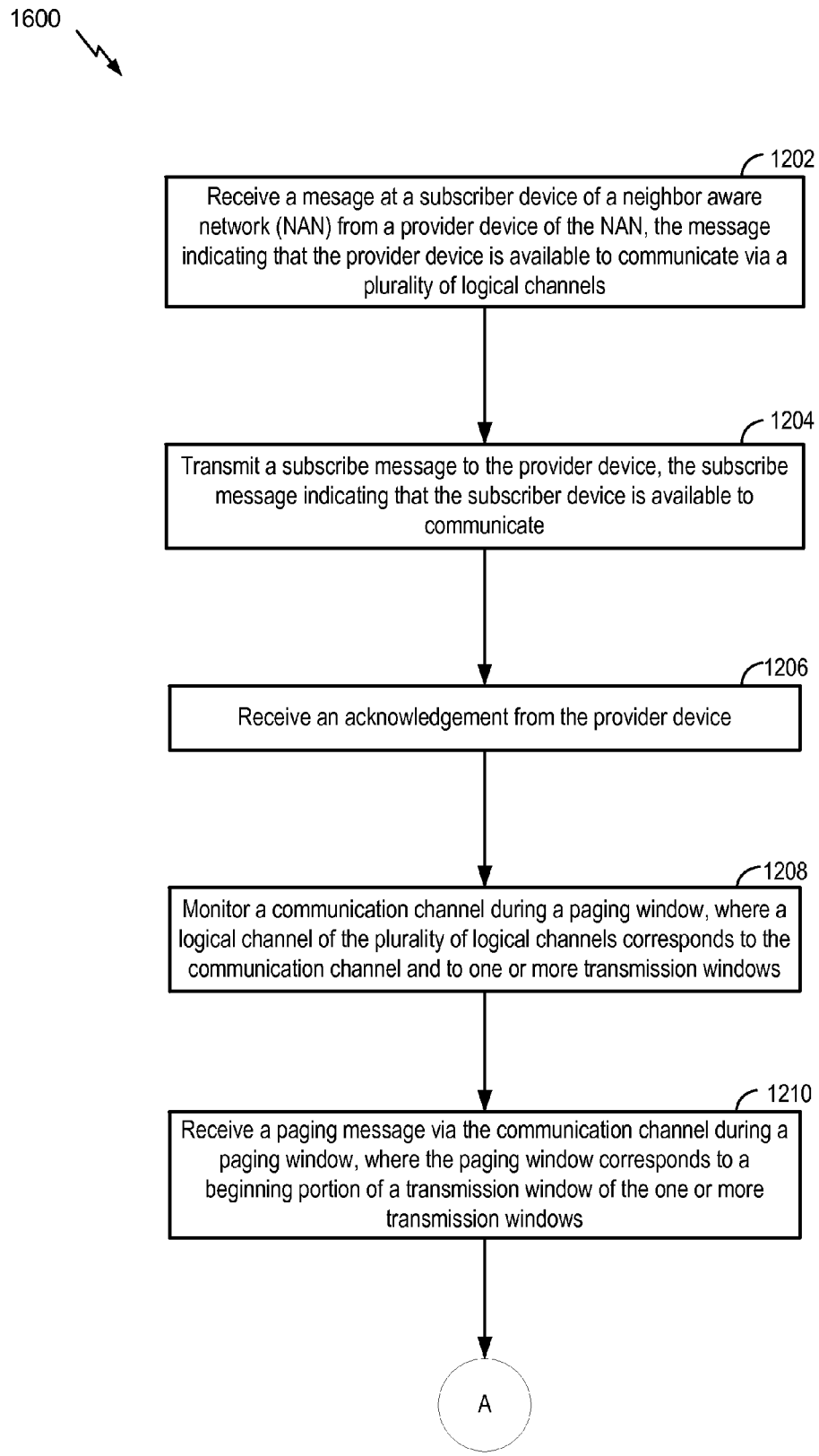
FIG. 12 is a flow diagram of another method of operation at an electronic device of the system of FIG. 1.

Referring to FIG. 12, a particular example of a method of operation is shown and generally designated 1600. The method 1600 may be performed by the subscriber logic 134 of at least one of the electronic devices 104, 106, 108, 110, and 112 of the system 100 of FIG. 1.

The method 1600 includes receiving a message at a subscriber device of a neighbor aware network (NAN) from a provider device of the NAN, at 1202. For example, the subscriber logic 134 of the second device 106 of FIG. 1 may receive the service advertisement 120 from the first device 104. The first device 104 and the second device 106 may be included in the NAN 102 of FIG. 1. The message may indicate that the provider device is available to communicate via a plurality of logical channels. For example, the service advertisement 120 may indicate that a particular service is available via the logical channels 150.

The method 1600 also includes transmitting a subscribe message to the provider device, at 1204. For example, the subscriber logic 134 of the second device 106 of FIG. 1 may transmit the subscribe message 124 to the first device 104, as described with reference to FIG. 1. The subscribe message 124 may indicate that the second device 106 is available to communicate. For example, the subscriber logic 134 of the second device 106 may generate the subscribe message 124 in response to determining that the second device 106 is available to communicate via at least one of the logical channels 150, as described with reference to FIG. 1.

The method 1600 further includes receiving an acknowledgement from the provider device, at 1206. For example, the subscriber logic 134 of the second device 106 of FIG. 1 may receive the ACK 126 from the first device 104, as described with reference to FIG. 1.

The method 1600 also includes monitoring a communication channel during a paging window, at 1208. For example, the subscriber logic 134 of the second device 106 may monitor the first communication channel 302 during the first paging window 320, as described with reference to FIGS. 1 and 3. A logical channel, such as the supplemental channel 360, of the plurality of logical channels may correspond to the communication channel, such as the first communication channel 302, and to one or more transmission windows, such as the first transmission window 340, as described with reference to FIG. 3.

The method 1600 further includes receiving a paging message via the communication channel during a paging window, at 1210. For example, the subscriber logic 134 of the second device 106 may receive the paging message 128 via the first communication channel 302 during the first paging window 320, as described with reference to FIG. 3. The first paging window 320 may correspond to a beginning portion of the first transmission window 340, as described with reference to FIG. 3.

The method 1600 may thus enable a subscriber device to determine that a provider device is providing a service via a plurality of logical channels. For example, the provider device may transmit the service advertisement 120 indicating the logical channels 150. The subscriber device may monitor the first communication channel 302 corresponding to the supplemental channel 360 of the logical channels 150 during a paging window. The subscriber device may receive the paging message 128 and may determine that the provider device has data to be transmitted to the subscriber device based on receiving the paging message 128.

Figure 13:
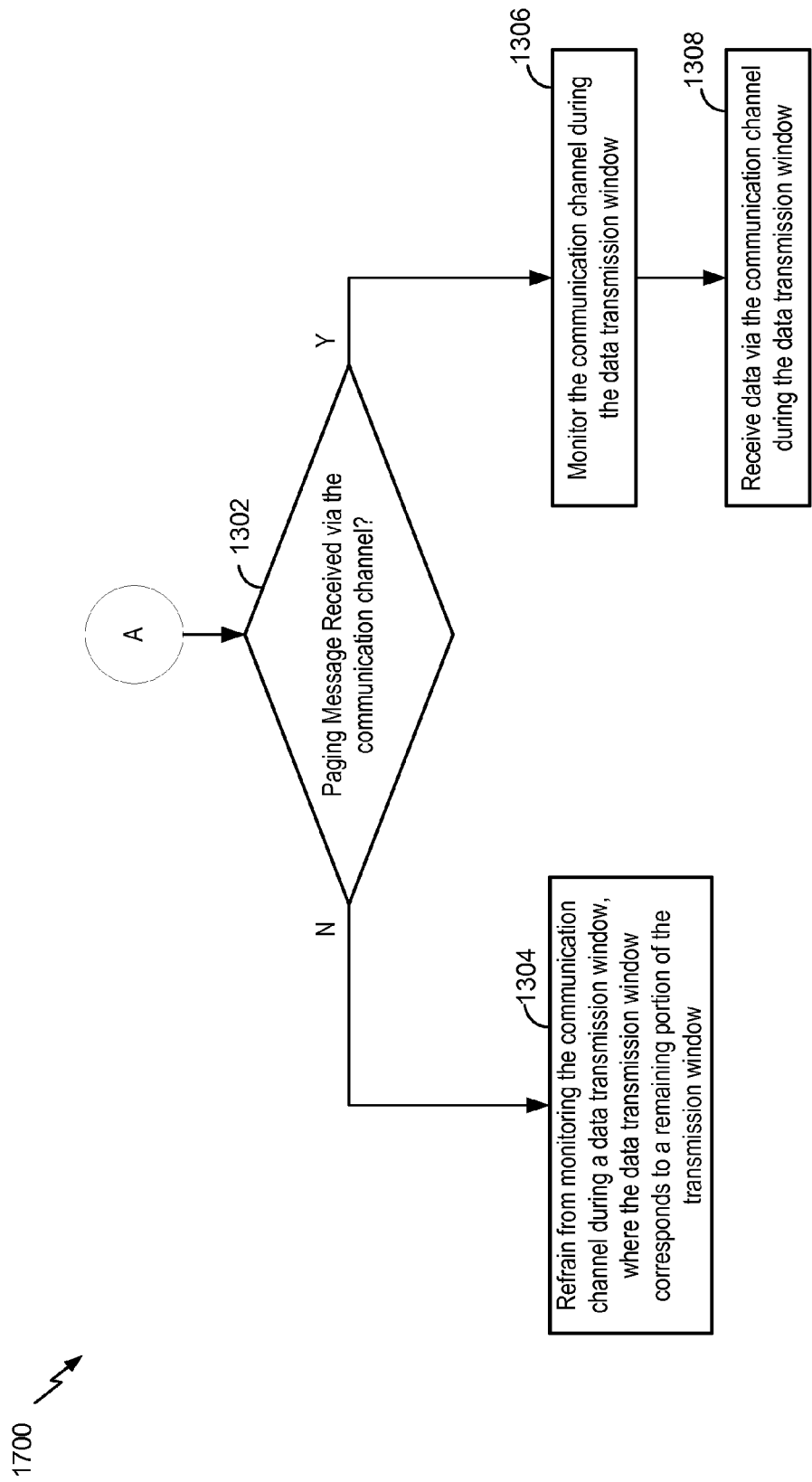
FIG. 13 is a flow diagram of another method of operation at an electronic device of the system of FIG. 1.

Referring to FIG. 13, a particular example of a method of operation is shown and generally designated 1700. The method 1700 may be performed by the subscriber logic 134 of at least one of the electronic devices 104, 106, 108, 110, and 112 of the system 100 of FIG. 1.

The method 1700 includes determining whether a paging message has been received via the communication channel during the paging window, at 1302. For example, the subscriber logic 134 of the second device 106 may determine whether the paging message 128 has been received via the first communication channel 302 during the first paging window 320.

The method 1700 also includes, in response to determining that the paging message has not been received, refraining from monitoring the communication channel during a data transmission window, at 1304. For example, the subscriber logic 134 of the second device 106 may refrain from monitoring the first communication channel 302 during the first data transmission window 322 in response to determining that the paging message 128 has not been received during the first paging window 320, as described with reference to FIGS. 1 and 3. The first data transmission window 322 may correspond to a remaining portion of the first transmission window 340. In a particular aspect, the wireless interface of the second device 106 may, in response to determining that second device 106 is refraining from monitoring the first communication channel, discard the paging message 128.

The method 1700 further includes, in response to determining that the paging message has been received, monitoring the communication channel during the data transmission window, at 1306. For example, the subscriber logic 134 of the second device 106 may monitor the first communication channel 302 during the first data transmission window 322 in response to determining that the paging message 128 has been received during the first paging window 320, as described with reference to FIGS. 1 and 3.

The method 1700 also includes receiving data via the communication channel during the data transmission window, at 1308. For example, the subscriber logic 134 of the second device 106 may receive the data 122 via the first communication channel 302 during the first data transmission window 322, as described with reference to FIGS. 1 and 3.

In a particular aspect, the method 1700 may be performed for each logical channel of the logical channels 150 of FIG. 1. For example, the subscriber logic 134 of the second device 106 may monitor multiple logical channels of the logical channels 150. In a particular aspect, a first paging window of a first logical channel may overlap a second paging window of a second logical channel. In this aspect, the method 1700 may be performed concurrently for the first logical channel and the second logical channel.

The method 1700 may thus enable a subscriber device to determine whether to monitor a data transmission window based on receiving a paging message. For example, the subscriber device may monitor one or more communication channels corresponding to the plurality of logical channels during associated paging windows. A paging message may indicate that the provider device has data to be transmitted to the subscriber device. The subscriber device may monitor a communication channel during a data transmission window in response to receiving the paging message and may receive data via the communication channel from the provider during the data transmission window. The subscriber device may alternatively conserve power by refraining to monitor the communication channel during the data transmission window in response to determining that the paging message has not been received during the paging window.

Figure 14:
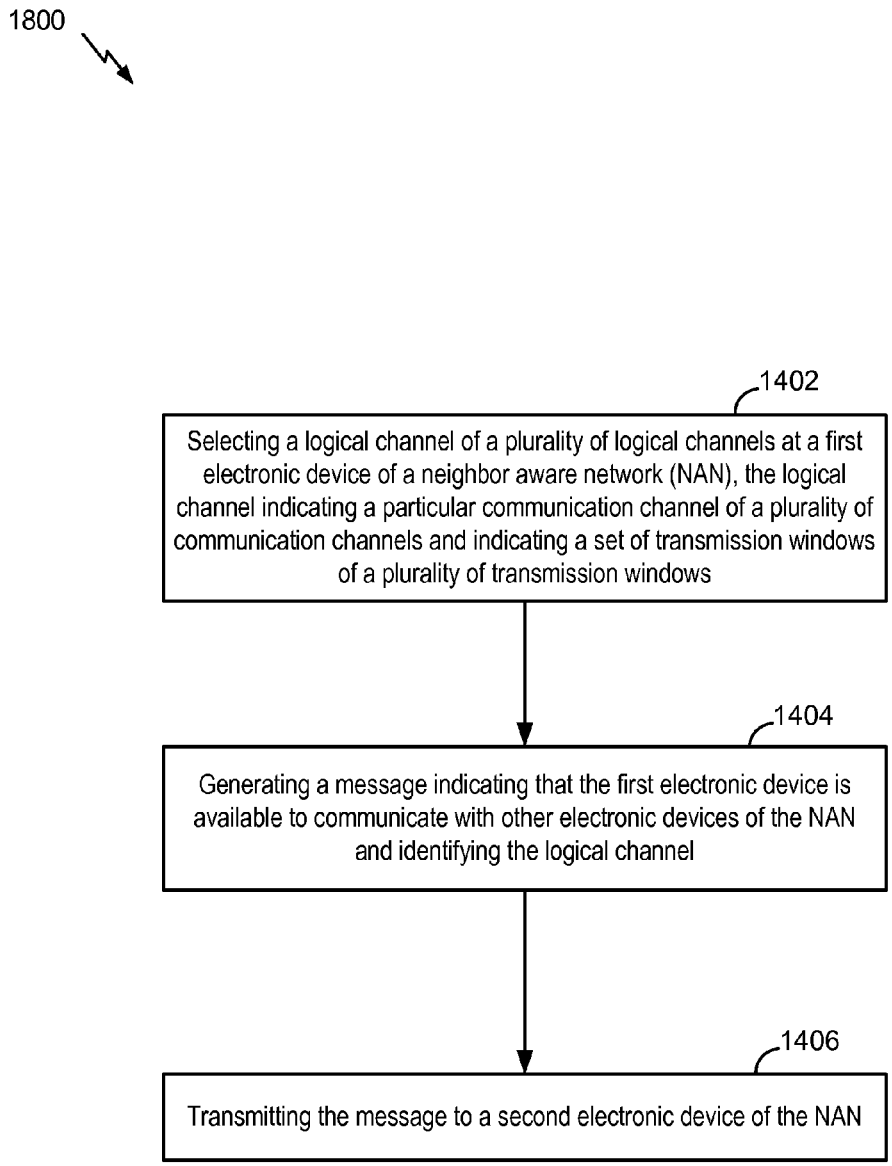
FIG. 14 is a flow diagram of another method of operation at an electronic device of the system of FIG. 1.

Referring to FIG. 14, a particular example of a method of operation is shown and generally designated 1800. The method 1800 may be performed by the provider logic 130 of at least one of the electronic devices 104, 106, 108, 110, and 112 of the system 100 of FIG. 1.

The method 1800 includes selecting a logical channel of a plurality of logical channels at a first electronic device of a neighbor aware network (NAN), at 1402. The logical channel may indicate a particular communication channel of a plurality of communication channels and may indicate a set of transmission windows of a plurality of transmission windows. For example, the provider logic 130 of the first device 104 may select the logical channels 150, as described with reference to FIG. 1. The logical channel, such as the supplemental channel 360 of FIG. 3, may indicate a particular communication channel of a plurality of communication channels and may indicate a set of transmission windows of a plurality of transmission windows, as described with reference to FIGS. 1 and 3.

The method 1800 also includes generating a message indicating that the first electronic device is available to communicate with other electronic devices of the NAN and identifying the logical channel, at 1404. For example, the provider logic 130 may generate the service advertisement 120 indicating that the first device 104 is available to communicate via the logical channel, such as the supplemental channel 360 of FIG. 3, as described with reference to FIGS. 1 and 3. The service advertisement 120 may include the first channel identifier 1004 of a communication channel and the first time block indices 1010 indicating the at least one time block, as described with reference to FIG. 10.

The method 1800 further includes transmitting the message to a second electronic device of the NAN, at 1406. For example, the transceiver 136 of the first device 104 may transmit the service advertisement 120 to the second device 106, as described with reference to FIG. 1.

In some aspects, a second logical channel of the plurality of logical channels indicates the particular communication channel and indicates a second set of transmission windows of the plurality of transmission windows. For example, the second logical channel, such as supplemental channel 460, may indicate multiple transmission windows, as described with reference to FIG. 4.

In other aspects, the message identifies multiple logical channels of the plurality of logical channels, the multiple logical channels including the logical channel, and, for each particular logical channel of the multiple logical channels, the message includes a channel identifier of a communication channel corresponding to the particular logical channel. For example, the service advertisement 120 of FIG. 1 may identify the multiple logical channels of the logical channels 150 and may include the logical channels attribute 746 of FIG. 7A. The logical channels attribute may include the SC list field 716 or the first channel identifier 1004 corresponding to the particular logical channel, as described with reference to FIGS. 7B and 10.

In some aspects, the message includes a service advertisement indicating a service available from the first electronic device, and the service is provided using a corresponding logical channel. For example, the service advertisement 120 of FIG. 1 may include the service attribute 742 of FIG. 7A indicating a service available from the first device 104. The service may include a corresponding logical channel, such as supplemental channel 360, related to a first data link group.

In other aspects, the method 1800 includes generating a beacon message or a service discovery message. The message is included in the beacon message or the service discovery message, and transmitting the message includes transmitting the beacon message or the service discovery message to the second electronic device during a discovery window of a first communication channel. For example, the first device 104 of FIG. 1 may generate a beacon message including the service advertisement 120 and transmit the beacon message during the first discovery window 210 of the NAN communication channel, as described with reference to FIGS. 1 and 2.

In some aspects, the message is transmitted during a first discovery window of a first communication channel. A discovery period includes a duration between an end of the first discovery window and a beginning of a second discovery window, the discovery period includes the plurality of transmission windows, and a first transmission window of the plurality of transmission windows has a first offset from the end of the first discovery window and a second transmission window of the plurality of transmission windows has a second offset from the end of the first discovery window. For example, the service advertisement 120 may be transmitted during the first discovery window 210. The discovery period 248 may include the duration between the end of the first discovery window 210 and the beginning of the second discovery window 212.

In other aspects, the message is transmitted during a first discovery window of a first communication channel. A discovery period includes a duration between an end of the first discovery window and a beginning of a second discovery window, and the discovery period includes a plurality of time blocks. Each time block of the plurality of time blocks has the same duration, and a particular logical channel of the plurality of logical channels occurs multiple times during the discovery period. For example, the service advertisement 120 may be transmitted during the first discovery window 210. The discovery period 248 may include the plurality of time blocks of FIG. 8, as described with reference to FIGS. 2 and 8.

In other aspects, a particular transmission window of the set of transmission windows corresponds to a time block of the plurality of time blocks. The message includes a channel identifier that indicates the communication channel, and the message further includes a time block index indicating the time block. For example, the second transmission window 242 of FIG. 2 may include or correspond to TB2 of FIG. 8. The service advertisement 120 of FIG. 1 may include the first channel identifier 1004 and may include the first time block index 1010 of FIG. 10.

In some aspects, the transmitter may be further configured to transmit a second message during a second discovery window, the second message indicating a particular logical channel is negotiable. For example, with reference to FIG. 1, the transceiver 136 of the first device 104 may transmit a second service advertisement, such as service advertisement 120, during the second discovery window 212. The service advertisement may indicate a logical channel of the logical channels 150, as described with reference to FIG. 1. Additionally, the receiver may be configured to receive a negotiation message or an association request from the second electronic device after an end of the second discovery window. For example, the transceiver 136 may receive the negotiation message or the association request after the end of the second discovery window 212. Additionally, the processor may be further configured to determine a negotiated logical channel based in part on the negotiation message or an association request, as described with reference to FIG. 1. For example, the transceiver 136 may transmit the negotiation message after the end of the second discovery window 212, as described with reference to FIG. 1.

In some aspects, the time block index corresponds to a node of a tree representation of a plurality of time block indices. For example, the first time block index 1010 of FIG. 10 may correspond to the leaf node 804 of FIG. 8. In other aspects, the tree representation includes a binary tree representation of the plurality of time block indices. For example, the tree 1100 of FIG. 8 may include the binary tree representation of the plurality of time block indices, as described with reference to FIGS. 8 and 9.

In some aspects, the message includes a plurality of time block indices. A first index of the plurality of time block indices indicates a first time block of a plurality of time blocks, and a second index of the plurality of time block indices indicates a set of consecutive time blocks of the plurality of time blocks. For example, the service advertisement 120 of FIG. 1 may include the first time block indices 1010 and the second time block index 1014 of FIG. 10. The first time block indices 1010 may include the first TB index 1006 and the second TB index 1008.

In other aspects, the method 1800 includes, in response to another electronic device joining a data link group of the NAN, updating the first index of the plurality of time block indices to indicate the first time block and to indicate a second time block of the plurality of time blocks. For example, the first device 104 may add or update the second TB index 1008 of the first time block indices 1010 to indicate TB2 of FIG. 8.

In some aspects, the message is transmitted to the second electronic device and to a third electronic device of the NAN during a discovery window. The second electronic device and the third electronic device are included in a data link group of the NAN. For example, the first device 104 of FIG. 1 may transmit the service advertisement 120 to the second device 106 and to the third device 108 during the first discovery window 210. The second device 106 and the third device 108 may be included in the data link group, as described with reference to FIG. 1. Additionally or alternatively, the method 1800 includes transmitting first data to the second electronic device during a first time block. For example, the first device 104 may transmit the data 122 to the second device 106 during TB2 of FIG. 8. The method 1800 also includes transmitting second data to the third electronic device during a second time block. For example, the first device 104 may transmit the second data during TB3 of FIG. 8, as described with reference to FIGS. 1 and 8. The method 1800 further includes transmitting third data to the second electronic device and to the third electronic device during a third time block. For example, the first device 104 may transmit the third data to the second device 106 and to the third device 108 during TB 31 of FIG. 8, as described with reference to FIGS. 1 and 8. In a particular aspect, the first transmission window at least partially overlaps the second transmission window. For example, the first transmission window of the first logical channel of the logical channels 150 at least partially overlaps a second transmission window of the second logical channel, as described with reference to FIG. 1.

In other aspects, the method 1800 includes receiving a subscribe message from the second electronic device via a first communication channel during a discovery window, the first communication channel different from the particular communication channel. For example, the first device 104 of FIG. 1 may receive the subscribe message 124 from the second device 106 via the NAN communication channel 202 during the first discovery window 210. The NAN communication channel 202 different from the first communication channel 302. In these aspects, the method 1800 also includes monitoring the particular communication channel during a paging window of a particular transmission window of the set of transmissions window. The particular transmission window includes the paging window and a data window, the paging window includes a beginning portion of the particular transmission window, and the data window includes an end portion of the particular transmission window. For example, the first device 104 may monitor the first communication channel 302 during the first paging window 220 of the first transmission window 240.

In some aspects, the method 1800 includes initiating performance of a capabilities exchange with the second electronic device. Performing the capabilities exchange by the first electronic device includes transmitting a first capabilities message to the second electronic device and receiving a second capabilities message from the second electronic device, transmitting a probe request to the second electronic device and receiving a probe response from the second electronic device, or transmitting an association request to the second electronic device and receiving an association response from the second electronic device. For example, the first device 104 of FIG. 1 may transmit the capabilities message 144 to the second device 106 and may receive the capabilities message 146 from the second device 106. The capabilities message 144 and the capabilities message 146 may include the probe request, the probe response, the association request, and the association response, as described with reference to FIG. 1.

In some aspects, the method 1800 includes performing a capabilities exchange with the second electronic device prior to transmitting the data. The data is transmitted based on first communication information of the first electronic device, second communication information of the second electronic device, or both, and the second communication information is received during performance of the capabilities exchange. For example, the first device 104 of FIG. 1 may perform the capabilities exchange with the second device 106 and may transmit the data 122 based on the first communication information of the capabilities message 144, the second communication information of the capabilities message 146, or both.

The method 1800 may thus enable the first device 104 to advertise availability to communicate using one or more logical channels. The method 1800 may also enable the first device 104 to indicate particular time blocks of each of the logical channels during which the first device 104 is available to communicate and the corresponding communication channel of the particular time blocks.

Figure 15:
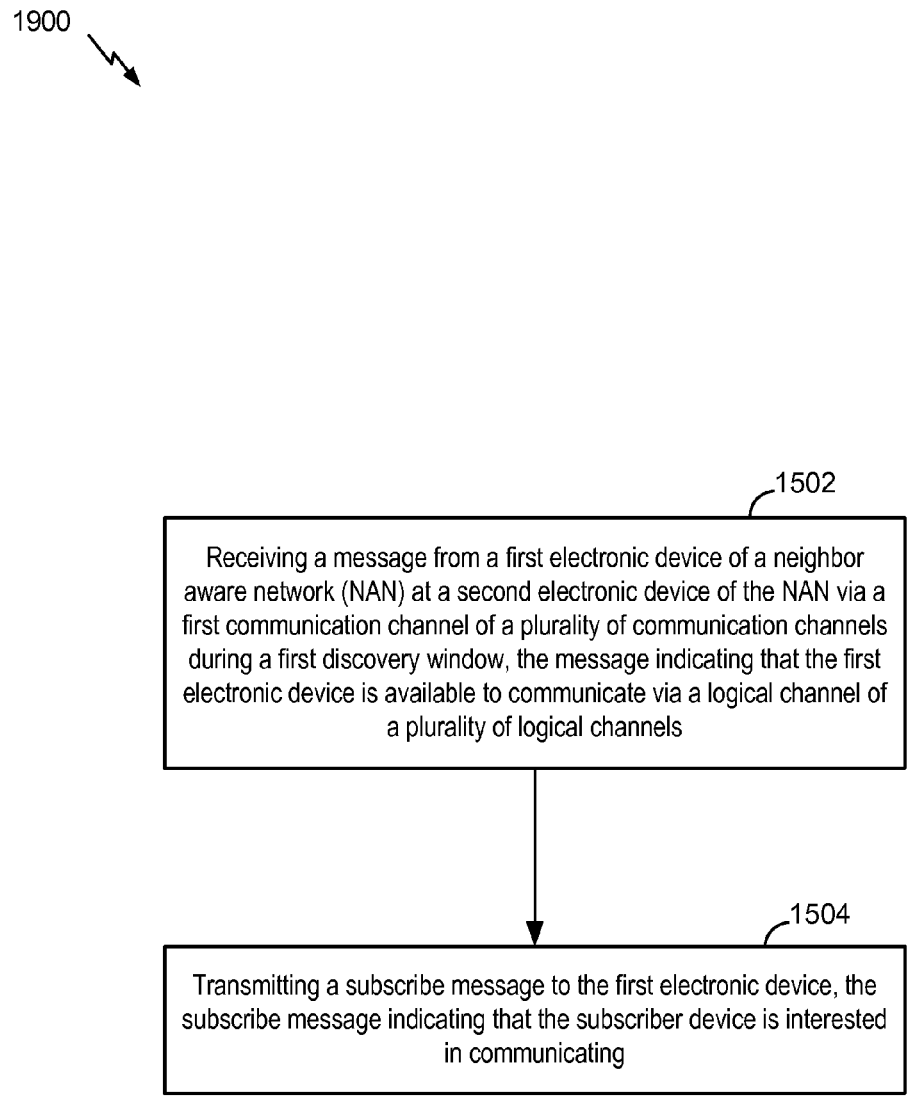
FIG. 15 is a flow diagram of another method of operation at an electronic device of the system of FIG. 1.

Referring to FIG. 15, a particular example of a method of operation is shown and generally designated 1900. The method 1900 may be performed by the subscriber logic 134 of at least one of the electronic devices 104, 106, 108, 110, and 112 of the system 100 of FIG. 1.

The method 1900 includes receiving a message from a first electronic device of a neighbor aware network (NAN) at a second electronic device of the NAN via a first communication channel of a plurality of communication channels during a first discovery window, at 1502. The message may indicate that the first electronic device is available to communicate via a logical channel of a plurality of logical channels. For example, the second device 106 may receive the service advertisement 120 from the first device 104, as described with reference to FIG. 1. The service advertisement 120 may indicate that the first device 104 is available to communicate. The service advertisement 120 may include the first channel identifier 1004 of a communication channel and the first time block indices 1010, as described with reference to FIG. 10.

The method 1900 also includes transmitting a subscribe message to the first electronic device, the subscribe message indicating that the subscriber device is interested in communicating, at 1504. For example, the subscriber logic 134 of the second device 106 of FIG. 1 may transmit the subscribe message of 124, as described with reference to FIG. 1. Additionally, the subscriber logic 134 of the second device 106 may determine at least one time block of a plurality of time blocks based on the first time block indices 1010, as described with reference to FIG. 10.

The method 1900 may thus enable the second device 106 to determine that the first device 104 is available to communicate via one or more communication channels. The method 1900 may also enable the second device 106 to determine particular time blocks of each of the communication channels during which the first device 104 is available to communicate.

Figure 16:
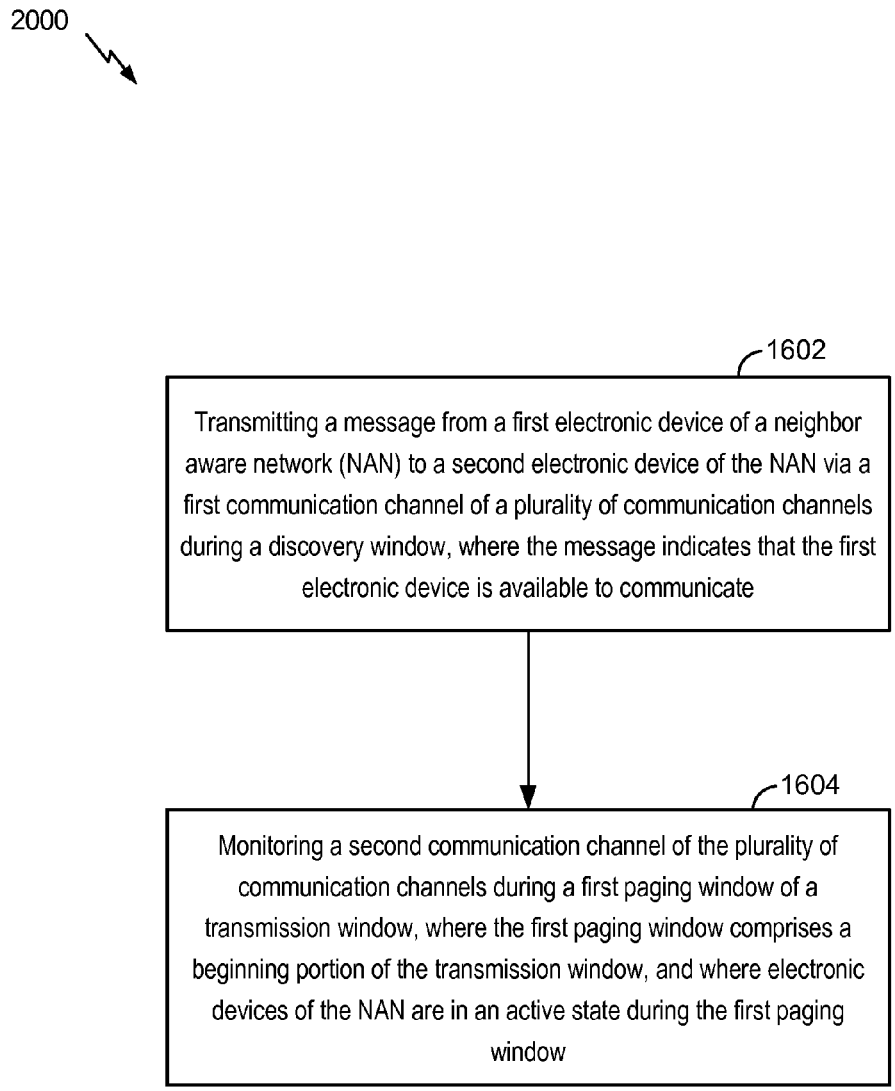
FIG. 16 is a flow diagram of another method of operation at an electronic device of the system of FIG. 1.

Referring to FIG. 16, a particular example of a method of operation is shown and generally designated 2000. The method 2000 may be performed by the provider logic 130 of at least one of the electronic devices 104, 106, 108, 110, and 112 of the system 100 of FIG. 1.

The method 2000 includes transmitting a message from a first electronic device of a neighbor aware network (NAN) to a second electronic device of the NAN via a first communication channel of a plurality of communication channels during a discovery window, at 1602. The message indicates that the first electronic device is available to communicate. For example, the transceiver 136 of the first device 104 may transmit the service advertisement 120 to the second device 106, as described with reference to FIG. 1. As another example, the transceiver 136 of the first device 104 may transmit (broadcast or multicast) the service advertisement 120 to multiple devices of the NAN, such as the second device 106 and the third device 108. The service advertisement 120 may indicate that the first device 104 is available to communicate via the logical channel, such as the supplemental channel 360 of FIG. 3, as described with reference to FIGS. 1 and 3. Additionally, the service advertisement 120 may include the first channel identifier 1004 of a communication channel and the first time block indices 1010 indicating the at least one time block, as described with reference to FIG. 10.

The method 2000 further includes monitoring a second communication channel of the plurality of communication channels during a first paging window of a transmission window, at 1604. For example, the provider logic 130 of the first device 104 of FIG. 1 may monitor the communication channel during the at least one time block, as described with reference to FIG. 10. The first paging window includes a beginning portion of the transmission window, and electronic devices of the NAN are in an active state during the first paging window.

In some implementations, the method 2000 includes, in response to determining that a paging message has not been transmitted or received by the first electronic device during the first paging window, entering a low power mode during a data window of the transmission window. The data window begins after an end of the first paging window. For example, the first device 104 of FIG. 1 may enter a low power mode during the first data transmission window 222 of FIG. 2 in response to determining that the paging message 128 has not been transmitted or received by the first device 104, as described with reference to FIGS. 1 and 2.

In some implementations, the method 2000 includes transmitting a paging message during the first paging window. The paging message indicates that the first electronic device has data to transmit to the second electronic device, and the paging message includes at least one of an ad-hoc traffic indication message (ATIM), a traffic indication map (TIM), a Bloom filter, or a media access control (MAC) address list. For example, the first device 104 of FIG. 1 may transmit the paging message 128 during the first paging window 220. The paging message 128 may indicate the first device 104 has the data 122 to transmit to the second device 106 and the paging message 128 may include at least of the ATIM, the TIM, the Bloom filter, or the MAC address list, as described with reference to FIG. 1.

In some implementations, the method 2000 includes determining whether the first electronic device has data to be transmitted to the second electronic device. For example, the provider logic 130 of the first device 104 of FIG. 1 may determine whether the first device has the data 122 to transmit to the second device 106. The method 2000 may also include in response to determining that the first electronic device has data to be transmitted, transmitting a paging message to the second electronic device via the second communication channel during the first paging window or in response to determining that the first electronic device does not have data to be transmitted, entering a low power mode during a data window. For example, the first device 104 may transmit the paging message 128 to the second device 106 in response to determining the first device has the data 122, or the first device may enter the low power mode during the first data transmission window 222 of FIG. 2 in response to determining the first device 104 does not have the data 122, as described with reference to FIGS. 1 and 2.

In some implementations, the method 2000 includes monitoring the first communication channel during the discovery window. For example, the first device 104 of FIG. 1 may monitor the NAN communication channel during the first discovery window 210 of FIG. 2. The method 2000 also includes receiving a subscribe message from the second electronic device during the discovery window, the subscribe message indicating the second electronic device is interested in communicating. For example, the first device 104 may receive a subscribe message from the second device 106, the subscribe message indicating the second device 106 is interested in communicating, as described with reference to FIG. 1.

In some implementations, the subscribe message includes a media access control (MAC) address of the second electronic device. For example, the subscribe message 124 of FIG. 1 may include the MAC address, as described with reference to FIG. 1. The method 2000 may include generating an internet protocol (IP) address based on the MAC address. For example, the first device 104 may generate the IP address based on the MAC address, as described with reference to FIG. 1. The method 2000 also includes transmitting a paging message to the second electronic device based on the IP address. For example, the first device 104 may transmit the paging message 128 to the second device 106 based on the IP address. The method 2000 further includes transmitting data to the second electronic device based on the IP address, the data transmitted during a data window of the transmission window. An end of the first paging window corresponds to a beginning of the data window. For example, the first device may transmit the data 122 to the second device 106 during the first data transmission window 222 of the first transmission window 240, as described with reference to FIGS. 1 and 2.

In some implementations, the method 2000 includes receiving a trigger frame from the second electronic device, the trigger frame indicating the second electronic device is available to receive data. The trigger frame is responsive to a paging message indicating the second electronic device is scheduled to receive the data. For example, the first device 104 of FIG. 1 may receive the trigger frame indicating the second device is available to receive the data 122, the trigger frame responsive to the paging message 128, as described with reference to FIG. 1. The method 2000 also includes in response to receiving the trigger frame, transmitting data to the second electronic device during a data window of the transmission window. For example, the first device 104 may transmit the data 122 to the second device 106 during the first data transmission window 222 of the first transmission window 240 in response to receiving the trigger frame, as described with reference to FIGS. 1 and 2. In a particular aspect, the first data window corresponds to an end portion of the first transmission window, as described with reference to the timing diagram 200 of FIG. 2.

In some implementations, the method 2000 includes determining whether the first electronic device is able to transmit a paging message via the second communication channel during the first paging window. The second communication channel is in use during the first paging window. For example, the provider logic 130 of the first device 104 of FIG. 1 may determine whether the first device is able to transmit the paging message 128 via the first communication channel during the first paging window 220. The method also includes, in response to determining that the first electronic device is not able to transmit the paging message during the first paging window, transmitting the paging message via the second communication channel during a second paging window of a second transmission window. The second paging window includes a beginning portion of the second transmission window. For example, the first device 104 may transmit the paging message 128 during the second paging window 224 of the second transmission window 242 in response to determining that the first device 104 is not able to transmit the paging message 128 during the first paging window 220. In a particular aspect, the second paging window corresponds to a beginning portion of a second transmission window, as described with reference to the timing diagram 200 of FIG. 2.

In some implementations, the method 2000 includes transmitting a synchronization beacon during the discovery window of the first communication channel, the synchronization beacon configured to synchronize a first clock of the first electronic device with a second clock of the second electronic device. For example, the first device 104 of FIG. 1 may transmit a synchronization beacon during the first discovery window 210, the synchronization beacon configure to synchronize the first clock of the first device with the second clock of the third device 108, as described with reference to FIG. 1. Additionally or alternatively, the processor of the first device 104 may be configured to, based on the synchronization beacon, synchronize the first clock of the first device 104 with the second clock of the second device 106. The method 2000 may also include generating a first value indicating an offset from a beginning of the first paging window. For example, the first device 104 may randomly generate the first value using a random number generator, as described with reference to FIG. 1. The method 2000 may further include initiating transmission of a paging message at a first time during the first paging window based on the first value. For example, the first device 104 may initiate transmission of the paging message 128 at the first time during the first paging window 220, as described with reference to FIG. 1.

In some implementations, the method 2000 includes generating a first value, the first value randomly generated by the first electronic device. The first value indicates a first time during the first paging window for the first device to transmit a paging message. For example, with reference to FIGS. 1 and 2, the first device 104 may generate a random value, or a pseudo-random value, that indicates a first time during the first paging window 220 for the first device 104 to transmit the paging message 128. The method 2000 includes, in response to determining that the second communication channel is in use at the first time, updating the first value to a second value. The second value is less than the first value and indicates a second offset from a beginning of a second paging window of a second transmission window. The method 2000 further includes transmitting the paging message at a second time during the second paging window based on the second value. For example, with reference to FIGS. 1 and 2, the first device 104 may generate a second random value, or a second pseudo-random value, and the first device may update the first random value (or pseudo-random value) based on the second random value (or second pseudo-random value). The updated value may indicate a second time during the second paging window 224 for the first device 104 to transmit the paging message 128.

In a particular implementation, the message may include a service advertisement indicating a service and indicating an availability of the service via the plurality of communication channels. The message is multicast to a third electronic device of the NAN via the first communication channel, and the first communication channel includes a NAN communication channel. For example, the first device 104 of FIG. 1 may multicast the service advertisement 120 to the second device 106 and to the third device 108 via the NAN communication channel, as described with reference to FIG. 1. The service advertisement 120 may include the service advertisement indicating the service and the availability of the service, as described with reference to FIG. 1.

In a particular implementation, the message may further indicate that the first electronic device is available to communicate via a logical channel of a plurality of logical channels, and a particular logical channel of the plurality of logical channels indicates a particular communication channel of the plurality of communication channels and a particular set of transmission windows of a plurality of transmission windows. For example, the service advertisement 120 of FIG. 1 may indicate that the first device 104 is available to communicate via the first logical channel, such as the supplemental channel 360 of FIG. 3, as described with reference to FIGS. 1 and 3. The supplemental channel 360 may indicate the first transmission window 340 and the second transmission window 342 of the first communication channel 302, as described with reference to FIG. 3.

The transmitter may be configured to transmit a second message during a second discovery window. For example, with reference to FIG. 1, the transceiver 136 of the first device 104 may transmit a second service advertisement, such as service advertisement 120, during the second discovery window 212. The service advertisement 120 may not indicate a particular logical channel of the logical channels. Additionally, the receiver may be configured to receive a service discovery follow-up message from the second electronic device, the service discovery follow-up message requesting schedule information of a service of the second message. For example, the transceiver 136 may receive the service discovery follow-up message requesting schedule information of a service of the second message, as described with reference to FIG. 1. Additionally, the transmitter may be further configured to transmit a negotiation message to the second electronic device, the negotiation message indicating the schedule information. For example, the transceiver 136 may transmit the negotiation message indicating a particular logical channel of the logical channels 150, as described with reference to FIG. 1.

The method 2000 may thus enable the first device 104 to advertise availability to communicate via one or more logical channels. The method 2000 may also enable the first device 104 to communicate more efficiently by transmitting paging messages and utilizing a low power mode to save power when not monitoring communication channels.

Figure 17:
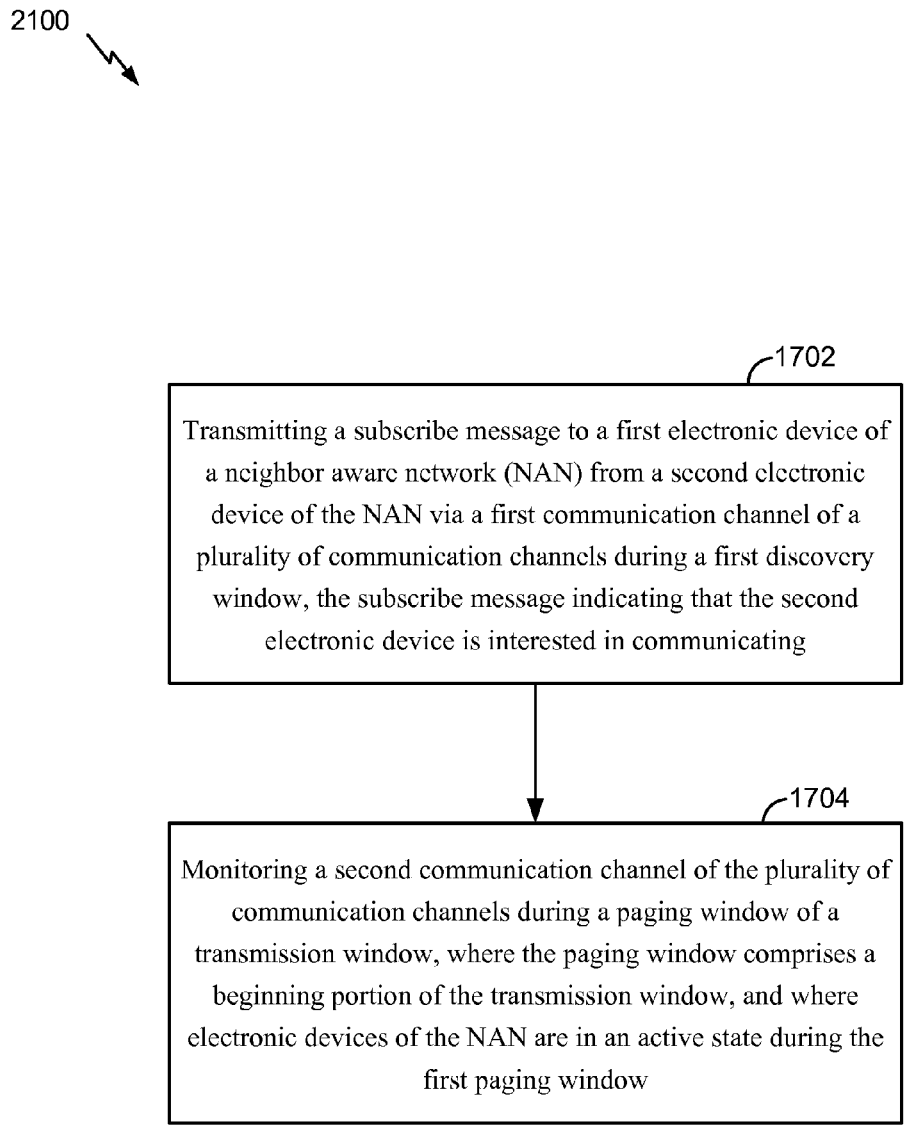
FIG. 17 is a flow diagram of another method of operation at an electronic device of the system of FIG. 1.

Referring to FIG. 17, a particular example of a method of operation is shown and generally designated 2100. The method 2100 may be performed by the subscriber logic 134 of at least one of the electronic devices 104, 106, 108, 110, and 112 of the system 100 of FIG. 1.

The method 2100 includes transmitting a subscribe message to a first electronic device of a neighbor aware network (NAN) from a second electronic device of the NAN via a first communication channel of a plurality of communication channels during a first discovery window, at 1702. For example, the subscriber logic 134 of the second device 106 of FIG. 1 may transmit the subscribe message of 124 to the first electronic device, as described with reference to FIG. 1. The subscribe message may indicate that the second electronic device is interested in communicating. For example, the subscribe message 124 may indicate that the second device 106 is interested in communicating with the first device 104. Additionally, the subscriber logic 134 of the second device 106 may determine at least one time block of a plurality of time blocks based on the first time block indices 1010, as described with reference to FIG. 10.

The method 2100 also includes monitoring a second communication channel of the plurality of communication channels during a paging window of a transmission window, at 1704. For example, the subscriber logic 134 of the second device 106 of FIG. 1 may monitor the communication channel during the first paging window 220 of FIG. 2. The paging window may include a beginning portion of the transmission window, and electronic devices of the NAN may be in an active state during the first paging window. For example, the first paging window may be a beginning portion of the first transmission window 240, as described with reference to FIG. 2, and the electronic devices 104, 106, 108, 110, and 112 of the system 100 of FIG. 1 may be in an active state during the first paging window 220, as described with reference to FIGS. 1 and 2. Additionally, the first transmission window 240 may be included in a set of transmission windows and may include or correspond to a time block, as described with reference to FIG. 10.

In some implementations, the method 2100 may include receiving a first paging message from the first electronic device via the second communication channel during the paging window, the first paging message indicating the first electronic device has data to transmit to the second electronic device. For example, the second device 106 of FIG. 1 may receive the paging message 128 from the first device 104 via the first communication channel during the first paging window 220 of FIG. 2. The paging message 128 may indicate that the first device 104 has the data 122 to transmit to the second device 106, as described with reference to FIG. 1. The method 2100 may also include transmitting a trigger frame from the second electronic device to the first electronic device in response to receiving the first paging message. For example, the second device 106 may transmit the trigger frame to the first device 104 in response to receiving the paging message 128, as described with reference to FIG. 1. The method 2100 may further include monitoring the second communication channel during a data window. An end of the paging window corresponds to a beginning of the data window. For example, the second device may monitor the first communication channel during the first data transmission window 222. The method 2100 may further include receiving the data from the first electronic device via the second communication channel during the data window. The data window corresponds to an end portion of the transmission window. For example, the second device 106 may receive the data 122 from the first device 104 via the first communication channel during the first data transmission window 222, as described with reference to FIGS. 1 and 2.

In some implementations, the first paging message may include a first Quality of Service (QoS) indicator, the first QoS indicator indicating the data includes video data, voice data, background data, or a combination thereof. For example, the paging message 128 may include a first QoS indicator indicating the data includes video data, voice data, background data, or a combination thereof, as described with reference to FIG. 1.

In other implementations, the method 2100 may include receiving a second paging message including a second QoS indicator. The first QoS indicator identifies a first data type and the second QoS indicator identifies a second data type. For example, the second device 106 of FIG. 1 may receive a second paging message including a second QoS indicator from the third device 108. The method 2100 may also include prioritizing the first paging message over the second paging message based on the first QoS indicator. For example, the second device 106 may prioritize the first paging message over the second paging message based on the first QoS indicator, as described with reference to FIG. 1. The method 2100 may further include transmitting a first trigger frame responsive to the first paging message before transmitting a second trigger frame responsive to the second paging message. For example, the second device 106 may transmit a first trigger frame response to the paging message 128 before transmitting a second trigger frame responsive to the second paging message, as described with reference to FIG. 2. In a particular implementation, the trigger frame includes at least one of a power-save poll (PS-POLL) message, a quality of service null (QoS_NULL) frame, an ATIM frame, or an action frame, as described with reference to FIG. 1.

In some implementations, the method 2100 may include receiving a first paging message from the first electronic device via the second communication channel during the paging window. The first paging message indicates that the first electronic device has data to transmit to the second electronic device. For example, the second device 106 of FIG. 1 may receive the paging message 128 from the first device 104 via the first communication channel 302 during the first paging window 220. The method 2100 may also include determining, by the second electronic device, that the first paging message does not indicate the second electronic device is scheduled to receive data. The method 2100 may further include, that the first paging message does not indicate the second electronic device is scheduled to receive the data and entering a low power mode during a data window of the transmission window. For example, the second device 106 of FIG. 1 may determine that the paging message 128 does not indicate that the second device 106 is scheduled to receive data and may enter a low power mode during the first data transmission window 222, as described with reference to FIGS. 1 and 2.

The method 2100 may thus enable the second device 106 to determine that the first device 104 is available to communicate via one or more communication channels. The method 2100 may also enable the second device 106 to indicate its interest in an advertised service.

Figure 18:
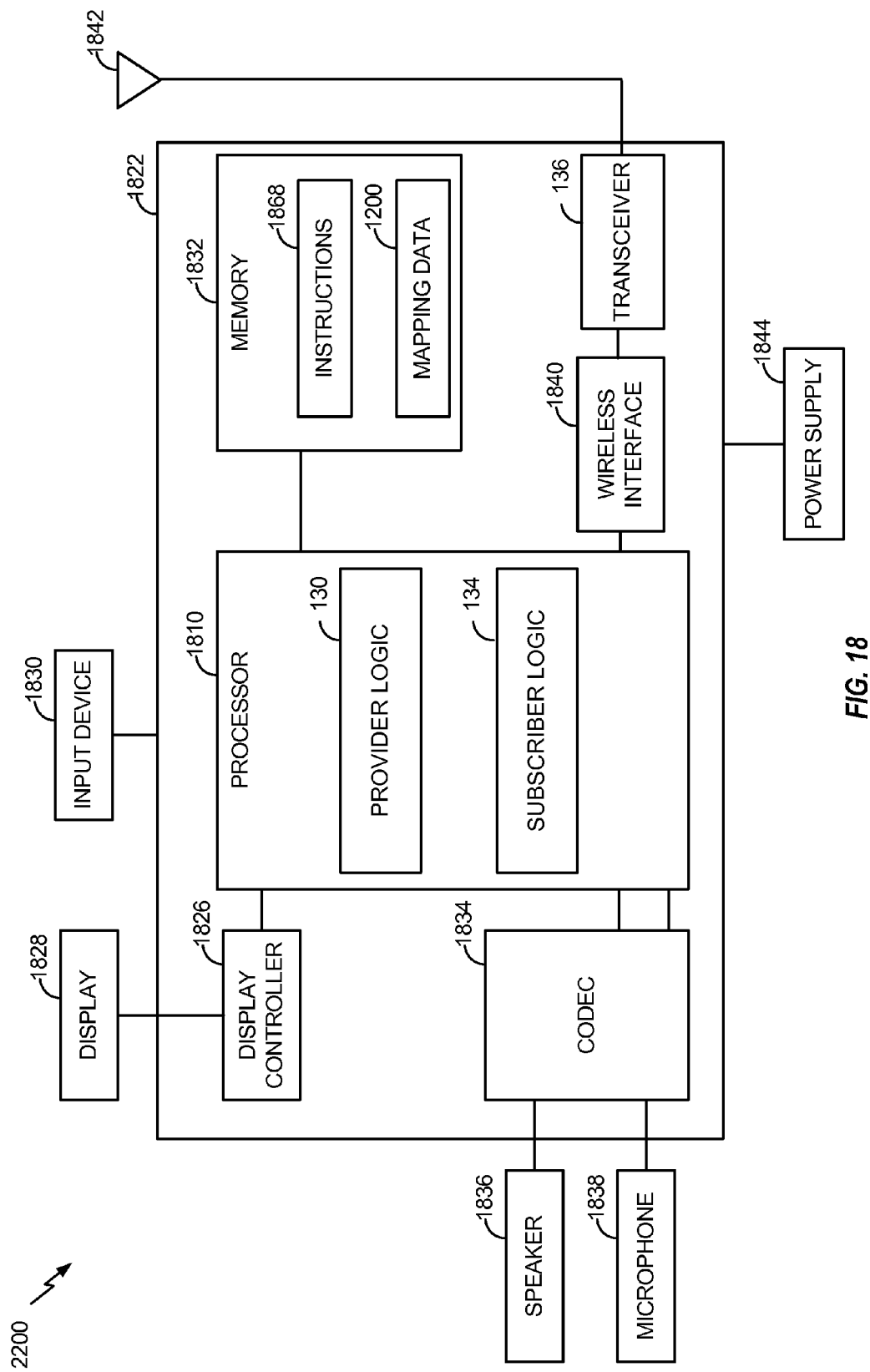
FIG. 18 is a diagram of a wireless device that is operable to support various aspects of one or more methods, systems, apparatuses, computer-readable media, or a combination thereof, disclosed herein.

Referring to FIG. 18, a particular illustrative aspect of a wireless communication device is depicted and generally designated 2200. The device 2200 includes a processor 1810, such as a digital signal processor, coupled to a memory 1832. In an illustrative aspect, the device 2200, or components thereof, may correspond to at least one of the electronic devices 104, 106, 108, and 110 of FIG. 1, or components thereof. The processor 1810 may include the provider logic 130, the subscriber logic 134, or both.

Memory 1832, such as a non-transitory computer-readable medium or a computer-readable storage device, may include the mapping data 1200 and instructions 1868. In a particular aspect, the memory 1832 is a computer-readable storage device storing instructions, such as the instructions 1868, that, when executed by the processor 1810, cause the processor 1810 to perform one or more of the methods 1400, 1500, 1600, 1700, 1800, 1900, 2000, and 2100 of FIGS. 11A, 11B, and 12-17. In a particular aspect, the memory 1832 may also include or correspond to the provider logic 130, the subscriber logic 134, or a combination thereof.

The processor 1810 may be configured to execute software. The software may include or correspond to a program of one or more instructions 1868 stored in the memory 1832. Additionally or alternatively, the processor 1810 may be configured to implement one or more instructions stored in a memory of a wireless interface 1840, such as an IEEE 802.11 compliant interface. For example, the wireless interface 1840 may be configured to operate in accordance with one or more wireless communication standards, including one or more IEEE 802.11 standards and one or more NAN standards. In a particular aspect, the processor 1810 may be configured to perform one or more operations or methods described with reference to FIGS. 1-17. For example, the processor 1810 may be configured to generate the service advertisement 120 of FIG. 1 and to transmit (or receive) the service advertisement 120 via the NAN communication channel 202 of FIG. 2. The processor 1810 may be configured to receive (or transmit) the subscribe message 124 of FIG. 1. The processor 1810 may be configured to monitor one or more communication channels during one or more associated paging windows. The processor 1810 may be configured to transmit (or receive) data via one or more communication channels during one or more associated data transmission windows. The processor 1810 may be configured to refrain from monitoring one or more communication channels during one or more associated data transmission windows.

The wireless interface 1840 may be coupled to the processor 1810 and to an antenna 1842. For example, the wireless interface 1840 may be coupled to the antenna 1842 via a transceiver 136, such that wireless data received via the antenna 1842 and may be provided to the processor 1810.

A coder/decoder (CODEC) 1834 can also be coupled to the processor 1810. A speaker 1836 and a microphone 1838 can be coupled to the CODEC 1834. A display controller 1826 can be coupled to the processor 1810 and to a display device 1828. In a particular aspect, the processor 1810, the display controller 1826, the memory 1832, the CODEC 1834, and the wireless interface 1840 are included in a system-in-package or system-on-chip device 1822. In a particular aspect, an input device 1830 and a power supply 1844 are coupled to the system-on-chip device 1822. Moreover, in a particular aspect, as illustrated in FIG. 11, the display device 1828, the input device 1830, the speaker 1836, the microphone 1838, the antenna 1842, and the power supply 1844 are external to the system-on-chip device 1822. However, each of the display device 1828, the input device 1830, the speaker 1836, the microphone 1838, the antenna 1842, and the power supply 1844 can be coupled to one or more components of the system-on-chip device 1822, such as one or more interfaces or controllers. In a particular aspect, the device 2200 may include at least one of a communications device, a music player, a video player, an entertainment unit, a navigation device, a personal digital assistant (PDA), a mobile device, a computer, a decoder, or a set top box.

In conjunction with the described aspects, an apparatus includes means for generating a message indicating availability of a first electronic device of a neighbor aware network (NAN) to communicate with other electronic devices of the NAN and identifying a logical channel of a plurality of logical channels, the logical channel indicating a particular communication channel of a plurality of communication channels and indicating a set of transmission windows of a plurality of transmission windows. For example, the means for generating may include the provider logic 130, one or more of the electronic devices 104, 106, 108, 110, and 112, the processor 1810 programmed to execute the instructions 1868, one or more other devices, circuits, modules, or instructions configured to generate the message, or any combination thereof.

The apparatus also includes means for transmitting the message to a second electronic device of the NAN. For example, the means for transmitting may include the transceiver 136, one or more other devices, circuits, modules, or instructions configured to transmit the message, or any combination thereof.

In a particular aspect, a message is transmitted during a discovery window of a first communication channel, and the apparatus includes means for receiving a negotiation message from the second electronic device after the discovery window. The apparatus also includes means for determining a negotiated logical channel based in part on the negotiation message. The means for receiving a negotiation message includes the transceiver 136, one or more other devices, circuits, modules, or instructions configured to transmit the message, or any combination thereof. The means for determining a negotiated logical channel based on the negotiation message may include the provider logic 130, the subscriber logic 134, one or more of the electronic devices 104, 106, 108, 110, and 112, the processor 1810 programmed to execute the instructions 1868, one or more other devices, circuits, modules, or instructions configured to generate the message, or any combination thereof.

Further, in conjunction with the described aspects, a second apparatus includes means for receiving a message from a first electronic device of a neighbor aware network (NAN). For example, the means for receiving may include the transceiver 136, one or more other devices, circuits, modules, or instructions configured to receive the message, or any combination thereof. The message, such as the service advertisement 120 of FIG. 1, may include data indicating availability to communicate via a plurality of logical channels, the logical channels 150 of FIG. 1.

The second apparatus also includes means for transmitting a subscribe message to the first electronic device. For example, the means for transmitting may include the transceiver 136, one or more other devices, circuits, modules, or instructions configured to transmit the subscribe message, or any combination thereof. The subscribe message, such as the subscribe message 124, may indicate availability to communicate.

The second apparatus further includes means for monitoring a first communication channel during a particular paging window. For example, the means for monitoring may include the subscriber logic 134, one or more of the electronic devices 104, 106, 108, 110, and 112, the processor 1810 programmed to execute the instructions 1868, one or more other devices, circuits, modules, or instructions configured to select the first logical channel and to monitor the first communication channel, or any combination thereof. The first communication channel, such as the first communication channel 302 of FIG. 3, may correspond to a first logical channel, such as the supplemental channel 360 of FIG. 3, of the plurality of logical channels, such as the logical channels 150 of FIG. 1. The first logical channel may include, indicator, or correspond to one or more transmission windows, such as the first transmission window 340 of FIG. 3. The particular paging window, such as the first paging window 320 of FIG. 3, corresponds to a beginning portion of the first transmission window of the one or more transmission windows.

Further, in conjunction with the described aspects, a third apparatus includes means for generating, at a provider device of a neighbor aware network (NAN), a message that includes a first attribute descriptive of a service and a second attribute descriptive of a NAN data link group, where the first attribute includes an indicator that identifies the second attribute. For example, the means for generating may correspond to the processor 1810 executing the provider logic 130.

The third apparatus further includes means for transmission of the message. The means for transmission may include the wireless interface 1840, the transceiver 136, the antenna 1842, or a combination thereof.

Further, in conjunction with the described aspects, a fourth apparatus includes means for generating a message indicating that a particular device is available to communicate via a logical channel that indicates a communication channel and at least one time block of a plurality of time blocks. For example, the means for generating may include the provider logic 130, the processor 1810, one or more other devices, circuits, modules, or instructions configured to generate the message, or any combination thereof. The message including a channel identifier, such as the first channel identifier 1004 of FIG. 10, of the communication channel and at least one time block index, such as the first time block indices 1010 of FIG. 10, indicating the at least one time block.

The fourth apparatus also includes means for transmitting the message. For example, the means for transmitting may include the wireless interface 1840, the transceiver 136, the antenna 1842, one or more other devices, circuits, modules, or instructions configured to transmit the message, or a combination thereof.

Further, in conjunction with the described aspects, a fifth apparatus includes means for receiving a message from a particular device. For example, the means for receiving may include the wireless interface 1840, the transceiver 136, the antenna 1842, one or more other devices, circuits, modules, or instructions configured to receive the message, or a combination thereof. The message, such as the service advertisement 120 may indicate that the particular device, such as the first device 104, is available to communicate. The message may include a channel identifier, such as the first channel identifier 1004, of a communication channel and at least one time block index, such as the first time block indices 1010.

The fifth apparatus also includes means for monitoring the communication channel during at least one time block of a plurality of time blocks. For example, the means for monitoring may include the subscriber logic 134, the processor 1810, one or more other devices, circuits, modules, or instructions configured to receive the message, or a combination thereof. The at least one time block may be based on the at least one time block index, such as the first time block indices 1010.

One or more of the disclosed aspects may be implemented in a system or an apparatus, such as the device 2200, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 2200 may include a system or component within a vehicle, a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-18 may illustrate systems, apparatuses, and/or methods according to the teachings of the disclosure, the disclosure is not limited to these illustrated systems, apparatuses, and/or methods. One or more functions or components of any of FIGS. 1-18 as illustrated or described herein may be combined with one or more other portions of another function or component of FIGS. 1-18. Accordingly, no single example described herein should be construed as limiting and examples of the disclosure may be suitably combined without departing from the teachings of the disclosure. As an example, one or more of the methods of FIGS. 11-17, individually or in combination, may be performed by the processors 1810 of FIG. 18. To illustrate, a portion of one of the methods FIGS. 11-17 may be combined with a second portion of one of the methods of FIGS. 11-17. Additionally, one or more operations described with reference to the FIGS. 11-17 may be optional, may be performed at least partially concurrently, and/or may be performed in a different order than shown or described.

Those of skill in the art would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient or non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method of communication comprising:
   selecting a logical channel of a plurality of logical channels at a first electronic device of a neighbor aware network (NAN), the logical channel indicating a particular communication channel of a plurality of communication channels and indicating a set of transmission windows of a plurality of transmission windows;
   generating a message indicating that the first electronic device is available to communicate with other electronic devices of the NAN and identifying the logical channel, wherein the message includes:
      a channel identifier that indicates the particular communication channel and includes one or more time block indices that identify the set of transmission windows,
      a first data link attribute that identifies a first data link group of the NAN, and
      a first service attribute that identifies a service offered by the first electronic device via the first data link group, the first service attribute including an indicator that identifies the first data link attribute, and the indicator comprising a bitmap that identifies the first data link attribute based on a position of a particular value in the bitmap; and
   transmitting the message to a second electronic device of the NAN.

2. The method of claim 1, wherein each transmission window of the set of transmission windows comprises a time block that is offset from a discovery window, and wherein a second logical channel of the plurality of logical channels indicates the particular communication channel and indicates a second set of transmission windows of the plurality of transmission windows.

3. The method of claim 1, wherein the message identifies multiple logical channels of the plurality of logical channels, the multiple logical channels including the logical channel, and wherein, for each particular logical channel of the multiple logical channels, the message includes a channel identifier of a communication channel corresponding to the particular logical channel.

4. The method of claim 1, wherein the message includes a service advertisement indicating the service available from the first electronic device, and wherein the service is provided using the selected logical channel.

5. The method of claim 1, further comprising generating a beacon message or a service discovery message, wherein the message is included in the beacon message or the service discovery message, and wherein transmitting the message comprises transmitting the beacon message or the service discovery message to the second electronic device during a discovery window of a first communication channel.

6. The method of claim 1, wherein the message is transmitted during a first discovery window of a first communication channel, wherein a discovery period comprises a duration between an end of the first discovery window and a beginning of a second discovery window, wherein the discovery period includes the plurality of transmission windows, and wherein a first transmission window of the plurality of transmission windows has a first offset from the end of the first discovery window and a second transmission window of the plurality of transmission windows has a second offset from the end of the first discovery window.

7. The method of claim 1, wherein the message is transmitted during a first discovery window of a first communication channel, wherein a discovery period comprises a duration between an end of the first discovery window and a beginning of a second discovery window, wherein the discovery period comprises a plurality of time blocks, wherein each time block of the plurality of time blocks has a same second duration, and wherein a particular logical channel of the plurality of logical channels occurs multiple times during the discovery period.

8. The method of claim 7, wherein a particular transmission window of the set of transmission windows corresponds to a time block of the plurality of time blocks, and wherein a particular time block index of the one or more time block indices identifies the time block of the particular transmission window.

9. The method of claim 8, wherein the particular time block index corresponds to a node of a tree representation of a plurality of time block indices.

10. The method of claim 9, wherein the tree representation comprises a binary tree representation of the plurality of time block indices.

11. The method of claim 1, wherein the message includes a plurality of time block indices including the one or more time block indices, wherein a first index of the plurality of time block indices identifies a first time block of a plurality of time blocks, and wherein a second index of the plurality of time block indices identifies a set of consecutive time blocks of the plurality of time blocks.

12. The method of claim 11, further comprising, in response to another electronic device joining a data link group of the NAN, updating the first index of the plurality of time block indices to indicate the first time block and to indicate a second time block of the plurality of time blocks.

13. The method of claim 1, wherein the message is transmitted to the second electronic device and to a third electronic device of the NAN during a discovery window, wherein the second electronic device and the third electronic device are included in a data link group of the NAN, and further comprising:
transmitting first data to the second electronic device during a first time block;
transmitting second data to the third electronic device during a second time block; and
transmitting third data to the second electronic device and to the third electronic device during a third time block.

14. The method of claim 1, further comprising:
receiving a subscribe message from the second electronic device via a first communication channel during a discovery window, the first communication channel different from the particular communication channel; and
monitoring the particular communication channel during a paging window of a particular transmission window of the set of transmission windows, wherein the particular transmission window includes the paging window and a data window, wherein the paging window comprises a beginning portion of the particular transmission window, and wherein the data window comprises an end portion of the particular transmission window.

15. An apparatus comprising:
a processor configured to:
select a logical channel of a plurality of logical channels, the logical channel indicating a particular communication channel of a plurality of communication channels and indicating a set of transmission windows of a plurality of transmission windows; and
generate a message indicating availability of a first electronic device of a neighbor aware network (NAN) to communicate with other electronic devices of the NAN and identifying the logical channel, wherein the message includes:
a channel identifier that indicates the particular communication channel and includes one or more time block indices that identify the set of transmission windows,
a first data link attribute that identifies a first data link group of the NAN, and
a first service attribute that identifies a service offered by the first electronic device via the first data link group, the first service attribute including an indicator that identifies the first data link attribute, and the indicator comprising a bitmap that identifies the first data link attribute based on a position of a particular value in the bitmap; and
a transmitter configured to wirelessly transmit the message to a second electronic device of the NAN.

16. The apparatus of claim 15, wherein the processor is further configured to monitor a first communication channel during a discovery window, and further comprising a receiver configured to receive a subscribe message from the second electronic device, wherein the subscribe message indicates that the second electronic device is interested in communicating.

17. The apparatus of claim 15, wherein the transmitter is further configured to transmit a second message during a second discovery window, the second message indicating a particular logical channel is negotiable, and further comprising a receiver configured to receive a negotiation message or an association request from the second electronic device after an end of the second discovery window, wherein the processor is further configured to determine a negotiated logical channel based in part on the negotiation message or the association request.

18. The apparatus of claim 15, wherein the transmitter is further configured to transmit data via the particular communication channel during a particular transmission window of the set of transmission windows.

19. The apparatus of claim 15, wherein the processor is further configured to, based on a synchronization beacon, synchronize a first clock of the first electronic device with a second clock of the second electronic device during a discovery window.

20. The apparatus of claim 15, wherein the first service attribute includes a service identifier identifying the service, and wherein the first service attribute includes a first instance identifier identifying a first instance of the service.

21. The apparatus of claim 20, wherein the message further includes a second service attribute identifying the service, wherein the second service attribute includes the service identifier and includes a second instance identifier that identifies a second instance of the service, and wherein the second service attribute includes a second indicator that identifies the first data link attribute.

22. The apparatus of claim 20, wherein the message further includes a second data link attribute identifying a second data link group of the NAN, wherein the message includes a third service attribute identifying a second service, and wherein the third service attribute includes a third indicator that identifies the second data link attribute.

23. The apparatus of claim 15, wherein the first data link attribute identifies the logical channel used by the first electronic device to provide the service, and wherein the service is provided by the first electronic device during a particular transmission window of the set of transmission windows indicated by the logical channel.

24. The apparatus of claim 15, wherein the message further indicates a second logical channel of the plurality of logical channels, the second logical channel indicating a second communication channel of the plurality of communication channels and a second transmission window of a second set of transmission windows, and the transmitter is further configured to:
    transmit data to the second electronic device via the particular communication channel during a first transmission window of the set of transmission windows; and
    transmit second data to the second electronic device via the second communication channel during the second transmission window of the second set of transmission windows, wherein the first transmission window at least partially overlaps the second transmission window.

25. A computer-readable storage device storing instructions that, when executed by a processor, cause the processor to perform operations comprising:
    generating a message indicating availability of a first electronic device of a neighbor aware network (NAN) to communicate with other electronic devices of the NAN and identifying a logical channel of a plurality of logical channels, the logical channel indicating a particular communication channel of a plurality of communication channels and indicating a set of transmission windows of a plurality of transmission windows, wherein the message includes:
        a channel identifier that indicates the particular communication channel and includes one or more time block indices that identify the set of transmission windows,
        a first data link attribute that identifies a first data link group of the NAN, and
        a first service attribute that identifies a service offered by the first electronic device via the first data link group, the first service attribute including an indicator that identifies the first data link attribute, and the indicator comprising a bitmap that identifies the first data link attribute based on a position of a particular value in the bitmap; and
    initiating wireless transmission of the message to a second electronic device of the NAN.

26. The computer-readable storage device of claim 25, wherein the operations further comprise initiating performance of a capabilities exchange with the second electronic device, wherein performing the capabilities exchange by the first electronic device includes transmitting a first capabilities message to the second electronic device and receiving a second capabilities message from the second electronic device, transmitting a probe request to the second electronic device and receiving a probe response from the second electronic device, or transmitting an association request to the second electronic device and receiving an association response from the second electronic device.

27. An apparatus comprising:
    means for generating a message indicating availability of a first electronic device of a neighbor aware network (NAN) to communicate with other electronic devices of the NAN and identifying a logical channel of a plurality of logical channels, the logical channel indicating a particular communication channel of a plurality of communication channels and indicating a set of transmission windows of a plurality of transmission windows, wherein the message includes:
        a channel identifier that indicates the particular communication channel and includes one or more time block indices that identify the set of transmission windows,
        a first data link attribute that identifies a first data link group of the NAN, and
        a first service attribute that identifies a service offered by the first electronic device via the first data link group, the first service attribute including an indicator that identifies the first data link attribute, and the indicator comprising a bitmap that identifies the first data link attribute based on a position of a particular value in the bitmap; and
    means for transmitting the message to a second electronic device of the NAN.

28. The apparatus of claim 27, wherein the message is transmitted during a discovery window of a first communication channel, and further comprising:
    means for receiving a negotiation message from the second electronic device after the discovery window; and
    means for determining a negotiated logical channel based in part on the negotiation message.

* * * * *